United States Patent
Okazaki et al.

(10) Patent No.: US 10,773,143 B2
(45) Date of Patent: Sep. 15, 2020

(54) GOLF CLUB FITTING APPARATUS, METHOD, AND PROGRAM

(71) Applicants: DUNLOP SPORTS CO. LTD., Kobe-shi, Hyogo (JP); SUMITOMO RUBBER INDUSTRIES, LTD., Kobe-shi, Hyogo (JP)

(72) Inventors: Kousuke Okazaki, Kobe (JP); Masahiko Ueda, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 989 days.

(21) Appl. No.: 15/256,001

(22) Filed: Sep. 2, 2016

(65) Prior Publication Data

US 2017/0065866 A1 Mar. 9, 2017

(30) Foreign Application Priority Data

Sep. 3, 2015 (JP) .................. 2015-174207
Mar. 22, 2016 (JP) .................. 2016-057502
Aug. 10, 2016 (JP) .................. 2016-158230

(51) Int. Cl.
A63B 69/36 (2006.01)

(52) U.S. Cl.
CPC .......... *A63B 69/36* (2013.01); *A63B 2220/30* (2013.01); *A63B 2220/40* (2013.01)

(58) Field of Classification Search
None
See application file for complete search history.

(56) References Cited

U.S. PATENT DOCUMENTS

2005/0221906 A1* 10/2005 Miyamoto ............. A63B 60/42
  473/221
2011/0028248 A1* 2/2011 Ueda .................. A63B 69/3614
  473/409

(Continued)

FOREIGN PATENT DOCUMENTS

JP  2005-21329 A  1/2005
JP  2012-16582 A  1/2012

(Continued)

OTHER PUBLICATIONS

Japanese Office Action dated Mar. 24, 2020 for Counterpart Japanese Patent Application No. 2016-158230, with English translation.

*Primary Examiner* — Tramar Y Harper
(74) *Attorney, Agent, or Firm* — Birch, Stewart, Kolasch & Birch, LLP

(57) ABSTRACT

Provided is a fitting apparatus for selecting a golf club suited to a golfer, including: an acquisition unit configured to acquire a measurement value obtained by measuring a swing action of a test club by the golfer, with a measurement device; a calculation unit configured to calculate a first swing index and a second swing index related to the swing action, based on the measurement value; a determination unit configured to determine an optimal swingability index, which is a swingability index of the golf club suited to the golfer, according to a magnitude of the first swing index, and determine an optimal stiffness index representing stiffness of a shaft suited to the golfer, according to a magnitude of the second swing index; and a selection unit configured to select at least one of a golf club and a shaft matching the optimal swingability index and the optimal stiffness index.

20 Claims, 44 Drawing Sheets

(56) References Cited

U.S. PATENT DOCUMENTS

| | | |
|---|---|---|
| 2011/0300959 A1 | 12/2011 | Hasegawa et al. |
| 2013/0165246 A1* | 6/2013 | Jeffery ............... A63B 69/3623 |
| | | 473/223 |
| 2013/0260923 A1* | 10/2013 | Okazaki ................. A63B 60/42 |
| | | 473/409 |
| 2014/0100048 A1 | 4/2014 | Ota et al. |
| 2014/0100049 A1 | 4/2014 | Ota et al. |
| 2014/0100050 A1 | 4/2014 | Ota et al. |
| 2014/0357426 A1* | 12/2014 | Ishikawa ............ G06K 9/00342 |
| | | 473/407 |
| 2014/0357427 A1* | 12/2014 | Ishikawa ............. H04M 1/7253 |
| | | 473/407 |
| 2016/0030803 A1* | 2/2016 | Okazaki .............. G06F 19/3481 |
| | | 473/409 |

FOREIGN PATENT DOCUMENTS

| | | |
|---|---|---|
| JP | 2013-165808 A | 8/2013 |
| JP | 2013-208366 A | 10/2013 |
| JP | 2013-226375 A | 11/2013 |
| JP | 2014-73313 A | 4/2014 |
| JP | 2015-134103 A | 7/2015 |

\* cited by examiner

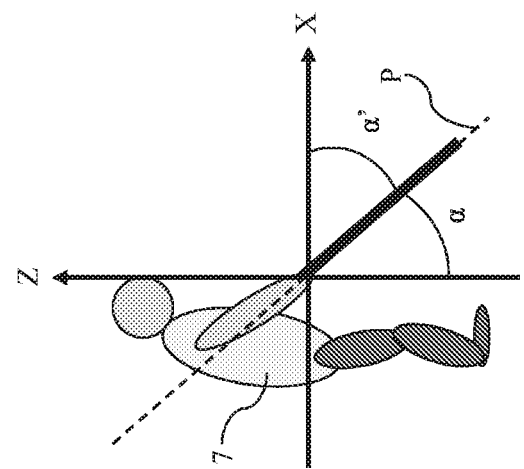
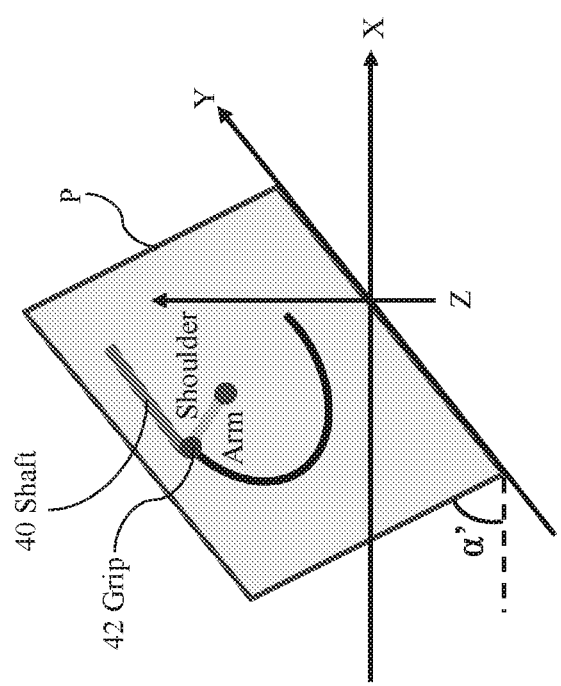
Fig.7

GOLF CLUB FITTING APPARATUS, METHOD, AND PROGRAM

CROSS REFERENCE TO RELATED APPLICATIONS

This application claims priorities to Japanese Patent Applications No. 2015-174207 filed on Sep. 3, 2015, No. 2016-57502 filed on Mar. 22, 2016 and No. 2016-158230 filed on Aug. 10, 2016, which are hereby incorporated by reference in their entirety.

FIELD OF INVENTION

The present invention relates to a fitting apparatus, a method, and a program for selecting a golf club, in particular, a shaft suited to a golfer.

BACKGROUND

Heretofore, various fitting methods that involve getting a golfer to take practice hits with test clubs, measuring the action with a measurement device, and selecting a golf club suited to the golfer based on the measurement values have been proposed. As one of these methods, JP 2013-226375A (hereinafter, Patent Literature 1) discloses a fitting method for selecting a shaft of a golf club suited to a golfer. Specifically, in Patent Literature 1, first, the flexural stiffness of a shaft suited to a golfer is determined based on measurement values obtained with a test club. Then, shafts matching the value of the flexural stiffness are extracted from among a large number of shafts registered in a database. This method shows great promise as a technique that improves the fitting precision of shafts.

SUMMARY OF INVENTION

Incidentally, in the method of Patent Literature 1, it is easily conceivable that a large number of shafts having similar flexural stiffnesses are registered in the database. In this case, it may not be possible to sufficiently narrow down shafts suited to a golfer merely by determining a flexural stiffness suited to the golfer. In particular, there are many cases in which a large number of shafts have similar flexural stiffnesses but are in different weight zones, and it may be difficult to determine which shaft in which weight zone is to be selected.

In this regard, in Patent Literature 1, a shaft is selected based on, in addition to the abovementioned flexural stiffness, the weight of a golf club usually used by the golfer (hereinafter, usual club weight). Specifically, a shaft is selected such that the weight of a newly proposed golf club is ±5 g of the usual club weight. That is, if the weight of a newly used golf club is significantly different from the usual club weight, the golfer's performance may deteriorate because he or she feels it difficult to grasp the timing or to swing the golf club. In this regard, it can be said that the method of Patent Literature 1 is preferable in that the change in the weight from the usual club weight is limited.

However, the usual club weight may not be suited to the golfer at all, that is, it may be too light or too heavy. In this case, with the method of Patent Literature 1, the path of a ball may not be improved even when the feeling is improved, or the feeling may not be right.

It is an object of the present invention to provide a fitting apparatus, a method, and a program for precisely selecting a golf club suited to a golfer.

A first aspect of the present invention is directed to a fitting apparatus configured to select a golf club suited to a golfer, including: an acquisition unit configured to acquire a measurement value obtained by measuring a swing action of a test club by the golfer, with a measurement device; a calculation unit configured to calculate a first swing index and a second swing index related to the swing action, based on the measurement value; a determination unit configured to determine an optimal swingability index, which is a swingability index of the golf club suited to the golfer, according to a magnitude of the first swing index, and determine an optimal stiffness index representing stiffness of a shaft suited to the golfer, according to a magnitude of the second swing index; and a selection unit configured to select at least one of a golf club and a shaft matching the optimal swingability index and the optimal stiffness index.

A second aspect is directed to the fitting apparatus according to the first aspect, wherein the calculation unit calculates a plurality of types of the first swing indices, and the determination unit determines the optimal swingability index according to magnitudes of the plurality of types of the first swing indices.

A third aspect is directed to the fitting apparatus according to the first or second aspect, wherein the first swing index includes at least one of an index representing power that is output by an arm of the golfer during the swing action, an index representing power that is input to the test club during the swing action, an index representing energy that is exerted by the golfer during the swing action, and an index representing torque that is exerted by the golfer during the swing action.

A fourth aspect is directed to the fitting apparatus according to any one of the first to third aspects, wherein the first swing index includes head speed during the swing action.

A fifth aspect is directed to the fitting apparatus according to any one of the first to fourth aspects, wherein the determination unit determines the optimal swingability index to take a larger value as the first swing index increases or decreases.

A sixth aspect is directed to the fitting apparatus according to any one of the first to fifth aspects, wherein the fitting apparatus further includes: a storage unit which stores correspondence data defining a correspondence between the magnitude of the first swing index and the magnitude of the optimal swingability index for each type of the test club, wherein the determination unit determines the optimal swingability index according to the type of the test club, by referring to the correspondence data in the storage unit.

A seventh aspect is directed to the fitting apparatus according to any one of the first to sixth aspects, wherein the swingability index includes at least one of a moment of inertia about a shoulder of the golfer, a moment of inertia of the golf club, and a weight of the golf club.

An eighth aspect is directed to the fitting apparatus according to any one of the first to seventh aspects, wherein the measurement value includes at least one of acceleration, angular velocity, and geomagnetism at a grip end of the test club.

A ninth aspect is directed to the fitting apparatus according to any one of the first to eighth aspects, wherein the determination unit determines a distribution of stiffnesses at a plurality of positions on a shaft, suited to the golfer, as the optimal stiffness index.

A tenth aspect is directed to the fitting apparatus according to the ninth aspect, wherein the calculation unit calculates first to N-th feature amounts as the second swing index, and the determination unit determines first to N-th stiffness values indicating stiffnesses of a shaft suited to the golfer at first to N-th positions arranged in this order from a butt end to a tip end of the shaft, as the optimal stiffness index, according to magnitudes of the respective first to N-th feature amounts. N is an integer equal to or more than two. N may be 2, N may be 3, or N may be 4.

An eleventh aspect is directed to the fitting apparatus according to the ninth or tenth aspect, wherein the determination unit determines the optimal stiffness index in accordance with a predetermined equation representing a relationship between the second swing index and the optimal stiffness index.

A twelfth aspect is directed to a fitting method for selecting a golf club suited to a golfer, including the following steps (1) to (4), consisting of: (1) a step of measuring a swing action of a test club by the golfer, with a measurement device; (2) a step of calculating a first swing index and a second swing index related to the swing action, based on the measurement value; (3) a step of determining an optimal swingability index, which is a swingability index of the golf club suited to the golfer, according to a magnitude of the first swing index, and determining an optimal stiffness index representing stiffness of a shaft suited to the golfer, according to a magnitude of the second swing index; and (4) a step of selecting at least one of a golf club and a shaft matching the optimal swingability index and the optimal stiffness index.

A thirteenth aspect is directed to a fitting program for selecting a golf club suited to a golfer, the fitting program causing a computer to execute the following steps (1) to (4), consisting of: (1) a step of acquiring a measurement value obtained by measuring a swing action of a test club by the golfer, with a measurement device; (2) a step of calculating a first swing index and a second swing index related to the swing action, based on the measurement value; (3) a step of determining an optimal swingability index, which is a swingability index of the golf club suited to the golfer, according to a magnitude of the first swing index, and determining an optimal stiffness index representing stiffness of a shaft suited to the golfer, according to a magnitude of the second swing index; and (4) a step of selecting at least one of a golf club and a shaft matching the optimal swingability index and the optimal stiffness index.

A fourteenth aspect is directed to a fitting apparatus configured to select a golf club suited to a golfer, including: an acquisition unit configured to acquire a measurement value obtained by measuring a swing action of a test club by the golfer, with a measurement device; a calculation unit configured to calculate a first swing index and a second swing index related to the swing action, based on the measurement value; a determination unit configured to determine an optimal feature index representing a feature of a specific site in the golf club suited to the golfer, according to a magnitude of the first swing index, and determine an optimal stiffness index representing stiffness of a shaft suited to the golfer, according to a magnitude of the second swing index; and a selection unit configured to select at least one of a golf club and a shaft matching the optimal feature index and the optimal stiffness index.

A fifteenth aspect is directed to the fitting apparatus according to the fourteenth aspect, wherein the determination unit determines the optimal feature index according to a type of head that is to be included in the golf club, in addition to the magnitude of the first swing index, and the specific site is a site other than the head.

A sixteenth aspect is directed to the fitting apparatus according to the fourteenth or fifteenth aspect, wherein the specific site is a shaft or a grip.

A seventeenth aspect is directed to the fitting apparatus according to any one of the fourteenth to sixteenth aspects, wherein the determination unit determines an optimal swingability index, which is a swingability index of the golf club suited to the golfer, according to the magnitude of the first swing index, and determines the optimal feature index, according to a magnitude of the optimal swingability index.

An eighteenth aspect is directed to the fitting apparatus according to the seventeenth aspect, wherein the determination unit calculates the optimal swingability index by substituting the first swing index calculated by the calculation unit into a predetermined regression equation where the first swing index is taken as an explanatory variable and the optimal swingability index is taken as a response variable.

A nineteenth aspect is directed to the fitting apparatus according to any one of the fourteenth to sixteenth aspects, wherein the determination unit calculates the optimal feature index by substituting the swing index calculated by the calculation unit into a predetermined regression equation where the first swing index is taken as an explanatory variable and the optimal feature index is taken as a response variable.

A twentieth aspect is directed to the fitting apparatus according to any one of the fourteenth to nineteenth aspects, wherein the optimal feature index is an optimal shaft weight, which is a weight of a shaft of the golf club suited to the golfer.

A twenty-first aspect is directed to a fitting apparatus for selecting a golf club suited to a golfer, including: an input accepting unit configured to accept input of information for determining a type of head that is to be included in the golf club, from a user; a calculation unit configured to calculate a first swing index related to a swing action of the golfer; and a determination unit configured to determine an optimal shaft weight, which is a weight of a shaft of the golf club suited to the golfer, according to a magnitude of the first swing index and the type of head specified by the user.

A twenty-second aspect is directed to the fitting apparatus according to the twenty-first aspect, wherein the determination unit determines an optimal swingability index, which is a swingability index of the golf club suited to the golfer, according to the magnitude of the first swing index, and determines the optimal shaft weight, according to a magnitude of the optimal swingability index and the type of head specified by the user.

A twenty-third aspect is directed to a fitting apparatus configured to select a golf club suited to a golfer, including an acquisition unit, a calculation unit, a determination unit, and a selection unit. The acquisition unit acquires a measurement value obtained by measuring a swing action of a test club by the golfer, with a measurement device. The calculation unit calculates a first swing index related to the swing action, based on the measurement value. The determination unit determines an optimal club index representing a feature of the whole or a specific site in the golf club suited to the golfer according to which area the first swing index calculated based on the measurement value belongs to among a plurality of areas defined by dividing a space representing the first swing index, and then, in a case where the first swing index calculated based on the measurement value is positioned near a boundary between the plurality of areas, corrects the optimal club index. The selection unit selects at least one of a golf club and a shaft matching the optimal club index.

A twenty-fourth aspect is directed to a fitting apparatus configured to select a golf club suited to a golfer, including an acquisition unit, a calculation unit, a determination unit, and a selection unit. The acquisition unit acquires a measurement value obtained by measuring a swing action of a test club by the golfer, with a measurement device. The calculation unit calculates a first swing index related to the swing action, based on the measurement value. The determination unit determines an optimal club index representing a feature of the whole or a specific site in the golf club suited to the golfer, according to a magnitude of the first swing index. The selection unit selects at least one of a golf club and a shaft matching the optimal club index. The first swing index includes an index representing the swing action in swing plane, and includes an index representing at least one of rotational motion and wrist-cock motion not appearing in the swing plane.

A twenty-fifth aspect is directed to a fitting method for selecting a golf club suited to a golfer, including the following steps (1) to (4), consisting of: (1) a step of acquiring a measurement value obtained by measuring a swing action of a test club by the golfer, with a measurement device; (2) a step of calculating a first swing index and a second swing index related to the swing action, based on the measurement value; (3) a step of determining an optimal feature index representing a feature of a specific site in the golf club suited to the golfer, according to a magnitude of the first swing index, and determining an optimal stiffness index representing stiffness of a shaft suited to the golfer, according to a magnitude of the second swing index; and (4) a step of selecting at least one of a golf club and a shaft matching the optimal feature index and the optimal stiffness index.

A twenty-sixth aspect is directed to a fitting program for selecting a golf club suited to a golfer, the fitting program causing a computer to execute the following steps (1) to (4), consisting of: (1) a step of acquiring a measurement value obtained by measuring a swing action of a test club by the golfer, with a measurement device; (2) a step of calculating a first swing index and a second swing index related to the swing action, based on the measurement value; (3) a step of determining an optimal feature index representing a feature of a specific site in the golf club suited to the golfer, according to a magnitude of the first swing index, and determining an optimal stiffness index representing stiffness of a shaft suited to the golfer, according to a magnitude of the second swing index; and (4) a step of selecting at least one of a golf club and a shaft matching the optimal feature index and the optimal stiffness index.

A twenty-seventh aspect is directed to a fitting method for selecting a golf club suited to a golfer, including the following steps (1) to (4), consisting of: (1) a step of acquiring a measurement value obtained by measuring a swing action of a test club by the golfer, with a measurement device; (2) a step of calculating a first swing index related to the swing action, based on the measurement value; (3) a step of determining an optimal club index representing a feature of the whole or a specific site in the golf club suited to the golfer according to which area the first swing index calculated based on the measurement value belongs to among a plurality of areas defined by dividing a space representing the first swing index, and then, in a case where the first swing index calculated based on the measurement value is positioned near a boundary between the plurality of areas, correcting the optimal club index; and (4) a step of selecting at least one of a golf club and a shaft matching the optimal club index.

A twenty-eighth aspect is directed to a fitting program for selecting a golf club suited to a golfer, the fitting program causing a computer to execute the following steps (1) to (4), consisting of: (1) a step of acquiring a measurement value obtained by measuring a swing action of a test club by the golfer, with a measurement device; (2) a step of calculating a first swing index related to the swing action, based on the measurement value; (3) a step of determining an optimal club index representing a feature of the whole or a specific site in the golf club suited to the golfer according to which area the first swing index calculated based on the measurement value belongs to among a plurality of areas defined by dividing a space representing the first swing index, and then, in a case where the first swing index calculated based on the measurement value is positioned near a boundary between the plurality of areas, correcting the optimal club index; and (4) a step of selecting at least one of a golf club and a shaft matching the optimal club index.

A twenty-ninth aspect is directed to a fitting method for selecting a golf club suited to a golfer, including the following steps (1) to (4), consisting of: (1) a step of acquiring a measurement value obtained by measuring a swing action of a test club by the golfer, with a measurement device; (2) a step of calculating a first swing index related to the swing action, based on the measurement value, wherein the first swing index includes an index representing the swing action in swing plane, and includes an index representing at least one of rotational motion and wrist-cock motion not appearing in the swing plane; (3) a step of determining an optimal club index representing a feature of the whole or a specific site in the golf club suited to the golfer, according to a magnitude of the first swing index; and (4) a step of selecting at least one of a golf club and a shaft matching the optimal club index.

A thirtieth aspect is directed to a fitting program for selecting a golf club suited to a golfer, the fitting program causing a computer to execute the following steps (1) to (4), consisting of: (1) a step of acquiring a measurement value obtained by measuring a swing action of a test club by the golfer, with a measurement device; (2) a step of calculating a first swing index related to the swing action, based on the measurement value, wherein the first swing index includes an index representing the swing action in swing plane, and includes an index representing at least one of rotational motion and wrist-cock motion not appearing in the swing plane; (3) a step of determining an optimal club index representing a feature of the whole or a specific site in the golf club suited to the golfer, according to a magnitude of the first swing index; and (4) a step of selecting at least one of a golf club and a shaft matching the optimal club index.

According to the first aspect of the present invention, the first swing index and the second swing index are calculated based on a measurement value with a test club. Then, an optimal swingability index, which is a swingability index (e.g., swing moment of inertia of the golf club, moment of inertia about the grip end, weight, etc.) of the golf club suited to the golfer is determined according to the first swing index, and an optimal stiffness index representing stiffness of the shaft suited to the golfer is determined according to the second swing index. Then, at least either a golf club or a shaft matching the optimal swingability index and the optimal stiffness index is selected. That is, at least either golf clubs or shafts are narrowed down based on the swingability index suited to the golfer, instead of an index, such as a usual club weight, that is unclear as to whether or not the golf clubs or shafts are suited to the golfer. Accordingly, golf clubs suited to the golfer can be precisely selected.

According to the fourteenth aspect of the present invention, the first swing index and the second swing index are calculated based on a measurement value with a test club. Then, an optimal feature index representing a feature of a specific site (e.g., weight of the shaft, etc.) in the golf club suited to the golfer is determined according to the first swing index, and an optimal stiffness index representing stiffness of the shaft suited to the golfer is determined according to the second swing index. Then, at least either a golf club or a shaft matching the optimal feature index and the optimal stiffness index is selected. That is, at least either golf clubs or shafts are narrowed down based on a feature of a specific site in the golf club suited to the golfer, instead of an index, such as a usual club weight, that is unclear as to whether or not the golf clubs or shafts are suited to the golfer. Accordingly, golf clubs suited to the golfer can be precisely selected.

According to the twenty-first aspect of the present invention, input of information for determining a type of head that is to be included in the golf club is accepted from the user, and a first swing index related to a swing action of the golfer is calculated. Then, a weight of the shaft suited to the golfer (optimal shaft weight) is determined according to the first swing index in addition to the type of head specified by the user. That is, at least either golf clubs or shafts are narrowed down based on the weight of the shaft suited to the golfer, instead of an index, such as a usual club weight, that is unclear as to whether or not the golf clubs or shafts are suited to the golfer. Accordingly, golf clubs suited to the golfer can be precisely selected.

BRIEF DESCRIPTION OF DRAWINGS

FIG. 7 is a diagram illustrating a swing plane;

REFERENCE SIGNS LIST

Sensor unit (measurement device)
  2 Fitting apparatus
  3 Fitting program
  4 Golf club
  7 Golfer
  24A Acquisition unit
  24B Grip behavior derivation unit
  24C Shoulder behavior derivation unit
  24D Calculation unit
  24E Determination unit
  24F Selection unit
  40 Shaft
  41 Head
  42 Grip

DETAILED DESCRIPTION OF THE PREFERRED EMBODIMENTS

Hereinafter, a golf club fitting apparatus, method, and program according to several embodiments of the present invention will be described with reference to the drawings.

1. First Embodiment 1-1. Schematic Configuration of Fitting System

Figure 1:
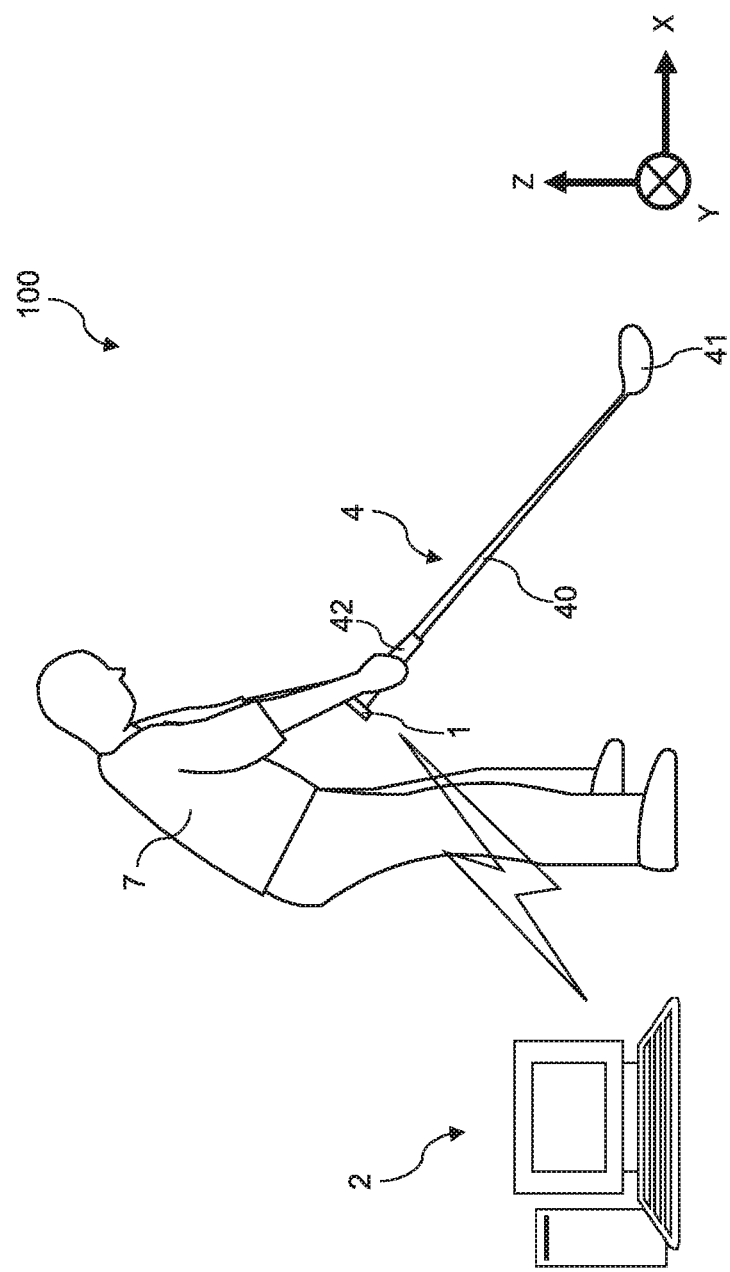
FIG. 1 is a diagram showing a fitting system provided with a fitting apparatus according to an embodiment of the present invention.
Figure 2:
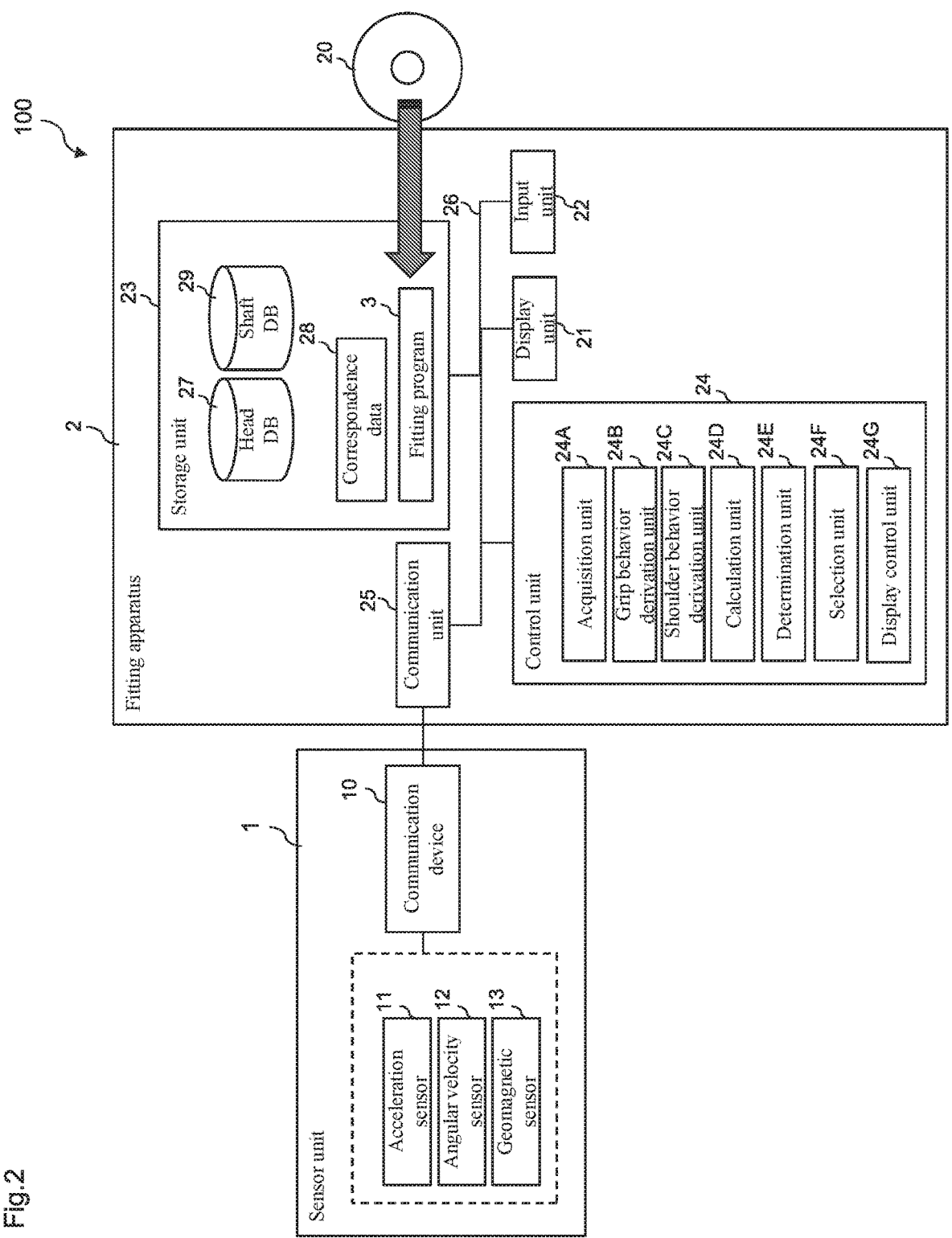
FIG. 2 is a functional block diagram of the fitting system.

FIGS. 1 and 2 show the overall configuration of a fitting system 100 that is provided with a fitting apparatus 2 according to the present embodiment. The fitting apparatus 2 is an apparatus for selecting a golf club 4 suited to a golfer 7, based on measurement data obtained by measuring the swing action of the golf club 4 by the golfer 7. In the present embodiment, the swing action is measured by a sensor unit 1 attached to a grip 42 of the golf club 4, and the fitting apparatus 2 together with the sensor unit 1 constitutes the fitting system 100.

Hereinafter, the configuration of the sensor unit 1 and the fitting apparatus 2 will be described, followed by description of the flow of fitting processing.

1-1-1. Configuration of Sensor Unit

Figure 3:
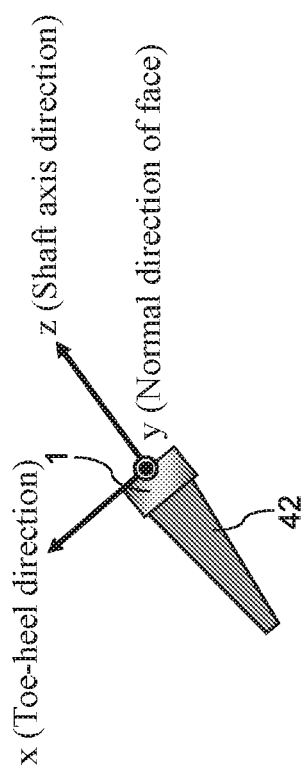
FIG. 3 is a diagram illustrating an xyz local coordinate system that is based on the grip of a golf club.

The sensor unit 1 is, as is shown in FIGS. 1 and 3, attached to an end portion of the grip 42 of the golf club 4 on the opposite side to a head 41, and measures the behavior of the grip 42. Note that the golf club 4 is a common golf club, and is constituted by a shaft 40, the head 41 provided at one end of the shaft 40, and the grip 42 provided at the other end of the shaft 40. The shaft 40 according to the present embodiment is a shaft made of carbon. The sensor unit 1 is configured to be compact and lightweight so as to not impede the swing action. As shown in FIG. 2, an acceleration sensor 11, an angular velocity sensor 12 and a geomagnetic sensor 13 are mounted in the sensor unit 1 according to the present embodiment. A communication device 10 for transmitting measurement data that is measured by these sensors 11 to 13 to the external fitting apparatus 2 is also mounted in the sensor unit 1. Note that, in the present embodiment, the communication device 10 is a wireless communication device so as to not impede the swing action, but may be configured to be connected to the fitting apparatus 2 via a cable in a wired manner.

The acceleration sensor 11 the angular velocity sensor 12, and the geomagnetic sensor 13 respectively measure grip acceleration, grip angular velocity and grip geomagnetism in an xyz local coordinate system that is based on the grip 42. More specifically, the acceleration sensor 11 measures grip accelerations $a_x$, $a_y$ and $a_z$ in the x-axis, y-axis and z-axis directions. The angular velocity sensor 12 measures grip angular velocities $\omega_x$, $\omega_y$ and $\omega_z$ about the x-axis, the y-axis, and the z-axis. The geomagnetic sensor 13 measures grip geomagnetisms $m_x$, $m_y$ and $m_z$ in the x-axis, y-axis and z-axis directions. These measurement data sets are acquired as time-series data at a predetermined sampling period $\Delta t$. Note that the xyz local coordinate system is a three-axis orthogonal coordinate system defined as shown in FIG. 3. That is, the z-axis coincides with the direction in which the shaft 40 extends, and the direction from the head 41 toward the grip 42 is the z-axis positive direction. The x-axis is oriented so as to be aligned as closely as possible with the toe-heel direction of the head 41, and the y-axis is oriented so as to be aligned as closely as possible with the normal direction of the face of the head 41.

In the present embodiment, the measurement data measured by the acceleration sensor 11, the angular velocity sensor 12, and the geomagnetic sensor 13 is transmitted to the fitting apparatus 2 via the communication device 10 in real time. However, a configuration may, for example, be adopted in which the measurement data is stored in a storage device within the sensor unit 1, and, after the end of the swing action, the measurement data is retrieved from the storage device and delivered to the fitting apparatus 2.

1-1-2. Configuration of Fitting Apparatus

The configuration of the fitting apparatus 2 will be described with reference to FIG. 2. The fitting apparatus 2 is manufactured by installing a fitting program 3 according to the present embodiment that is stored in a computer-readable recording medium 20 such as a CD-ROM or a USB memory on a general-purpose personal computer from the recording medium 20. The fitting program 3 is software for analyzing a swing action based on measurement data sent from the sensor unit 1, and outputting information that assists the selection of golf clubs 4 suited to the golfer 7. The fitting program 3 causes the fitting apparatus 2 to execute operations which will be described later.

The fitting apparatus 2 is provided with a display unit 21, an input unit 22, a storage unit 23, a control unit 24, and a communication unit 25. These units 21 to 25 are connected via a bus line 26, and can communicate with each other. In the present embodiment, the display unit 21 is constituted by a liquid crystal display or the like, and displays information which will be described later to a user. Note that a user as referred to here is a general term for persons that require fitting results such as the golfer 7 or his or her instructor. Also, the input unit 22 can be constituted by a mouse, a keyboard, a touch panel or the like, and accept operations to the fitting apparatus 2 from the user. The communication unit 25 is a communication interface that enables communication between the fitting apparatus 2 and an external apparatus, and receives data from the sensor unit 1.

The storage unit 23 is constituted by a non-volatile storage device such as a hard disk. Measurement data sent from the sensor unit 1 is saved to the storage unit 23, in addition to the fitting program 3 being stored therein. Also, correspondence data 28, a head database (DB) 27, and a shaft database (DB) 29 are stored in the storage unit 23. The correspondence data 28, as will be described later in detail, is data defined for each of various models (series) of the golf club 4, and indicates conditions for determining the optimal swingability index. In a similar manner, as will be described later in detail, the head DB 27 is a database in which information indicating specifications of a large number of heads 41 is stored in association with information for specifying the types of the heads 41. The shaft DB 29 is a database in which information indicating specifications a large number of shafts 40 is stored in association with information for specifying the types of the shafts 40. In the shaft DB 29, for example, data of more than 100 types of shafts 40 is stored.

The control unit 24 can be constituted by a CPU, a ROM, a RAM, and the like. The control unit 24 operates in a virtual manner as an acquisition unit 24A, a grip behavior derivation unit 24B, a shoulder behavior derivation unit 24C, a calculation unit 24D, a determination unit 24E, a selection unit 24F, and a display control unit 24G, by reading out and executing the fitting program 3 stored in the storage unit 23. The operations of each of the units 24A to 24G will be described later in detail.

1-2. Fitting Processing

Figure 4:
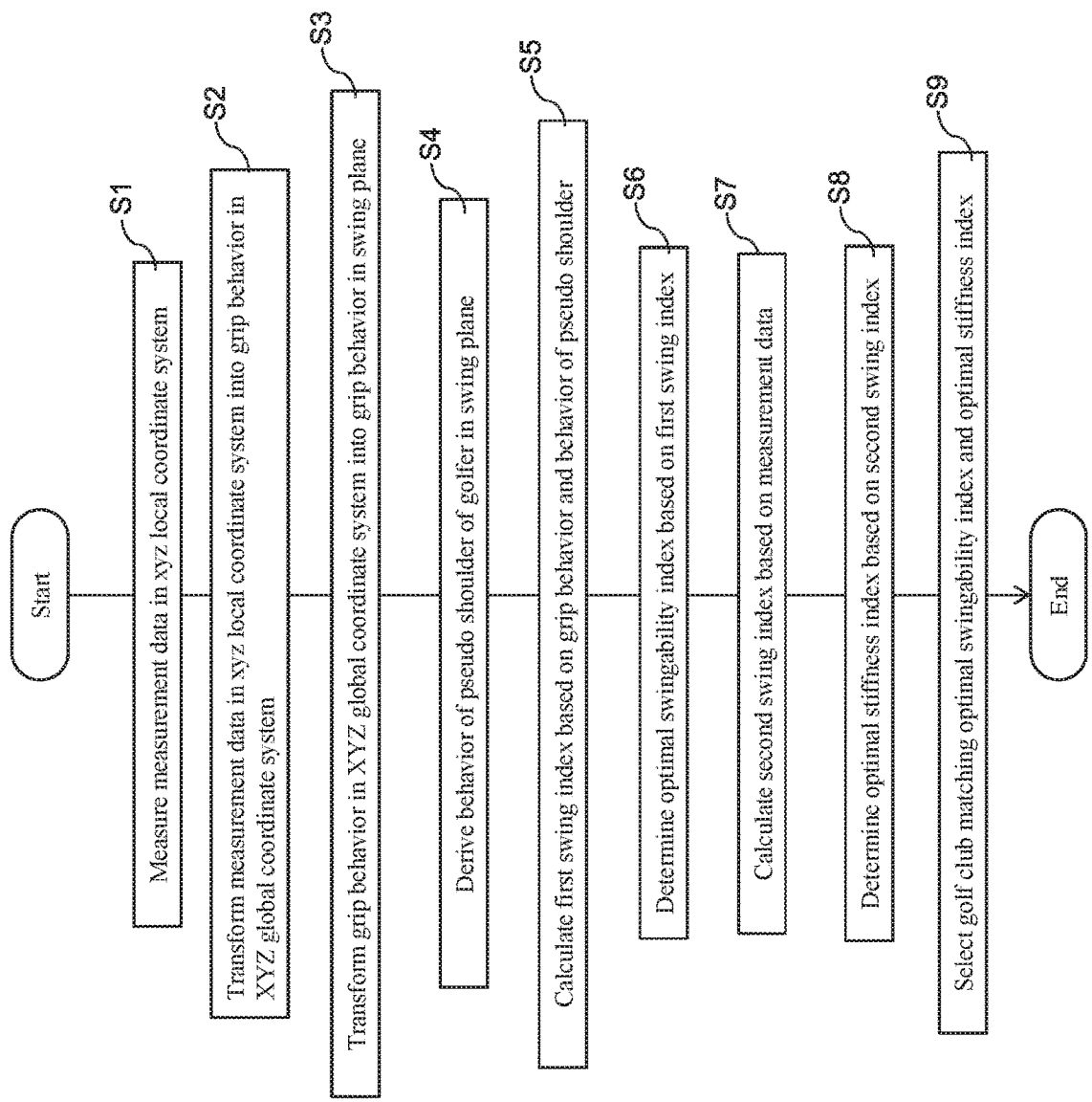
FIG. 4 is a flowchart showing the flow of fitting processing.

Next, fitting processing performed by the fitting system 100 will be described. The fitting processing according to the present embodiment is, as is shown in FIG. 4, constituted by the following nine processes (S1 to S9):

(S1) a measurement process of measuring measurement data of grip accelerations $a_x$, $a_y$, and $a_z$, grip angular velocities $\omega_x$, $\omega_y$, and $\omega_z$, and grip geomagnetisms $m_x$, $m_y$ and $m_z$ in an xyz local coordinate system;

(S2) a first transformation process of transforming the measurement data in the xyz local coordinate system obtained with the measurement process into grip accelerations $a_X$, $a_Y$ and $a_Z$ and grip angular velocities $\omega_X$, $\omega_Y$ and $\omega_Z$ in an XYZ global coordinate system (in the first transformation process, grip velocities $v_X$, $v_Y$ and $v_Z$ in the XYZ global coordinate system are also derived);

(S3) a second transformation process of transforming the behavior of the grip 42 in the XYZ global coordinate system (grip angular velocities $\omega_X$, $\omega_Y$, $\omega_Z$ and grip velocities $v_X$, $v_Y$ and $v_Z$) into the behavior of the grip 42 in swing plane P (described later);

(S4) a shoulder behavior derivation process of deriving the behavior of a pseudo shoulder of the golfer 7 in swing plane P, based on the behavior of the grip 42 in swing plane P;

(S5) a first index calculation process of calculating a first swing index (in the present embodiment, arm output power $P_{1\_AVE}$, club input power $P_{2\_AVE}$, and head velocity $V_h$ which will be described later), based on the behavior of the grip 42 and the behavior of the a pseudo shoulder in swing plane P;

(S6) an optimal swingability determination process of determining an optimal swingability index (in the present embodiment, optimal swing MI), which is a swingability index suited to the golfer 7 (in the present embodiment, swing moment of inertia $I_S$ which will be described later), based on the first swing index;

(S7) a second index calculation process of calculating a second swing index (in the present embodiment, first to fourth feature amounts $F_1$ to $F_4$ which will be described later), based on the measurement data;

(S8) an optimal stiffness determination process of determining an optimal stiffness index (in the present embodiment, EI distribution which will be described later) representing the stiffness of the shaft 40 suited to the golfer 7, based on the second swing index; and (S9) an optimal club selection process of selecting the golf club 4, in particular, the shaft 40 matching the optimal swingability index and the optimal stiffness index.

Hereinafter, these processes will be described in the above order.

Note that the XYZ global coordinate system is a three-axis orthogonal coordinate system defined as shown in FIG. 1. That is, the Z-axis extends vertically upward from below, the X-axis extends from the back of the golfer 7 toward his or her abdomen, and the Y-axis extends in a direction from the ball hitting point toward the target point in parallel to a horizontal plane.

1-2-1. Measurement Process

In the measurement process (S1), the golfer 7 swings the golf club 4 having the abovementioned sensor unit 1 attached. The golf club 4 swung in the measurement process is one of two test clubs. These test clubs are different types of golf clubs, and, in the present embodiment, one is golf club having pro specifications (hereinafter, pro model club), and the other is a golf club suited to an average player (hereinafter, average model club). Also, in the present embodiment, the pro model club is heavier than the average model club. Which of the test clubs is swung in the measurement process is decided based on factors such as the preference and experience of the golfer 7.

Note that, in order to improve the fitting precision, if the length of the user's usual club is different from the length of golf clubs based on the shafts registered in the shaft DB 29, the total weight of the test club is changed to the club total weight corresponding to the length of the usual club. Accordingly, a shaft that matches the user can be selected. For example, if all club lengths stored in the shaft DB 29 are 45 inches (=1143 mm) and a length A (mm) of the user's usual club is not 45 inches, fitting is performed after the total weight of the test club is changed to a value (total weight corresponding to 45 inches) calculated in accordance with the equation below.

(Test club total weight)=(A−1143)×0.377+(club total weight of usual club)

Next, the measurement data of grip accelerations $a_x$, $a_y$, and $a_z$, grip angular velocities $\omega_x$, $\omega_y$ and $\omega_z$, and grip geomagnetisms $m_x$, $m_y$ and $m_z$ during the swing action of a golf club 4 such as the above are measured by the sensor unit 1. This measurement data is transmitted to the fitting apparatus 2 via the communication device 10 of the sensor unit 1. On the other hand, in the fitting apparatus 2, the acquisition unit 24A receives the measurement data via the communication unit 25, and stores the received measurement data in the storage unit 23. In the present embodiment, time-series measurement data at least from address to impact is measured.

Figure 5D:
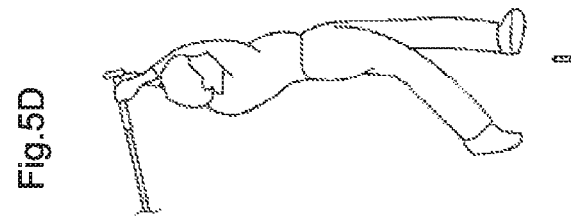
FIG. 5D is a diagram showing a finish state.
Figure 5C:
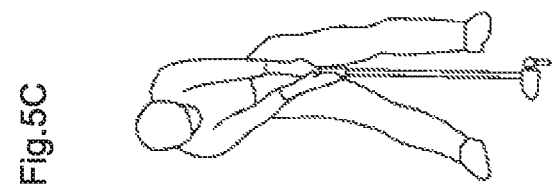
FIG. 5C is a diagram showing an impact state.
Figure 5B:
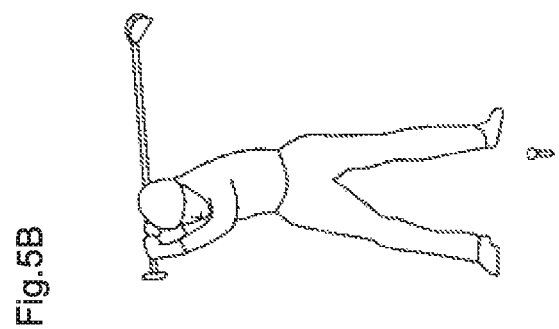
FIG. 5B is a diagram showing a top state.
Figure 5A:
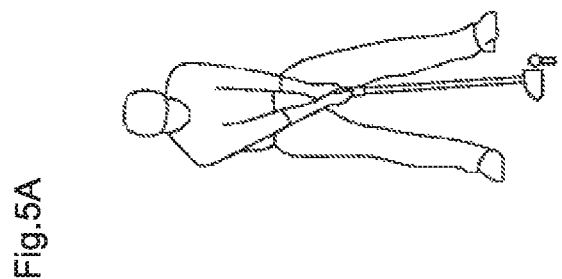
FIG. 5A is a diagram showing an address state.

Note that generally the swing action of a golf club proceeds in order of address, top, impact, and finish. The address refers to an initial state where the head 41 of the golf club 4 is disposed near the ball, as shown in FIG. 5A, and the top refers to a state where the head 41 is swung up to its highest position after the golf club 4 is taken away from address, as shown in FIG. 5B. The impact refers to a state at the moment where the head 41 impacts the ball after the golf club 4 is swung down from the top (downswing), as shown in FIG. 5C, and the finish refers to a state where the golf club 4 is swung through to the front after the impact, as shown in FIG. 5D.

In the measurement process, multiple practice hits are preferably taken with the golf club 4, with five or more practice hits preferably being taken. In this case, the average value of the measurement data can be calculated and used in subsequent operations. Also, in order to remove abnormal values caused by miss hits, measurement errors or the like, a configuration may be adopted in which standard deviation σ of the measurement data is calculated, and, if not all measurement data sets are within the range of average value±k·σ (k is a constant), a message seeking additional measurement or remeasurement is then displayed on the display unit 21. Note that a configuration may be adopted in which, rather than the average value of the measurement data itself, the average value of processing values (e.g., arm output power $P_{1\_AVE}$, club input power $P_{2\_AVE}$, and head velocity $V_h$ described later) calculated based on the measurement data is calculated. A check on the reliability of data based on standard deviation σ can also be performed in the case of calculating the average value of processing values.

1-2-2. First Transformation Process

Figure 6:
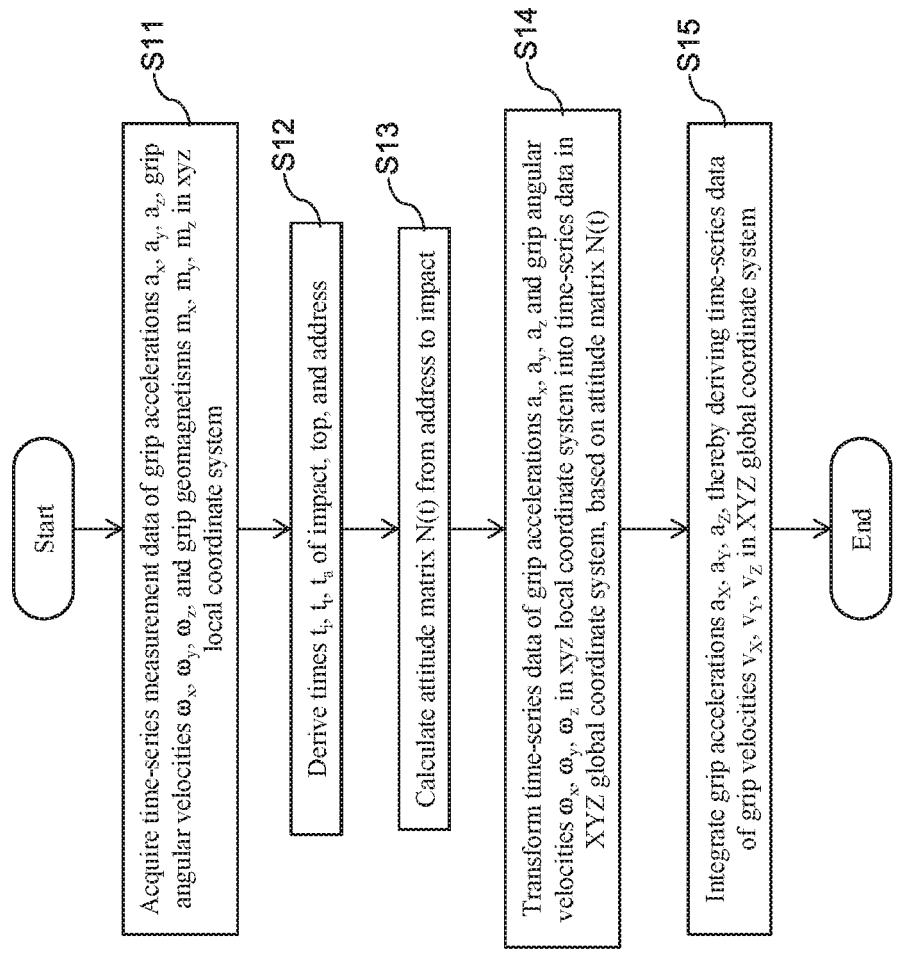
FIG. 6 is a flowchart showing the flow of first transformation processing.

Hereinafter, the first transformation process (S2) of transforming the measurement data in the xyz local coordinate system into values in the XYZ global coordinate system will be described, with reference to FIG. 6. Specifically, first, the acquisition unit 24A reads out the time-series measurement data of grip accelerations $a_x$, $a_y$ and $a_z$, grip angular velocities $\omega_x$, $\omega_y$ and $\omega_z$, and grip geomagnetisms $m_x$, $m_y$ and $m_z$ in the xyz local coordinate system that are stored in the storage unit 23 (step S11).

Next, based on the time-series measurement data in the xyz local coordinate system read in step S11, the grip behavior derivation unit 24B derives times $t_i$, $t_t$ and $t_a$ of the impact, top and address (step S12). Various methods for deriving the times $t_i$, $t_t$ and $t_a$ are known, and thus a detailed description thereof has been omitted.

In the following step S13, the grip behavior derivation unit 24B calculates attitude matrix N(t) at time t from address to impact. Here, assume that the attitude matrix is represented by the equation below. Attitude matrix N(t) is for transforming the XYZ global coordinate system at time t into the xyz local coordinate system.

$$N(t) = \begin{pmatrix} a & b & c \\ d & e & f \\ g & h & i \end{pmatrix}^T \qquad \text{Equation 1}$$

The nine components of attitude matrix N(t) are as follows.

Component a: the cosine of the angle formed by the X-axis of the global coordinate system and the x-axis of the local coordinate system Component b: the cosine of the angle formed by the Y-axis of the global coordinate system and the x-axis of the local coordinate system Component c: the cosine of the angle formed by the Z-axis of the global coordinate system and the x-axis of the local coordinate system Component d: the cosine of the angle formed by the X-axis of the global coordinate system and the y-axis of the local coordinate system Component e: the cosine of the angle formed by the Y-axis of the global coordinate system and the y-axis of the local coordinate system Component f: the cosine of the angle formed by the Z-axis of the global coordinate system and the y-axis of the local coordinate system Component g: the cosine of the angle formed by the X-axis of the global coordinate system and the z-axis of the local coordinate system Component h: the cosine of the angle formed by the Y-axis of the global coordinate system and the z-axis of the local coordinate system Component i: the cosine of the angle formed by the Z-axis of the global coordinate system and the z-axis of the local coordinate system Here, a vector (a, b, c) represents the unit vector in the x-axis direction, a vector (d, e, f) represents the unit vector in the y-axis direction, and a vector (g, h, i) represents the unit vector in the z-axis direction.

Also, attitude matrix N(t) can be represented by the equation below in accordance with the thinking of the Z-Y-Z system of Euler angles. Note that $\varphi$, $\theta$ and $\psi$ are the angles of rotation respectively about the Z-axis, the Y-axis, and the Z-axis.

$$N(t) = \begin{bmatrix} \cos\phi\cos\theta\cos\varphi - \sin\phi\sin\varphi & -\cos\phi\cos\theta\sin\varphi - \sin\phi\cos\varphi & \cos\phi\sin\theta \\ \sin\phi\cos\theta\cos\varphi + \cos\phi\sin\varphi & -\sin\phi\cos\theta\sin\varphi + \cos\phi\cos\varphi & \sin\phi\sin\theta \\ -\sin\theta\cos\varphi & \sin\theta\sin\varphi & \cos\theta \end{bmatrix} \qquad \text{Equation 2}$$

In calculating attitude matrix N(t) from address to impact, first, attitude matrix N($t_a$) at address time $t_a$ is calculated. Specifically, $\varphi$ and $\theta$ at the time of address are calculated, in accordance with the equations below. Note that the equations below utilize the fact that, at the time of address, the golf club 4 is stationary and only gravity in the vertical direction is detected by the acceleration sensor 11. Grip accelerations $a_x$, $a_y$ and $a_z$ in the equations below are values at the time of address.

$$\phi = \tan^{-1}\left(\frac{a_y}{a_x}\right) \qquad \text{Equation 3}$$

$$\theta = \tan^{-1}\left(\frac{\sqrt{a_x^2 + a_y^2}}{a_z}\right) \qquad \text{Equation 4}$$

Next, $\psi$ at the time of address is calculated in accordance with the equation below.

$$\varphi = \tan^{-1}\left(\frac{-m_{yi}}{m_{xi}}\right) \qquad \text{Equation 5}$$

Note that the values of $m_{xi}$ and $m_{yi}$ in the above equation are calculated in accordance with the equation below. Also, grip geomagnetisms $m_x$, $m_y$ and $m_z$ in the equation below are values at the time of address.

$$\begin{bmatrix} m_{xi} \\ m_{yi} \\ m_{zi} \end{bmatrix} = \begin{bmatrix} \cos\theta\cos\phi & -\cos\theta\sin\phi & \sin\theta \\ \sin\phi & \cos\phi & 0 \\ -\sin\theta\cos\phi & \sin\theta\sin\phi & \cos\theta \end{bmatrix} \begin{bmatrix} m_x \\ m_y \\ m_z \end{bmatrix} \qquad \text{Equation 6}$$

As described above, $\varphi$, $\theta$ and $\psi$ at the time of address are calculated based on grip accelerations $a_x$, $a_y$ and $a_z$ and grip geomagnetisms $m_x$, $m_y$ and $m_z$ in the xyz local coordinate system. Attitude matrix $N(t_a)$ at the time of address is calculated by substituting the values of φ, θ and ψ into Equation 2.

Next, attitude matrix $N(t)$ from address to impact is calculated by updating attitude matrix $N(t_a)$ at the time of address momentarily at intervals of sampling period Δt. In specific terms, first, attitude matrix $N(t)$ is represented by the equation below, using the four variables $q_1$, $q_2$, $q_3$ and $q_4$ ($q_4$ being the scalar part) of a quaternion.

$$N(t) = \begin{pmatrix} q_1^2 - q_2^2 - q_3^2 + q_4^2 & 2(q_3q_4 + q_1q_2) & 2(q_1q_3 - q_2q_4) \\ 2(q_1q_2 - q_3q_4) & -q_1^2 + q_2^2 - q_3^2 + q_4^2 & 2(q_1q_4 + q_2q_3) \\ 2(q_2q_3 + q_1q_3) & 2(q_2q_3 - q_1q_4) & -q_1^2 - q_2^2 + q_3^2 + q_4^2 \end{pmatrix}$$

Equation 7

Accordingly, the four variables $q_1$, $q_2$, $q_3$ and $q_4$ of the quaternion can be calculated from Equation 1 and Equation 7, in accordance with the equation below.

$$q_4 = \pm \tfrac{1}{2}\sqrt{1 + a + e + i}$$

$$q_1 = (h - f)/4q_4$$

$$q_2 = (c - g)/4q_4$$

$$q_3 = (d - b)/4q_4$$

Equation 8

Here, the values of a to i defining attitude matrix $N(t_a)$ at the time of address are known. Therefore, first, the four variables $q_1$, $q_2$, $q_3$ and $q_4$ of the quaternion at the time of address are calculated, in accordance with the above equation.

Quaternion q' after a short amount of time has elapsed from time t is then represented by the equation below using quaternion q at time t.

$$q' = q dq$$

$$dq = \int \frac{d}{dt} q\, dt$$

Equation 9

Also, a first order differential equation representing the time variation of the four variables $q_1$, $q_2$, $q_3$ and $q_4$ of the quaternion is represented by the equation below.

$$\frac{d}{dt}\begin{pmatrix} q_1 \\ q_2 \\ q_3 \\ q_4 \end{pmatrix} = \frac{1}{2}\begin{pmatrix} 0 & \omega_z & -\omega_y & \omega_x \\ -\omega_z & 0 & \omega_x & \omega_y \\ \omega_y & -\omega_x & 0 & \omega_z \\ -\omega_x & -\omega_y & -\omega_z & 0 \end{pmatrix}\begin{pmatrix} q_1 \\ q_2 \\ q_3 \\ q_4 \end{pmatrix}$$

Equation 10

The quaternion at time t can be sequentially updated to a quaternion at the following time t+Δt by using Equations 9 and 10. Here, the quaternions from address to impact are calculated. Attitude matrix $N(t)$ from address to impact is calculated by sequentially substituting the four variables $q_1$, $q_2$, $q_3$ and $q_4$ of the quaternions from address to impact into Equation 7.

Next, in step S14, the grip behavior derivation unit 24B transforms the time-series data of grip accelerations $a_x$, $a_y$ and $a_z$ and grip angular velocities $\omega_x$, $\omega_y$ and $\omega_z$ in the xyz local coordinate system from address to impact into time-series data in the XYZ global coordinate system, based on attitude matrix $N(t)$ from address to impact. Grip accelerations $a_X$, $a_Y$ and $a_Z$ and grip angular velocities $\omega_X$, $\omega_Y$ and $\omega_Z$ after transformation are calculated in accordance with the equation below.

$$(a_X a_Y a_Z)^T = [N(t)]^T (a_x a_y a_z)^T$$

$$(\omega_X \omega_Y \omega_Z)^T = [N(t)]^T (\omega_x \omega_y \omega_z)^T$$

Equation 11

In the following step S15, the grip behavior derivation unit 24B derives grip velocities $v_X$, $v_Y$ and $v_Z$ in the XYZ global coordinate system from address to impact, by integrating the time-series data of grip accelerations $a_X$, $a_Y$ and $a_Z$. At this time, offsetting is preferably performed so that grip velocities $V_X$, $V_Y$ and $v_Z$ from address to impact will be 0 m/s at the top.

1-2-3. Second Transformation Process

Hereinafter, the second transformation process (S3) of transforming the behavior of the grip 42 in the XYZ global coordinate system calculated in the first transformation process into the behavior of the grip 42 in swing plane P will be described. In the present embodiment, swing plane P is defined as a plane that includes the origin of the XYZ global coordinate system and is parallel to the Y-axis and the shaft 40 at the time of impact (see FIG. 7). In the second transformation process, the grip behavior derivation unit 24B calculates grip velocities $v_{pX}$, $v_{pY}$ and $v_{pZ}$ and grip angular velocities $\omega_{pX}$, $\omega_{pY}$ and $\omega_{pZ}$ obtained by projecting grip velocities $v_X$, $V_Y$ and $v_Z$ and grip angular velocities $\omega_X$, $\omega_Y$ and $\omega_Z$ in the XYZ global coordinate system onto swing plane P.

Specifically, time-series data of the slope of the shaft 40 as viewed from the X-axis positive direction (the golfer 7 as viewed from the front) is calculated, based on the z-axis vector (g, h, i) that is included in attitude matrix $N(t)$ and represents the direction in which the shaft 40 extends. The time at which the shaft 40 becomes parallel to the Z-axis as viewed from the X-axis positive direction is then specified based on this time-series data, and the specified time is set as impact time $t_i$. Note that impact time $t_i$ referred to here does not necessarily coincide with the aforementioned impact time $t_i$. Next, the slope of the shaft 40 as viewed from the Y-axis negative direction is calculated, based on the z-axis vector (g, h, i) that is included in attitude matrix $N(t_i)$ at this impact time $t_i$. That is, angle α' that is formed by the shaft 40 and the X-axis as viewed from Y-axis negative direction at the time of impact is calculated, and the calculated angle α' is set as the swing plane angle.

When swing plane angle α' has been derived, a projective transformation matrix A for projecting an arbitrary point in the XYZ global coordinate system onto swing plane P using the derived swing plane angle α' can be calculated as follows. Note that α=90°−α'.

$$A = \begin{bmatrix} \cos\alpha & 0 & \sin\alpha \\ 0 & 1 & 0 \\ -\sin\alpha & 0 & \cos\alpha \end{bmatrix}$$

Equation 12

Here, the time-series data of grip velocities $v_{pX}$, $v_{pY}$ and $v_{pZ}$ and grip angular velocities $\omega_{pX}$, $\omega_{pY}$ and $\omega_{pZ}$ after projective transformation from address to impact are calculated, in accordance with the equation below, based on the above projective transformation matrix A.

$$\begin{bmatrix} v_{pX} \\ v_{pY} \\ v_{pZ} \end{bmatrix} = \begin{bmatrix} \cos\alpha & 0 & \sin\alpha \\ 0 & 1 & 0 \\ -\sin\alpha & 0 & \cos\alpha \end{bmatrix} \begin{bmatrix} v_X \\ v_Y \\ v_Z \end{bmatrix} = \begin{bmatrix} \cos\alpha \cdot v_X + \sin\alpha \cdot v_Z \\ v_Y \\ -\sin\alpha \cdot v_X + \cos\alpha \cdot v_Z \end{bmatrix} \quad \text{Equation 13}$$

$$\begin{bmatrix} \omega_{pX} \\ \omega_{pY} \\ \omega_{pZ} \end{bmatrix} = \begin{bmatrix} \cos\alpha & 0 & \sin\alpha \\ 0 & 1 & 0 \\ -\sin\alpha & 0 & \cos\alpha \end{bmatrix} \begin{bmatrix} \omega_X \\ \omega_Y \\ \omega_Z \end{bmatrix} = \begin{bmatrix} \cos\alpha \cdot \omega_X + \sin\alpha \cdot \omega_Z \\ \omega_Y \\ -\sin\alpha \cdot \omega_X + \cos\alpha \cdot \omega_Z \end{bmatrix}$$

Note that the grip velocities ($v_{pY}$, $v_{pZ}$) that are obtained by the above operations represent the grip velocities (vectors) in swing plane P, and grip angular velocity $\omega_{pX}$ represents the angular velocity about the axis perpendicular to swing plane P. Here, the grip velocity (scalar) in swing plane P from address to impact is calculated in accordance with the equation below.

$$V_{GE} = \sqrt{(v_{pY})^2 + (v_{pZ})^2} \quad \text{Equation 14}$$

Also, here, the slope of the shaft 40 at the top in swing plane P, which is required in subsequent calculations, is also calculated. Specifically, first, the z-axis vector (g, h, i) that is included in attitude matrix N($t_t$) at the top is projected onto swing plane P in accordance with the equation below, using the projective transformation matrix A. Note that the vector after projection is given as (g', h', i').

$$\begin{bmatrix} g' \\ h' \\ i' \end{bmatrix} = \begin{bmatrix} \cos\alpha & 0 & \sin\alpha \\ 0 & 1 & 0 \\ -\sin\alpha & 0 & \cos\alpha \end{bmatrix} \begin{bmatrix} g \\ h \\ i \end{bmatrix} = \begin{bmatrix} \cos\alpha \cdot g + \sin\alpha \cdot i \\ h \\ -\sin\alpha \cdot g + \cos\alpha \cdot i \end{bmatrix} \quad \text{Equation 15}$$

The vector (h', i') that is specified by the above equation is a vector representing the slope of the shaft 40 at the top in swing plane P. Accordingly, the slope β of the shaft 40 at the top in swing plane P is calculated by substituting the above calculation results into the equation below.

$$\beta = \tan^{-1}\frac{i'}{h'} = \tan^{-1}\frac{-\sin\alpha \cdot g + \cos\alpha \cdot i}{h} \quad \text{Equation 16}$$

1-2-4. Shoulder Behavior Derivation Process

Figure 8:
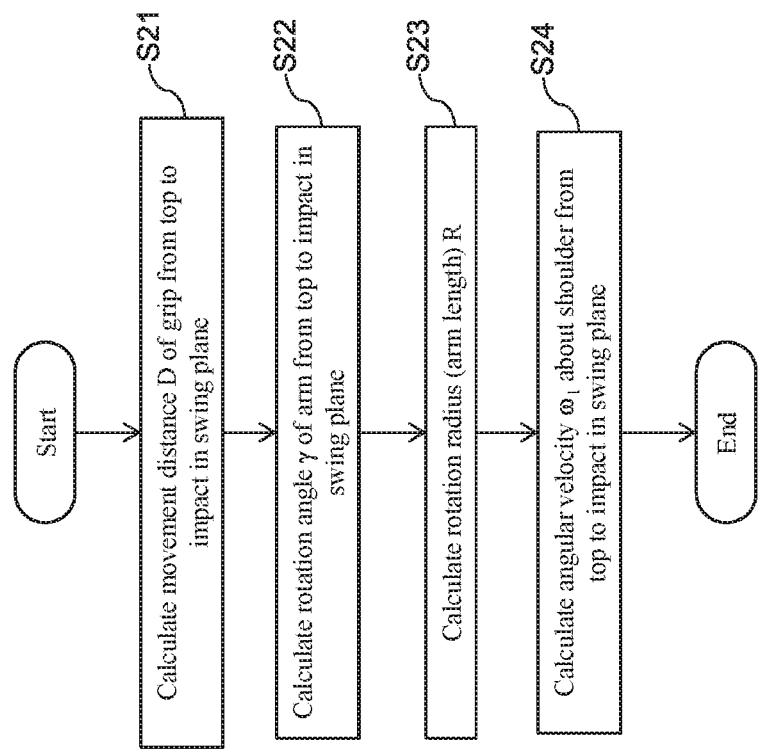
FIG. 8 is a flowchart showing the flow of a shoulder behavior derivation process.

Hereinafter, the shoulder behavior derivation process (S4) of deriving the behavior of a pseudo shoulder in swing plane P based on the behavior of the grip (grip velocity $V_{GE}$ and grip angular velocity $\omega_{pX}$) in swing plane P will be described, with reference to FIG. 8. In the present embodiment, the behavior of the golf club 4 is analyzed based on a double pendulum model that takes the shoulder of the golfer 7 and the grip 42 (or the wrists of the golfer holding the grip 42) as nodes, and takes the arm of the golfer 7 and the golf club 4 as links. Note that the behavior of the shoulder is derived as the behavior of a pseudo shoulder based on the measured behavior of the grip, rather than by directly measuring the behavior of the shoulder. Hereinafter, unless stated otherwise, any reference to merely the "shoulder" is assumed to mean this pseudo shoulder. The same applies to a pseudo "arm", which are defined as extending linearly between the pseudo shoulder and the grip 42 (wrists).

Figure 9:
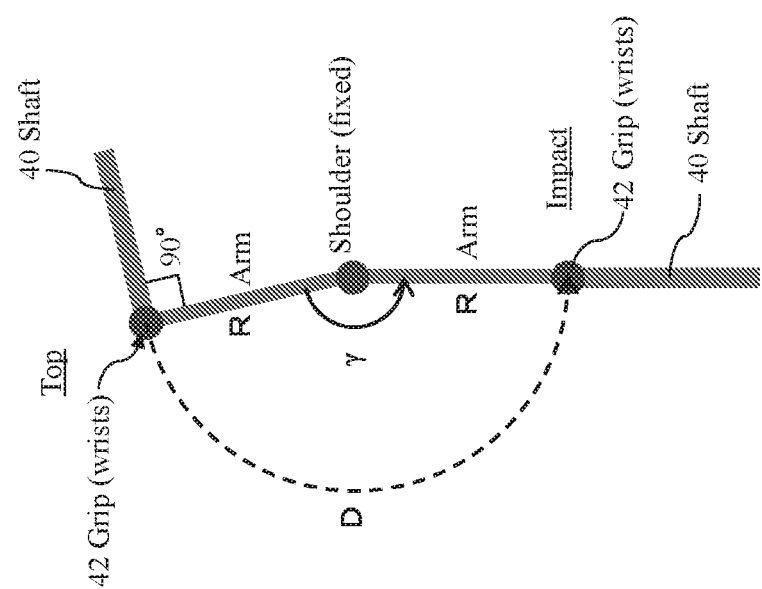
FIG. 9 is a diagram conceptually illustrating a double pendulum model.

In specifying the behavior of the shoulder from the behavior of the grip, the double pendulum model according to the present embodiment is premised on the following (1) to (5). FIG. 9 is a diagram conceptually illustrating the following preconditions.

(1) In swing plane P, the grip 42 (wrists) circulates about the shoulder.
(2) In swing plane P, a distance (radius) R between the shoulder and the grip 42 is constant.
(3) The shoulder (rotates but) does not move during the swing action.
(4) In swing plane P, the angle formed by the arm and the golf club 4 at top is 90 degrees.
(5) The arm at the time of impact faces down in the z-axis direction as viewed from the X-axis positive direction.

Under the above premises, the shoulder behavior derivation unit 24C calculates movement distance D of the grip 42 from top to impact in swing plane P (step S21). Movement distance D is derived by integrating grip velocity $V_{GE}$ from top to impact.

Next, the shoulder behavior derivation unit 24C calculates rotation angle γ of the arm from top to impact in swing plane P (step S22). Rotation angle γ is calculated based on the slope β of the shaft 40 at the top calculated in the second transformation process. Next, the shoulder behavior derivation unit 24C calculates radius R=D/γ (step S23).

The shoulder behavior derivation unit 24C then calculates the angular velocity (angular velocity of the arm) $\omega_1$ about the shoulder from top to impact in swing plane P as the behavior of the shoulder, in accordance with the equation below (step S24). That is, angular velocity $\omega_1$ of the arm will be a value that reflects the measured grip velocity $V_{GE}$.

$$\omega_1 = V_{GE}/R$$

1-2-5. First Index Calculation Process

Figure 10:
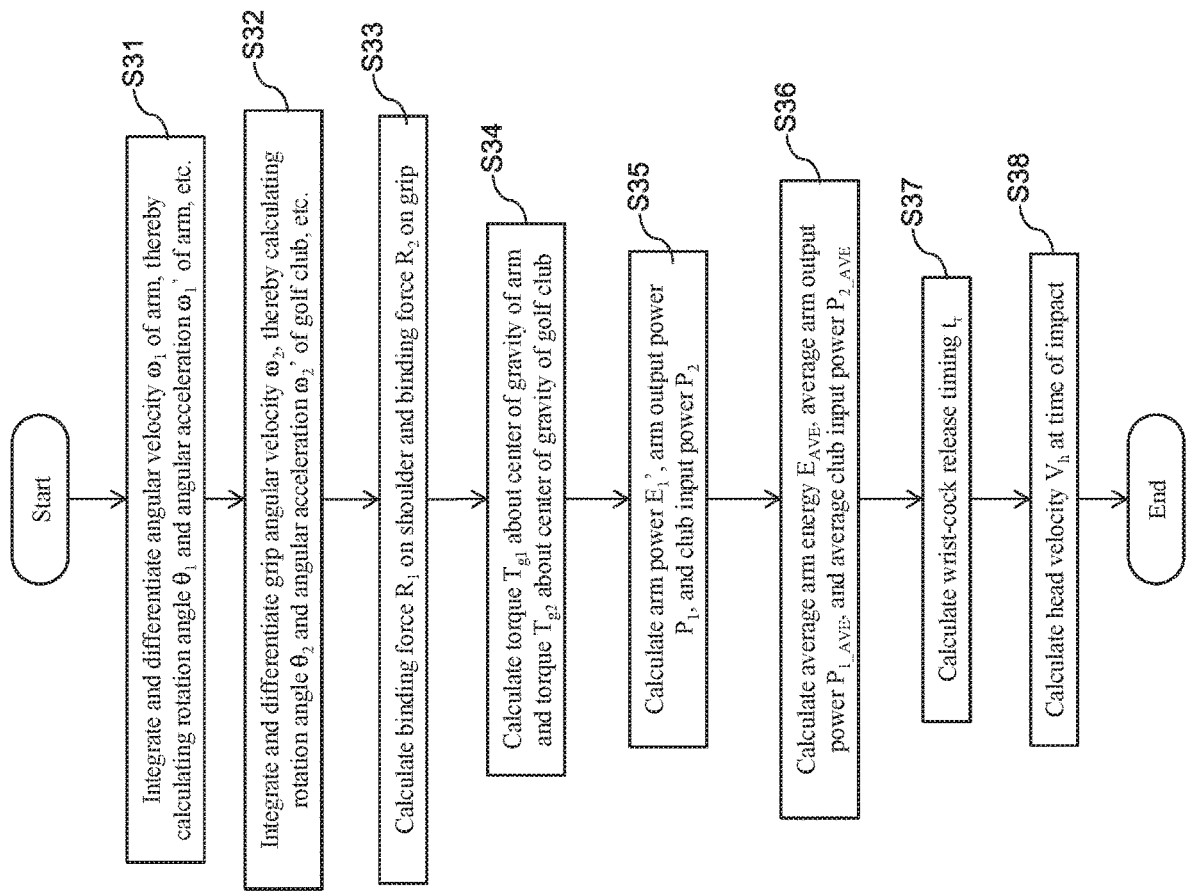
FIG. 10 is a flowchart showing the flow of a first index calculation process.

Hereinafter, the first index calculation process (S5) of calculating a first swing index based on the behavior of the grip 42 and the behavior of the shoulder will be described with reference to FIG. 10. The first swing index is a feature amount representing a feature of the swing action by the golfer 7, for determining an optimal swingability index. In the present embodiment, arm output power $P_{1\_AVE}$, club input power $P_{2\_AVE}$, and head velocity $V_h$ which will be described later are calculated as first swing indices.

Figure 11:
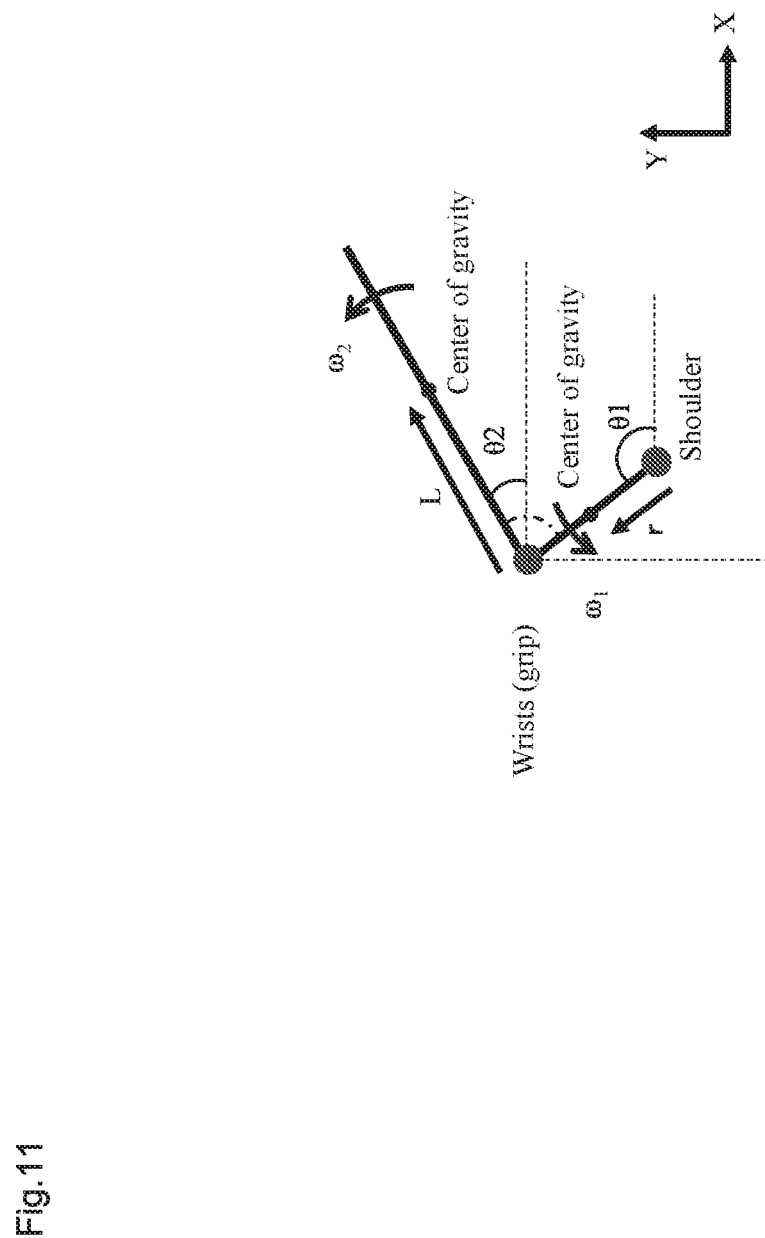
FIG. 11 is another diagram conceptually illustrating a double pendulum model.

Specifically, first, in step S31, the shoulder behavior derivation unit 24C integrates angular velocity $\omega_1$ of the arm from top to impact, thereby calculating a rotation angle $\theta_1$ of the arm from top to impact. At this time, trapezoidal integration is preferably used. Note that rotation angle $\theta_1$ is defined as shown in FIG. 11, and the plane in FIG. 11 is equal to swing plane P. Hereinafter, analysis proceeds based on the new XY coordinate system in swing plane P shown in FIG. 11. The X-axis of the new XY coordinate system in swing plane P is equal to the Y-axis of the abovementioned XYZ global coordinate system, and the Y-axis of the new XY coordinate system is an axis that results from the Z-axis of the XYZ coordinate system being projected in swing plane P.

Also, the shoulder behavior derivation unit 24C differentiates angular velocity $\omega_1$ of the arm from top to impact, thereby calculating the angular acceleration $\omega_1'$ from top to impact. Next, the shoulder behavior derivation unit 24C calculates the position ($X_1$, $Y_1$), the velocity ($V_{X1}$, $V_{Y1}$) and the acceleration ($A_{X1}$, $A_{Y1}$) of the center of gravity of the arm from top to impact. These values are calculated by substituting the abovementioned calculation results into the equation below.

$X_1 = r \cos \theta_1$ $Y_1 = r \sin \theta_1$ $V_{X1} = -r\omega_1 \sin \theta_1$ $V_{Y1} = r\omega_1 \cos \theta_1$ $A_{X1} = -r\omega_1' \sin \theta_1 - r\omega_1^2 \cos \theta_1$ $A_{Y1} = r\omega_1' \cos \theta_1 - r\omega_1^2 \sin \theta_1$ \hfill Equation 17

Note that r is the distance from the shoulder to the center of gravity of the arm. In the present embodiment, the center of gravity of the arm is assumed to be in the center of the arm. Accordingly, R=2r.

Next, in step S32, the grip behavior derivation unit 24B also performs a similar operation to step S31 with respect to the area around the grip 42. That is, grip angular velocity $\omega_{pX}$ from top to impact, i.e., angular velocity $\omega_2$ of the golf club 4 about the grip 42 from top to impact is integrated, and a rotation angle $\theta_2$ of the golf club 4 (shaft 40) about the grip 42 from top to impact is calculated. Trapezoidal integration is also preferably used at this time, and the rotation angle $\theta_2$ is defined as shown in FIG. 11.

Next, the grip behavior derivation unit 24B differentiates angular velocity $\omega_2$ of the golf club 4 from top to impact, thereby calculating angular acceleration $\omega_2'$ from top to impact. Next, the grip behavior derivation unit 24B calculates the position ($X_2$, $Y_2$), the speed ($V_{X2}$, $V_{Y2}$) and the acceleration ($A_{X2}$, $A_{Y2}$) of the center of gravity of the golf club 4 from top to impact. These values are calculated by substituting the abovementioned calculation results into the equation below.

$X_2 = 2X_1 + L \cos \theta_2$ $Y_2 = 2Y_1 + L \sin \theta_2$ $V_{X2} = 2V_{X1} - L\omega_2 \sin \theta_2$ $V_{Y2} = 2V_{Y1} + L\omega_2 \cos \theta_2$ $A_{X2} = 2A_{X1} - L\omega_2' \sin \theta_2 - L\omega_2^2 \cos \theta_2$ $A_{Y2} = 2A_{Y1} + L\omega_2' \cos \theta_2 - L\omega_2^2 \sin \theta_2$ \hfill Equation 18

Note that L is the distance from the grip 42 to the center of gravity of the golf club 4. The value of L is a specification of the golf club 4, and is assumed to have been determined in advance.

Next, in step S33, the calculation unit 24D calculates binding force $R_1 = (R_{X1}, R_{Y1})$ on the shoulder from top to impact and binding force $R_2 = (R_{X2}, R_{Y2})$ on the grip 42 from top to impact, by substituting the abovementioned calculation results into the equation below. The equation below is based on balancing of translational forces. Note that $m_1$ is the mass of the arm, and, in the present embodiment, the mass $m_1$ of the arm is assumed to have been determined in advance as appropriate. For example, before starting analysis, the weight of the golfer 7 is input, and the mass of the arm is automatically calculated by an operation such as multiplying the input weight by a predetermined coefficient. $m_2$ is the mass of the golf club 4, and g is the gravitational acceleration. Also, $m_2$ is a specification of the golf club 4, and is assumed to have been determined in advance.

$R_{X1} = R_{X2} - m_1 \cdot A_{X1}$ $R_{Y1} = R_{Y2} - m_1 \cdot A_{Y1} - m_1 \cdot g \cdot \sin \alpha$ $R_{X2} = -m_2 \cdot A_{X2}$ $R_{Y2} = -m_2 \cdot A_{Y2} - m_2 \cdot g \cdot \sin \alpha$ \hfill Equation 19

In the following step S34, the calculation unit 24D calculates torque $T_{g1}$ about the center of gravity of the arm and torque $T_{g2}$ about the center of gravity of the golf club 4 from top to impact, by substituting the abovementioned calculation results into the equation below.

$T_{g1} = I_1 \cdot \omega_1' + r \cdot \sin \theta_1 \cdot R_{X1} - r \cdot \cos \theta_1 \cdot R_{Y1} + r \cdot \sin \theta_1 \cdot R_{X2} - r \cdot \cos \theta_1 \cdot R_{Y2}$ $T_{g2} = I_2 \cdot \omega_2' + L \cdot \sin \theta_2 \cdot R_{X2} - L \cdot \cos \theta_2 \cdot R_{Y2}$ \hfill Equation 20

Note that $I_1$ is the moment of inertia about the center of gravity of the arm, and $I_2$ is the moment of inertia about the center of gravity of the golf club 4. In the present embodiment, moment of inertia $I_1$ about the center of gravity of the arm is calculated as $I_1 = m_1 r^2/3$, assuming the center of gravity of the arm is in the center of the arm. Also, $I_2$ is a specification of the golf club 4, and is assumed to have been determined in advance.

In the following step S35, the calculation unit 24D calculates arm power $E_1'$ from top to impact based on the abovementioned calculation results. Specifically, $E_1'$ is represented in accordance with the equation below, where $v_s$ is the velocity vector of the shoulder and $v_g$ is the velocity vector of the grip 42. Also, $v_s$ and $v_g$ can respectively be calculated by differentiating position vector $d_s$ of the shoulder and position vector $d_g$ of the grip $42 = d_s + (2X_1, 2Y_1)$.

$E_1' = -R_1 v_s^T + R_2 v_g^T + T_{g1} \omega_1 - T_{g2} \omega_1$ \hfill Equation 21

Also, in the present embodiment, $v_s = (0, 0)$ since the shoulder does not move, and arm power $E_1'$ is calculated in accordance with the equation below. The calculation unit 24D calculates arm power $E_1'$ from top to impact by substituting the abovementioned calculation results into the equation below.

$E_1' = R_2 v_g^T + T_{g1} \omega_1 - T_{g2} \omega_1$ \hfill Equation 22

Incidentally, it is considered that, in order to maximally accelerate the distal end (the head 41) of the golf club 4 in the golf swing, first, it is required that the arm sufficiently accelerate, and then the movement of the arm stops, thereby imparting the momentum to the golf club 4. The acceleration state of the arm can be replaced by a physical index representing power (arm output power) $P_1$ output by the arm, and the momentum imparted to the golf club 4 can be replaced by a physical index representing power (club input power) $P_2$ input to the golf club 4. The arm output power $P_1$ corresponds to the second and third terms of the right-hand side of Equation 22 representing the arm power $E_1'$. The club input power $P_2$ corresponds to the first term of the right-hand side of Equation 22. That is, the arm output power $P_1$ and the club input power $P_2$ can be represented by the equation below. In step S35, the calculation unit 24D calculates arm output power $P_1$ and club input power $P_2$ from top to impact, in addition to the arm power $E_1'$.

$P_1 = T_{g1} \omega_1 - T_{g2} \omega_1$ $P_2 = R_2 v_g^T$ \hfill Equation 23

Note that power $E_2'$ exerted by the golf club 4 during the swing action can be represented by the equation below. That is, the club input power $P_2 = R_2 v_g^T$ functions as a bridge to transfer energy from the arm to the golf club 4.

$E_2' = -R_2 v_g^T + T_{g2} \omega_2$ \hfill Equation 24

Figure 12:
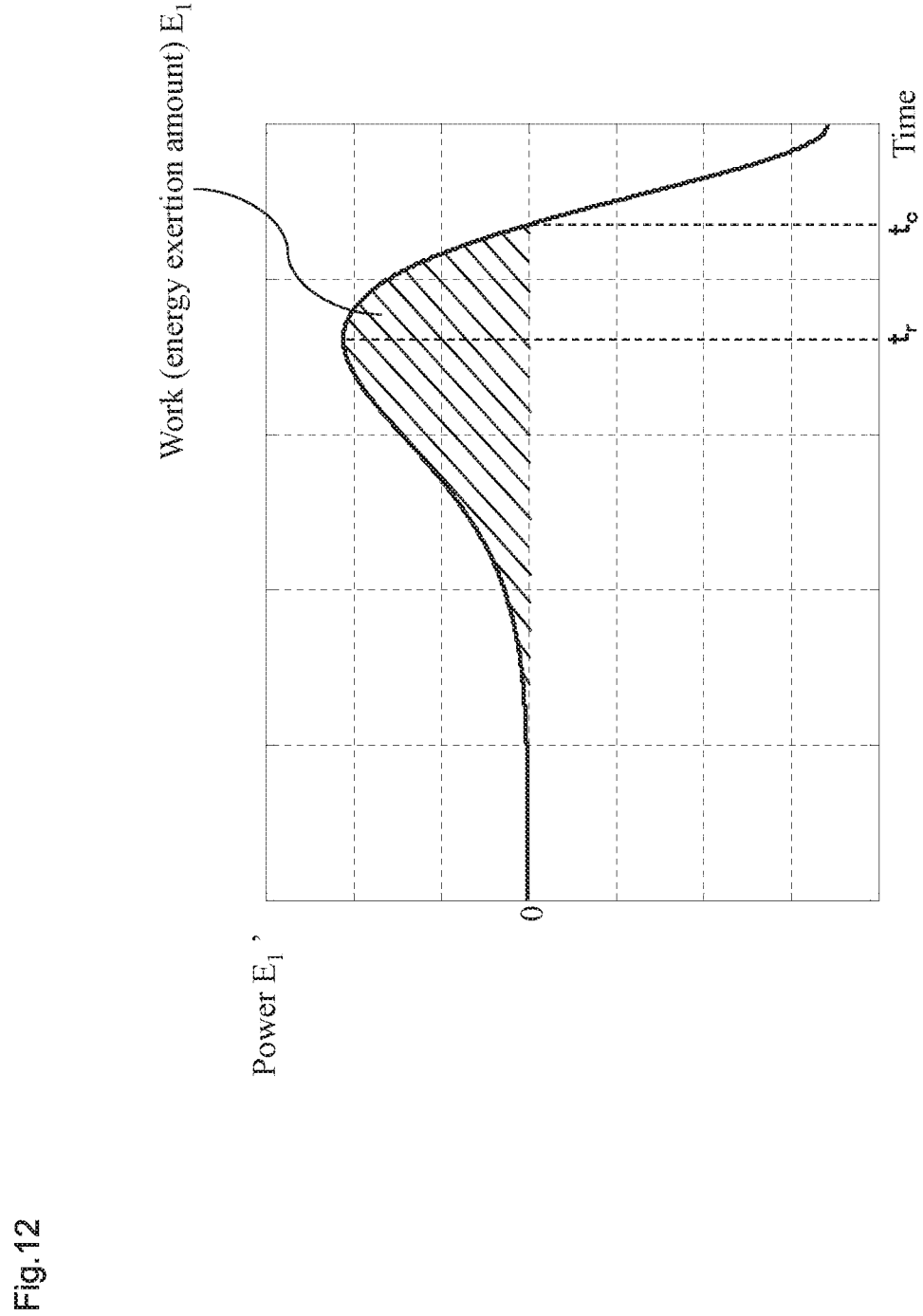
FIG. 12 is a diagram illustrating arm energy.

In the following step S36, the calculation unit 24D specifies time $t_c$ at which arm power $E_1'$ changes from positive to negative after the top, and calculates work $E_1$ of the arm from top time $t_t$ to time $t_c$. Work $E_1$ of the arm is calculated by integrating arm power $E_1'$ for the segment from time $t_t$ to time $t_c$ (see FIG. 12). Note that work $E_1$ can be taken as an index representing the work (energy) that is exerted by the arm between times $t_t$ and $t_c$, and thus, in this sense, can be called arm energy during the swing action. Furthermore, the calculation unit 24D calculates average power $E_{AVE}=E_1/t_c\text{-}t_t$ that is exerted by the arm between times $t_t$ and $t_c$. Average power $E_{AVE}$ is the arm energy exerted or consumed on average per unit time during the swing action.

Furthermore, the calculation unit 24D calculates average arm output power $P_{1\_AVE}$ during the swing action, by integrating the arm output power $P_1$ for the segment from top time $t_t$ to time $t_m$ at which arm output power $P_1$ is maximized, and dividing the integral value $D_1$ by integral segment $(t_c\text{-}t_m)$. The integral value $D_1$ is the work that is exerted by the arm of the golfer during the swing action, and may be an index representing the arm output power. In a similar manner, the calculation unit 24D calculates average club input power $P_{2\_AVE}$ during the swing action, by integrating the club input power $P_2$ for the segment from top time $t_t$ to time $t_n$ at which club input power $P_2$ is maximized, and dividing the integral value $D_2$ by integral segment $(t_c\text{-}t_n)$. The integral value $D_2$ is the work that is exerted on the golf club 4 during the swing action, and may be an index representing the club input power. Note that the abovementioned integral segments are merely examples, and may be set as appropriate, for example, to the segment between times $t_t$ and $t_c$, or the like.

In the following step S37, the calculation unit 24D calculates wrist-cock release timing $t_r$ that occurs during the swing action. Note that the inventors found, through testing, that head velocity $V_h$ at the time of impact is correlated with wrist-cock release timing $t_r$ during the swing action and arm energy $E_1$ or average power $E_{AVE}$. In view of this, here, wrist-cock release timing $t_r$ is calculated in order to calculate head velocity $V_h$ at the time of impact. In the present embodiment, with regard to the wrist-cock release timing $t_r$, the time at which arm power $E_1'$ is maximized in the segment from time $t_t$ to time $t_c$ is specified as wrist-cock release timing $t_r$ (see FIG. 12).

In the following step S38, the calculation unit 24D calculates head velocity $V_h$ at the time of impact, based on wrist-cock release timing $t_r$ and arm energy $E_{AVE}$. Specifically, head velocity $V_h$ at the time of impact is calculated according to the equation below. Note that $k_1$, $k_2$ and $k_3$ are constants obtained from the results of a large number of tests carried out in advance by multiple regression analysis, and are held in advance in the storage unit 23. This ends the index calculation process.

$$V_h = k_1 \cdot E_{AVE} + k_2 \cdot t_r + k_3$$

With the abovementioned processing, the arm output power $P_{1\_AVE}$, the club input power $P_{2\_AVE}$, and the head velocity $V_h$ are calculated as the first swing indices for determining an optimal swingability index.

1-2-6. Optimal Swingability Determination Process

Figure 13:
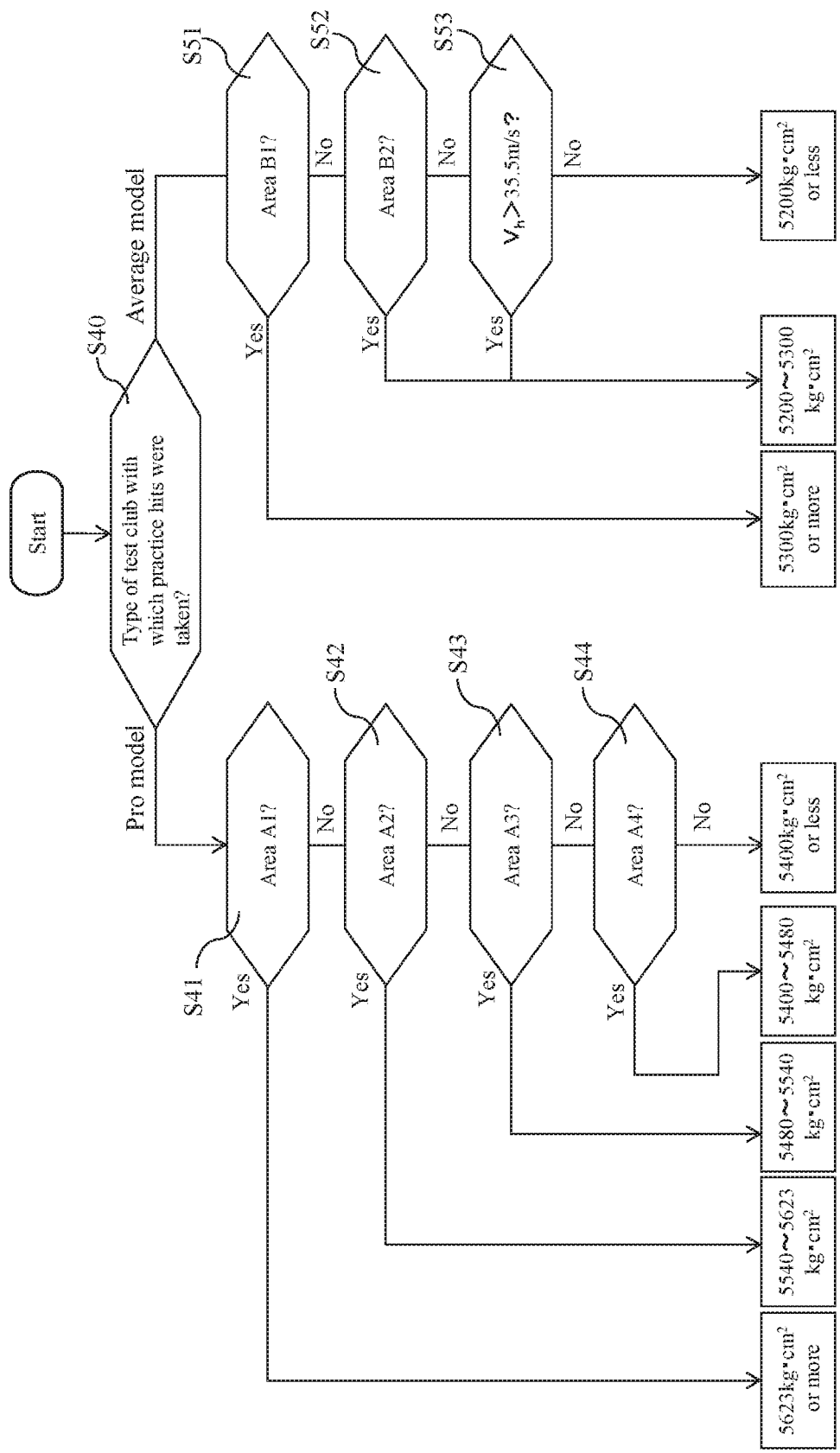
FIG. 13 is a flowchart showing the flow of an optimal swingability determination process.

Hereinafter, the flow of the optimal swingability determination process (S6) will be described with reference to FIG. 13. The optimal swingability index according to the present embodiment is optimal swing MI, and the optimal swing MI refers to swing moment of inertia $I_S$ of the golf club 4 suited to the golfer.

Note that the swing moment of inertia $I_S$ is the moment of inertia about the shoulder during the swing, and can be defined in accordance with the equation below, for example.

$$I_S = I_2 + m_2(R+L)^2 + I_1 + m_1(R/2)^2$$

Note that for each golfer 7, the weight of the arm is the same, even if the golf club 4 changes. Accordingly, in the present embodiment, for simplicity, the swing moment of inertia $I_S$ is calculated in accordance with the equation below, omitting the rotational moment of inertia of the arm.

$$I_S = I_2 + m_2(R+L)^2$$

Furthermore, in the present embodiment, the swing moment of inertia $I_S$ is calculated for an arm length R=60 cm (fixed). However, the value of the arm length R that is calculated in step S23 can also be substituted for R in the above equation. Incidentally, $m_2$, $I_2$ and L, which are parameters for determining $I_S$, are specifications of the golf club 4. Accordingly, the swing moment of inertia in the present embodiment is also a specification of the golf club 4.

First, in step S40, the determination unit 24E determines the type of test club with which practice hits were taken in the measurement process. If the practice hits were taken with the pro model club, the processing advances to step S41, and if practice hits were taken with the average model club, the processing advances to step S51. Which test club was used to take practice hits is assumed to be determined based on the information input by the user via the input unit 22.

Note that the type of test club is determined in step S40 because the area over which the first swing indices are distributed differs according to the type of test club. In specific terms, the inventors obtained the results shown in FIGS. 14 and 15 after getting 21 golfers who usually use a pro model club (hereinafter, pro model users) to take practice hits with the pro model club and 22 golfers who usually use an average model club (hereinafter, average model users) to take practice hits with the average model club and then calculating first swing indices. Note that the first swing indices calculated in this testing were arm output power $P_{1\_AVE}$, club input power $P_{2\_AVE}$, and head velocity $V_h$, and the specific values were calculated as described above. The inventors then discovered from the results shown in FIGS. 14 and 15 that the space showing the first swing indices was roughly divided into a pro model area and an average model area. Note that the pro model area is an area in which the first swing indices during the swing action of the pro model users are distributed, and the average model area is an area in which the first swing indices during the swing action of the average model users are distributed. It is evident, in comparing FIGS. 14 and 15, that the pro model area is an area where all arm output power $P_{1\_AVE}$, club input power $P_{2\_AVE}$, and head velocity $V_h$ are larger than those in the average model area. However, these figures can change depending on swing conditions such as the type of test club. This testing was performed using a SRIXON (registered trademark) Z-525 driver made by Dunlop Sports Co. Ltd. (Miyazaki Kosuma Blue6 S-Flex shaft, golf club weight of 314 g, and balance of D3) as the pro model club, and a XXIO (registered trademark) 8 driver made by Dunlop Sports Co. Ltd. (MP-800 R-Flex shaft, golf club weight of 272 g, and balance of D3) as the average model club.

Next, step S41 and steps S42 to S44 following thereon will be described. Steps S41 to S44 are steps for determining the range of optimal swing MI (hereinafter, optimal swing MI zone), according to the magnitudes of arm output power $P_{1\_AVE}$ and club input power $P_{2\_AVE}$. Here, the optimal swing MI zone is gradually set to larger values as the values of $P_{1\_AVE}$ and $P_{2\_AVE}$ increase.

Specifically, in step S41, the determination unit 24E determines whether or not a point represented by ($P_{1\_AVE}$, $P_{2\_AVE}$) calculated in the first index calculation process is on or above a straight line L1 in the $P_{1\_AVE}$-$P_{2\_AVE}$ plane shown in FIG. 14, that is, whether or not the point belongs to the area A1 in FIG. 14 (hereinafter, pro condition 1). If pro condition 1 is satisfied, the determination unit 24E then determines the optimal swing MI zone to be 5623 kg·cm² or more. On the other hand, if pro condition 1 is not satisfied in step S41, the processing advances to step S42. In step S42, the determination unit 24E determines whether or not a point represented by ($P_{1\_AVE}$, $P_{2\_AVE}$) calculated in the first index calculation process is on or above a straight line L2 and below the straight line L1 in the $P_{1\_AVE}$-$P_{2\_AVE}$ plane shown in FIG. 14, that is, whether or not the point belongs to the area A2 in FIG. 14 (hereinafter, pro condition 2). If pro condition 2 is satisfied, the determination unit 24E then determines the optimal swing MI zone to be 5540 to 5623 kg·cm². On the other hand, if pro condition 2 is not satisfied in step S42, the processing advances to step S43. In step S43, the determination unit 24E determines whether or not a point represented by ($P_{1\_AVE}$, $P_{2\_AVE}$) calculated in the first index calculation process is on or above a straight line L3 and below the straight line L2 in the $P_{1\_AVE}$-$P_{2\_AVE}$ plane shown in FIG. 14, that is, whether or not the point belongs to the area A3 in FIG. 14 (hereinafter, pro condition 3). If pro condition 3 is satisfied, the determination unit 24E then determines the optimal swing MI zone to be 5480 to 5540 kg·cm². On the other hand, if pro condition 3 is not satisfied in step S43, the processing advances to step S44. In step S44, the determination unit 24E determines whether or not a point represented by ($P_{1\_AVE}$, $P_{2\_AVE}$) calculated in the first index calculation process is on or above a straight line L4 and below the straight line L3 in the $P_{1\_AVE}$-$P_{2\_AVE}$ plane shown in FIG. 14, that is, whether or not the point belongs to the area A4 in FIG. 14 (hereinafter, pro condition 4). If pro condition 4 is satisfied, the determination unit 24E then determines the optimal swing MI zone to be 5400 to 5480 kg·cm². On the other hand, if pro condition 4 is not satisfied in step S44, that is, if a point represented by ($P_{1\_AVE}$, $P_{2\_AVE}$) calculated in the first index calculation process is below the straight line L4 in the $P_{1\_AVE}$-$P_{2\_AVE}$ plane shown in FIG. 14, that is, if the point belongs to the area A5 in FIG. 14, the determination unit 24E then determines the optimal swing MI zone to be 5400 kg·cm² or less.

On the other hand, step S51 and steps S52 and S53 following thereon are steps for determining the optimal swing MI zone, according to the magnitudes of arm output power $P_{1\_AVE}$, club input power $P_{2\_AVE}$, and head velocity $V_h$. Here, the optimal swing MI zone is gradually set to larger values as the values of $P_{1\_AVE}$, $P_{2\_AVE}$ and $V_h$ increase.

Specifically, the determination unit 24E, in step S51, determines whether or not a point represented by ($P_{1\_AVE}$, $P_{2\_AVE}$) calculated in the first index calculation process is on or above a straight line L5 in the $P_{1\_AVE}$-$P_{2\_AVE}$ plane shown in FIG. 15, that is, whether or not the point belongs to the area B1 in FIG. 15 (hereinafter, average condition 1). If average condition 1 is satisfied, the determination unit 24E then determines the optimal swing MI zone to be 5300 kg·cm² or more. On the other hand, if average condition 1 is not satisfied in step S51, the processing advances to step S52. In step S52, the determination unit 24E determines whether or not a point represented by ($P_{1\_AVE}$, $P_{2\_AVE}$) calculated in the first index calculation process is on or above a straight line L6 and below the straight line L5 in the $P_{1\_AVE}$-$P_{2\_AVE}$ plane shown in FIG. 15, that is, whether or not the point belongs to the area B2 in FIG. 15 (hereinafter, average condition 2). If average condition 2 is satisfied, the determination unit 24E then determines the optimal swing MI zone to be 5200 to 5300 kg·cm². On the other hand, if average condition 2 is not satisfied in step S52, the processing advances to step S53. In step S53, the determination unit 24E determines whether or not the head velocity $V_h$ calculated in the first index calculation process is greater than 35.5 m/s (average condition 3). If average condition 3 is satisfied, the determination unit 24E then determines the optimal swing MI zone to be 5200 to 5300 kg·cm². On the other hand, if average condition 3 is not satisfied in step S53, that is, if a point represented by ($P_{1\_AVE}$, $P_{2\_AVE}$) calculated in the first index calculation process is below the straight line L6 shown in FIG. 15, that is, if the point belongs to the area B3 in FIG. 14, the determination unit 24E then determines the optimal swing MI zone to be 5200 kg·cm² or less.

The above steps S41 to S44 and S51 to S53 are based on the following findings. That is, in the testing described with reference to FIGS. 14 and 15, head velocity $V_h$, and the optimal swing MI at which the carry distance is maximized were also calculated. Head velocity $V_h$ was calculated as described above. On the other hand, the optimal swing MI was determined by getting the golfers to swing golf clubs having various swing moments of inertia $I_s$, specifying the swing moment of inertia $I_s$ of the golf club that provided the maximum carry distance, and taking the specified swing moment of inertia $I_s$ as the optimal swing MI. More specifically, this involved getting the pro model users to swing five types of golf clubs having swing moments of inertia $I_s$ of 5650 kg·cm², 5610 kg·cm², 5520 kg·cm², 5440 kg·cm² and 5360 kg·cm², and the average model users to swing three types of golf clubs having swing moments of inertia $I_s$ of 5330 kg·cm², 5230 kg·cm² and 5130 kg·cm². FIGS. 14 and 15 show the values of head velocity $V_h$ [m/s] and optimal swing MI obtained from this testing.

Figure 14:
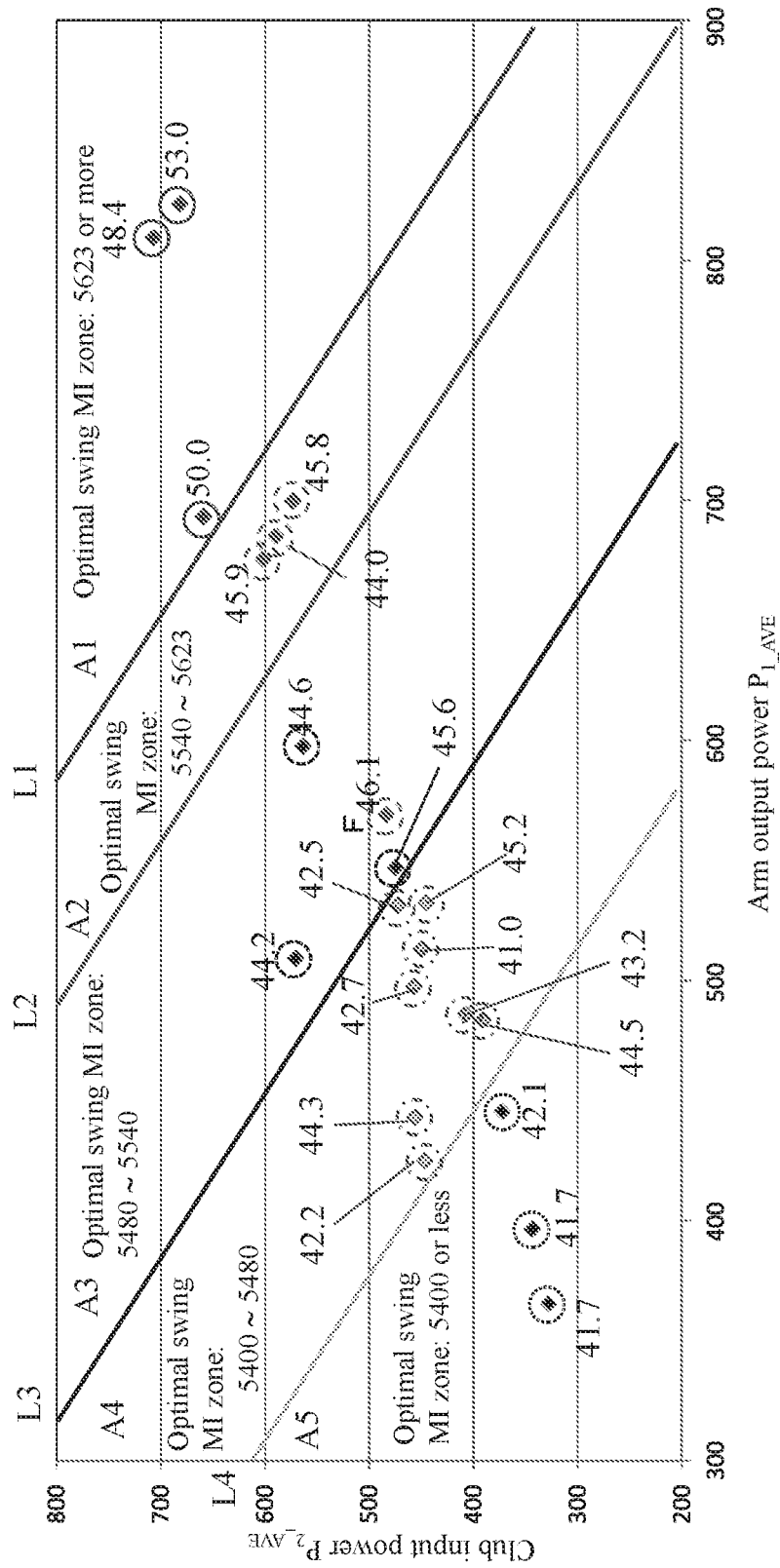
FIG. 14 is a diagram showing a pro model area.
Figure 15:
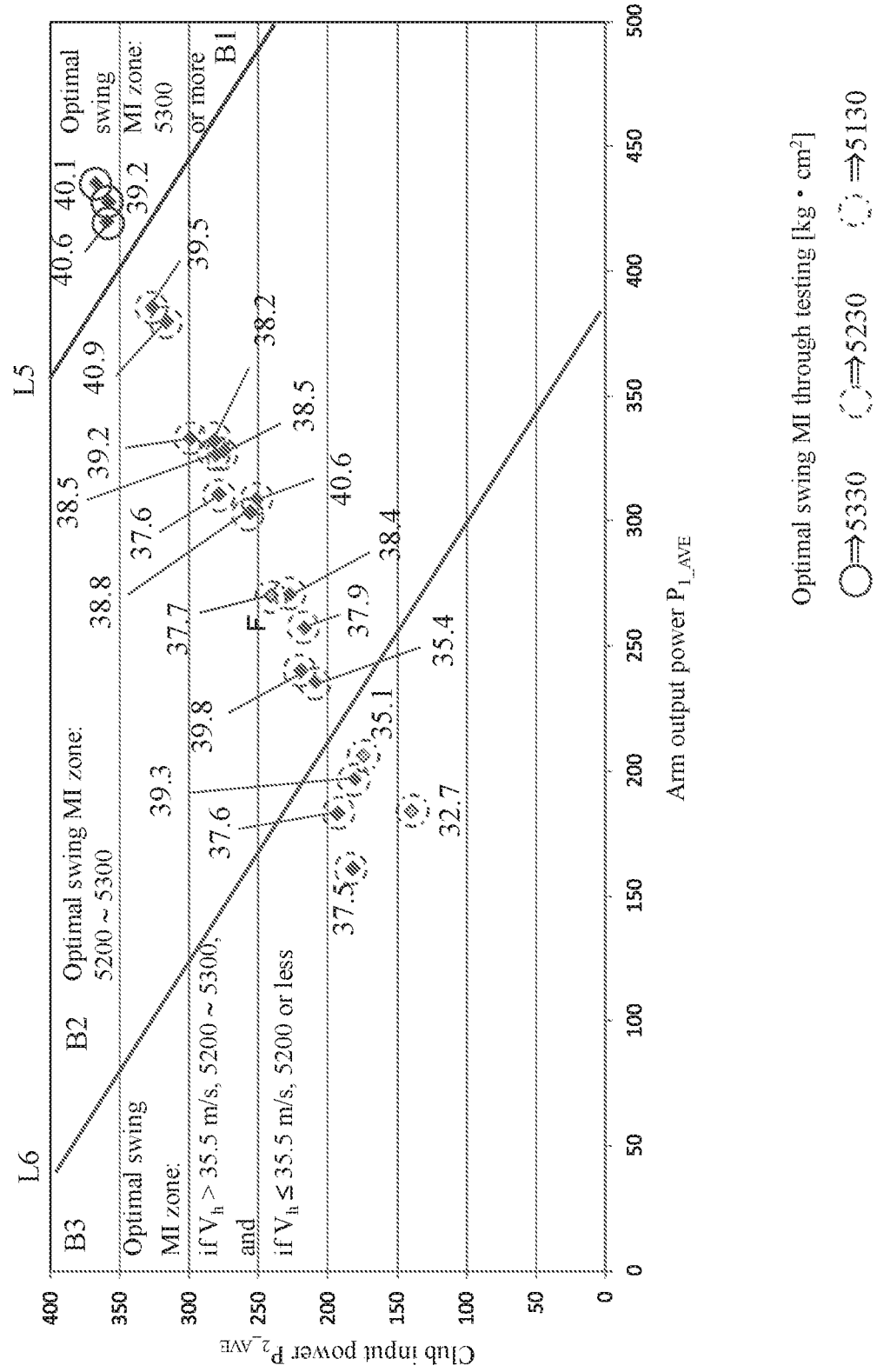
FIG. 15 is a diagram showing an average model area.

It is evident from the above testing that optimal swing MI increases as arm output power $P_{1\_AVE}$ and club input power $P_{2\_AVE}$ increase, as shown in FIGS. 14 and 15. As a result, the inventors found that the areas A1 to A5 corresponding to the optimal swing MI zones can be defined by dividing the arm output power $P_{1\_AVE}$-club input power $P_{2\_AVE}$ space (pro model area) as shown in FIG. 14. Furthermore, the inventors found that the areas B1 to B3 corresponding to the optimal swing MI zones can be defined by dividing the arm output power $P_{1\_AVE}$-club input power $P_{2\_AVE}$-head velocity $V_h$ space (average model area) as shown in FIG. 15. For simplicity, however, FIG. 15 omits an axis indicating head velocity $V_h$ and shows an arm output power $P_{1\_AVE}$-club input power $P_{2\_AVE}$ plane. That is, the abovementioned steps S41 to S44 are steps for determining the optimal swing MI zone according to which area the points representing arm output power $P_{1\_AVE}$ and club input power $P_{2\_AVE}$ are FKEted in $P_{1\_AVE}$-$P_{2\_AVE}$ space. On the other hand, steps S51 to S53 are steps for determining the optimal swing MI zone according to which area the points representing arm output power $P_{1\_AVE}$, club input power $P_{2\_AVE}$, and head velocity $V_h$ are plotted in $P_{1\_AVE}$-$P_{2\_AVE}$-$V_h$ space. Note that the thresholds that are used in the determination processing in steps S41 to S44 and S51 to S53, or in other words, information and the like for specifying the boundary lines L1 to L6 of the division areas A1 to A5 and B1 to B3 shown in FIGS. 14 and 15, are arranged by model of the test clubs, and stored in the storage unit 23 as the correspondence data 28. That is, the correspondence data 28 is data defining the correspondence between the magnitudes of $P_{1\_AVE}$, $P_{2\_AVE}$, and $V_h$ and the optimal swing MI zones. Note that the boundary lines L1 are L4 are substantially parallel to each other, and the boundary lines L5 and L6 are also substantially parallel to each other. All the boundary lines L1 to L6 are straight lines having a negative slope in $P_{1\_AVE}$-$P_{2\_AVE}$ plane. In steps S41 to S44 and S51 to S53, the determination processing is performed with reference to the correspondence data 28 in the storage unit 23. Note that the correspondence data 28 is shown in FIG. 2 as data that is separate from the fitting program 3, but the correspondence data 28 may be incorporated in the program 3.

Incidentally, in the average model area, a configuration is adopted such that, if a point representing arm output power $P_{1\_AVE}$ and club input power $P_{2\_AVE}$ belongs to the area B3, different optimal swing MI zones are allocated depending on whether or not head velocity $V_h$ is greater than 35.5 m/s. This is because, as indicated by the test results shown in FIG. 15, the optimal swing MI in this area has different values depending on whether or not $V_h>35.5$ m/s.

Incidentally, the results of testing that involved getting 21 pro model users and 22 average model users to actually take practice hits with the test clubs are plotted in FIGS. 14 and 15, as described above. Out of the data for the 21 pro model users, the optimal swing MI for 20 golfers, excluding the one golfer that is marked by F, ended up belonging to the optimal swing MI zone that was determined in the abovementioned optimal swingability determination process. That is, it was confirmed that fitting was performed with a validity of 95% or more. Furthermore, out of the data for the 22 average model users, the optimal swing MI for 21 golfers, excluding the one golfer that is marked by F, ended up belonging to the optimal swing MI zone that was determined in the abovementioned optimal swingability determination process. That is, it was confirmed that fitting was performed with a validity of 95% or more.

1-2-7. Second Index Calculation Process

Hereinafter, the second index calculation process (S7) of calculating a second swing index based on the measurement data obtained in the measurement process will be described. The second swing index is a feature amount representing a feature of the swing action by the golfer 7, for determining an optimal stiffness index. In the present embodiment, first to fourth feature amounts $F_1$ to $F_4$ which will be described later are calculated as second swing indices.

In order to understand the first to fourth feature amounts $F_1$ to $F_4$, first, it is important to understand an optimal stiffness index. The optimal stiffness index is an index representing the stiffness of the shaft 40 suited to the golfer 7, and, in the present embodiment, the stiffness of the shaft 40 is evaluated as a distribution of flexural stiffnesses at a plurality of positions on the shaft 40 (hereinafter, EI distribution). The EI distribution according to the present embodiment is quantitatively expressed using numerical values, and, more specifically, is calculated using the international flex code (IFC). Thus, first, IFC will be described. Note that IFC is a known index representing features of a shaft, broadly proposed by the applicant, and has been described in detail in various documents such as Patent Literature 1, for example. Accordingly, its description in this specification is not absolutely necessary, but it will be described below for reference.

Figure 16:
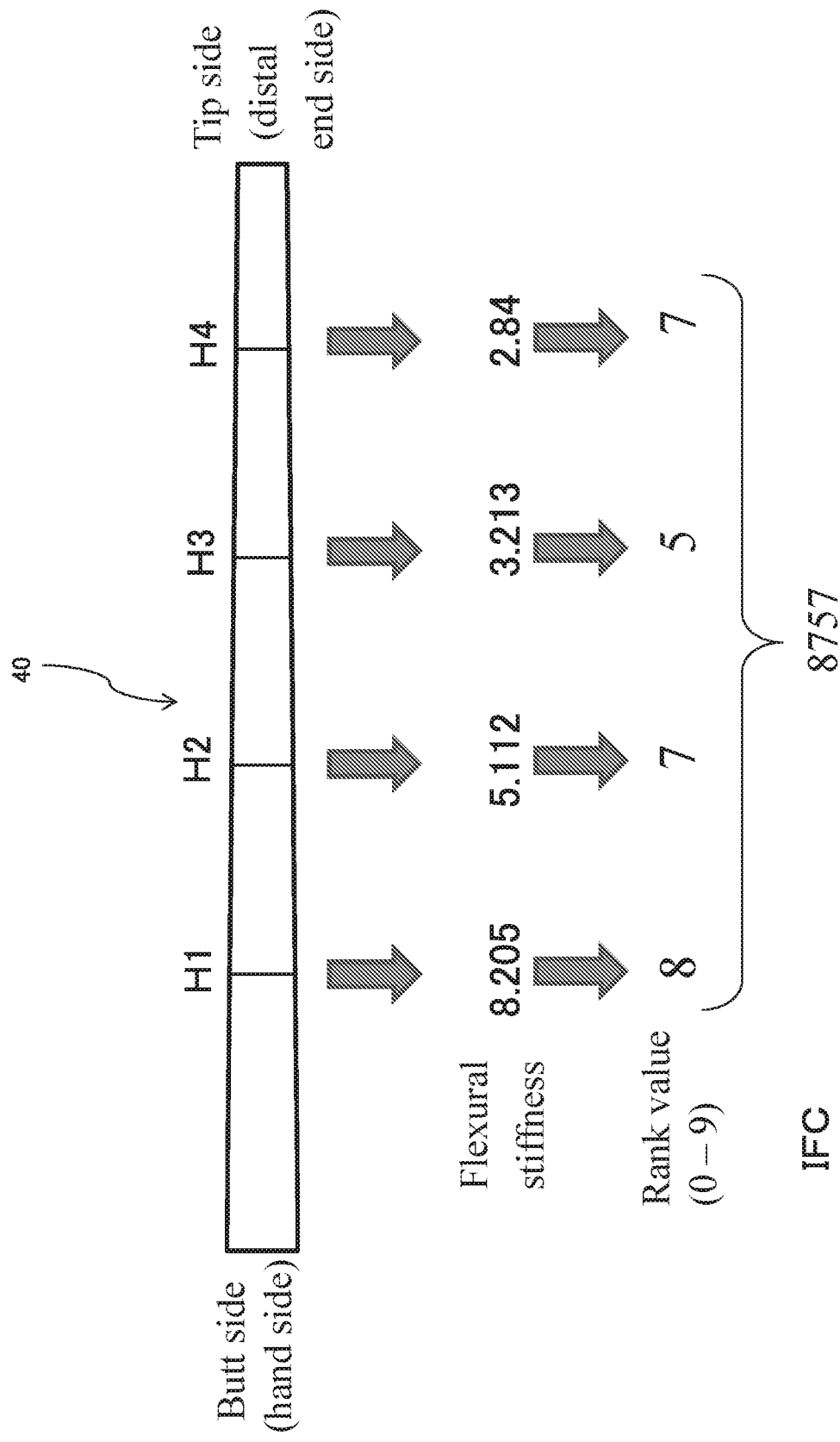
FIG. 16 is a diagram illustrating international flex code (IFC)

IFC is, as is shown in FIG. 16, code in which flexural stiffnesses of the shaft 40 at four positions H1 to H4 along the direction in which the shaft 40 extends are respectively indicated as single-digit numbers of 0 to 9 and these four numbers are arranged along the direction in which the shaft 40 extends. More specifically, four measurement points H1 to H4 are defined substantially at equal intervals in this order from a butt end to a tip end of the shaft 40. For example, settings can be made such that a position that is away from the tip end of the shaft 40 by 36 inches is taken as the measurement point H1, a position that is away by 26 inches is taken as the measurement point H2, a position that is away by 16 inches is taken as the measurement point H3, and a position that is away by six inches is taken as the measurement point H4. The values of flexural stiffness (hereinafter, EI values) $J_1$ to $J_4$ at the four measurement points H1 to H4 are measured.

Figure 17:
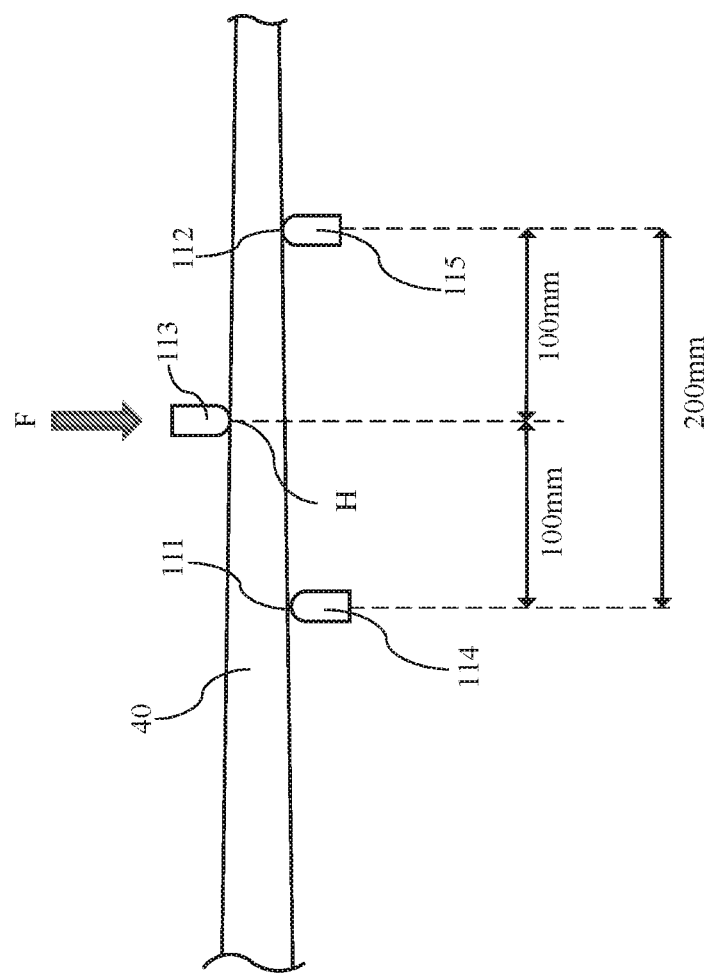
FIG. 17 is a diagram illustrating a method for measuring flexural stiffness of a shaft.

The EI values (N·m²) at the measurement points H (H1 to H4) on the shaft 40 can be measured using various methods, and, for example, can be measured using a testing machine Type 2020 made by Intesco (maximum load 500 kgf) as shown in FIG. 17. In this measuring method, the flexural amount when a load F is applied from above to the measurement points H is measured in a state where the shaft 40 is supported from below at two support points 111 and 112. The distance (span) between the support point 111 and the support point 112 may be set, for example, to 200 mm, and each measurement point H may be the middle between the support point 111 and the support point 112. More specifically, in a state where support members 114 and 115 that support the support points 111 and 112 are fixed, an indenter 113 is moved downward at a constant speed (e.g., 5 mm/min) at the measurement point H. When the load F reaches 20 kgf, the movement of the indenter 113 is ended, and the flexural amount (mm) of the shaft 40 at this moment is measured, and is further converted into an EI value (N·m²).

Next, the EI values $J_1$ to $J_4$ at the abovementioned four measurement points H1 to H4 are transformed into rank values $K_1$ to $K_4$ in ten levels. Specifically, the rank values $K_1$ to $K_4$ can be calculated from the EI values $J_1$ to $J_4$ according to transformation tables (Tables 1 to 4) below respectively for the measurement points H1 to H4 (in Tables 1 to 4, the IFC field shows rank values after transformation). The four rank values $K_1$ to $K_4$ obtained in this manner respectively for the measurement points H1 to H4 are arranged such that a number corresponding to the position closer to the butt is on the left side and a number corresponding to the position closer to the tip is on the right side. The thus obtained four-digit code is the IFC. In IFC, it is indicated that, as the number in each digit is larger, the stiffness at a corresponding position is higher.

TABLE 1

(a) IFC for 36 inches

| IFC | EI value [×9.8 N · m²] | | |
|---|---|---|---|
| | Max | ~ | Min |
| 9 | | ~ | 8.295 |
| 8 | 8.295 | ~ | 7.86 |
| 7 | 7.86 | ~ | 7.425 |
| 6 | 7.425 | ~ | 6.99 |
| 5 | 6.99 | ~ | 6.555 |
| 4 | 6.555 | ~ | 6.12 |
| 3 | 6.12 | ~ | 5.685 |
| 2 | 5.685 | ~ | 5.25 |
| 1 | 5.25 | ~ | 4.185 |
| 0 | 4.185 | ~ | 0 |

TABLE 2

(b) IFC for 26 inches

| IFC | EI value [×9.8 N · m²] | | |
|---|---|---|---|
| | Max | ~ | Min |
| 9 | | ~ | 5.543 |
| 8 | 5.543 | ~ | 5.306 |
| 7 | 5.306 | ~ | 5.069 |
| 6 | 5.069 | ~ | 4.832 |
| 5 | 4.832 | ~ | 4.595 |
| 4 | 4.595 | ~ | 4.358 |
| 3 | 4.358 | ~ | 4.121 |
| 2 | 4.121 | ~ | 3.884 |
| 1 | 3.884 | ~ | 3.647 |
| 0 | 3.647 | ~ | 0 |

TABLE 3

(c) IFC for 16 inches

| IFC | EI value [×9.8 N · m²] | | |
|---|---|---|---|
| | Max | ~ | Min |
| 9 | | ~ | 3.849 |
| 8 | 3.849 | ~ | 3.658 |
| 7 | 3.658 | ~ | 3.467 |
| 6 | 3.467 | ~ | 3.276 |
| 5 | 3.276 | ~ | 3.085 |
| 4 | 3.085 | ~ | 2.894 |
| 3 | 2.894 | ~ | 2.703 |
| 2 | 2.703 | ~ | 2.512 |
| 1 | 2.512 | ~ | 2.321 |
| 0 | 2.321 | ~ | 0 |

TABLE 4

(d) IFC for 6 inches

| IFC | EI value [×9.8 N × m²] | | |
|---|---|---|---|
| | Max | ~ | Min |
| 9 | | ~ | 2.94 |
| 8 | 2.94 | ~ | 2.86 |
| 7 | 2.86 | ~ | 2.78 |
| 6 | 2.78 | ~ | 2.7 |
| 5 | 2.7 | ~ | 2.62 |
| 4 | 2.62 | ~ | 2.54 |
| 3 | 2.54 | ~ | 2.46 |
| 2 | 2.46 | ~ | 2.38 |
| 1 | 2.38 | ~ | 2.3 |
| 0 | 2.3 | ~ | 0 |

In the second index calculation process, the calculation unit 24D calculates first to fourth feature amounts $F_1$ to $F_4$. In the present embodiment, the first to fourth feature amounts $F_1$ to $F_4$ are indices for determining optimal EI values $J_{S1}$ to $J_{S4}$ which are respectively EI values $J_1$ to $J_4$ suited to the golfer 7, that is, for determining optimal rank values $K_{S1}$ to $K_{S4}$ which are rank values $K_1$ to $K_4$ suited to the golfer 7. Thus, in the present embodiment, feature amounts respectively correlated with the optimal EI values $J_{S1}$ to $J_{S4}$ are selected as the first to fourth feature amounts $F_1$ to $F_4$. In the present embodiment, the following indices are used as the first to fourth feature amounts $F_1$ to $F_4$, whereas as the second swing indices, any other feature amounts may be used as long as there is a correlation with the optimal stiffness index.

The first feature amount $F_1$ is a slope of the angular velocity $\omega_y$ in the wrist-cock direction near top, and may be represented, for example, as the sum of an angular velocity $\omega_y$ at 50 ms before the top and an angular velocity $\omega_y$ at 50 ms after the top.

The second feature amount $F_2$ is an average value of the angular velocity $\omega_y$ from top to a time at which the angular velocity $\omega_y$ is maximized. The second feature amount $F_2$ is calculated by obtaining a time at which the angular velocity $\omega_y$ is maximized from top to impact, and dividing the accumulated value of the angular velocities $\omega_y$ from top to this time with the period of time from top to this time.

The third feature amount $F_3$ is an average value of the angular velocity $\omega_y$ from a time at which the angular velocity $\omega_y$ is maximized to impact. The third feature amount $F_3$ is calculated by dividing the accumulated value of the angular velocities $\omega_y$ from the time at which the angular velocity $\omega_y$ is maximized to impact with the period of time from time at which the angular velocity $\omega_y$ is maximized to impact.

The fourth feature amount $F_4$ is an average value of the angular velocity $\omega_y$ from top to impact, and is calculated by dividing the accumulated value of the angular velocities $\omega_y$ from top to impact with the period of time from top to impact.

Figure 18:
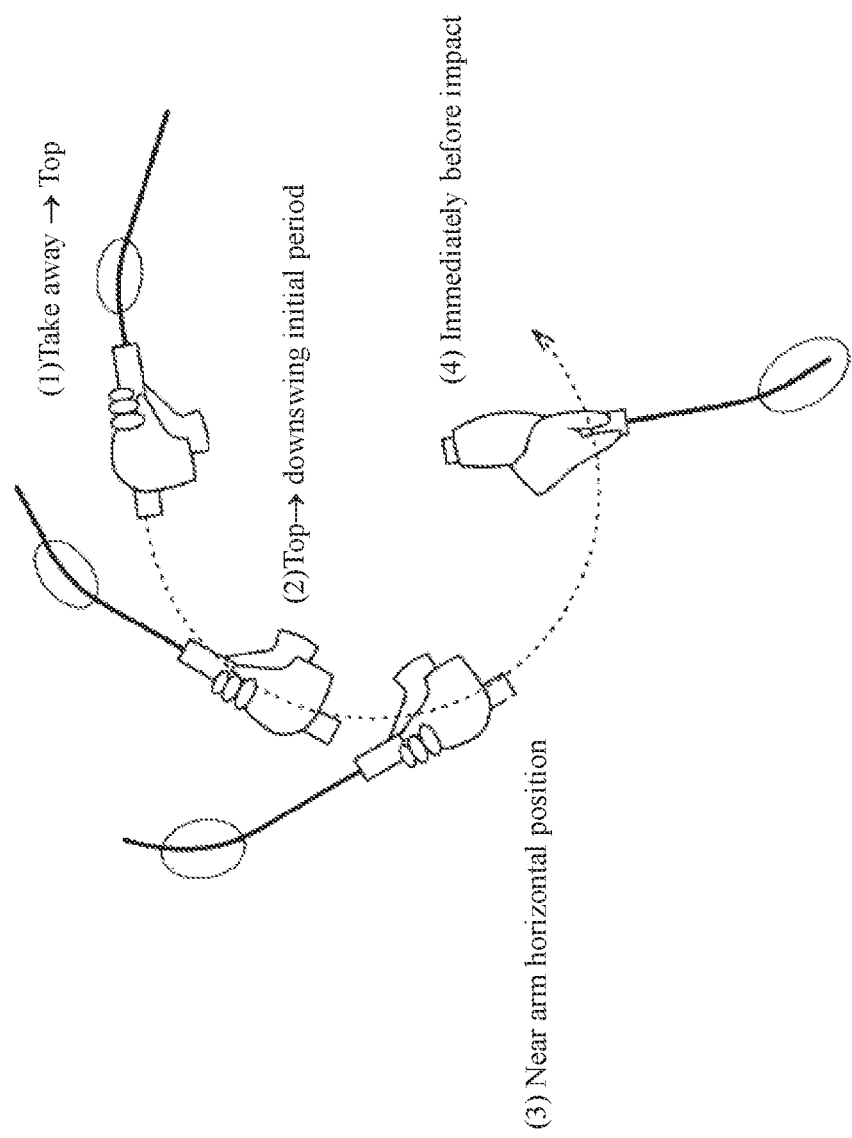
FIG. 18 is a diagram illustrating flexural deformation of a shaft during the swing.

Incidentally, since the shaft 40 of the golf club 4 has the relatively heavy head 41 at the distal end of the golf club, during the swing action, flexural deformation occurs due to the inertia thereof. This flexural deformation does not occur at the same position on the shaft 40 throughout the swing action, but is transferred from the hand side to the distal end side of the shaft 40, from top to impact, as shown in FIG. 18. In other words, as the swing travels from top to impact, the position of flexural deformation in the shaft 40 moves from the hand side to the distal end side of the shaft 40.

More specifically, when the golf club is taken away from address and the head reaches the top (the time shown in (1) in FIG. 18), flexural deformation occurs near the hand side of the shaft 40. Then, when the golf club is turned to enter the downswing initial period (the time shown in (2) in FIG. 18), the flexural deformation has moved slightly toward the distal end side of the shaft 40. Furthermore, when the arm of the golfer 7 is horizontally positioned (the time shown in (3) in FIG. 18), the flexural deformation has moved to a point that is closer to the distal end than the center of the shaft 40 is. Then, immediately before impact (the time shown in (4) in FIG. 18), the flexural deformation has moved to a point that is near the distal end of the shaft 40.

Accordingly, the first to fourth feature amounts $F_1$ to $F_4$ can be calculated respectively in first to fourth segments from a point near the top to a point near the impact during the swing action. The first to third segments are time-series segments arranged in this order, and are segments that do not partially or completely overlap each other.

1-2-8. Optimal Stiffness Determination Process

Next, the flow of the optimal stiffness determination process (S8) will be described. In this process, the determination unit 24E determines optimal stiffness indices (optimal EI values $J_{S1}$ to $J_{S4}$), in accordance with predetermined approximation formulae representing a correlation between the second swing indices (first to fourth feature amounts $F_1$ to $F_4$) and the optimal stiffness indices (the optimal EI values $J_{S1}$ to $J_{S4}$). The approximation formulae according to the present embodiment are linear approximation formulae and are represented as follows.

$$J_{S1} = a_1 \cdot F_1 + b_1$$

$$J_{S2} = a_2 \cdot F_2 + b_2$$

$$J_{S3} = a_3 \cdot F_3 + b_3$$

$$J_{S4} = a_4 \cdot F_4 + b_4$$

The determination unit 24E calculates the optimal EI values $J_{S1}$ to $J_{S4}$, by substituting the first to fourth feature amounts $F_1$ to $F_4$ calculated in the second index calculation process into these approximation formulae. Furthermore, the determination unit 24E transforms the optimal EI values $J_{S1}$ to $J_{S4}$ respectively into the optimal rank values $K_{S1}$ to $K_{S4}$ according to the conversion tables shown as Tables 1 to 4 above.

Note that, in the abovementioned formulae, a1 to a4 and b1 to b4 are constants obtained from the results of a large number of tests carried out in advance by regression analysis, and are held in advance in the storage unit 23. The tests can be performed, for example, as follows as in Patent Literature 1. That is, this involves getting a large number of golfers to swing a plurality of golf clubs, and quantifying the carry distance at that time, the directionality when hitting a ball (left-right shifting), and the swingability in sensory evaluation. Then, a golf club suited to each golfer is determined from the values, and the EI values of the golf club are taken as the optimal EI values of that golfer. Furthermore, as in the abovementioned method, the first to fourth feature amounts $F_1$ to $F_4$ of each golfer are calculated. After this test, data of the first to fourth feature amounts $F_1$ to $F_4$ and the optimal EI values for the large number of golfers is subjected to regression analysis, so that a1 to a4 and b1 to b4 are calculated.

Furthermore, in order to make the approximation formulae more reliable, the values of a1 to a4 and b1 to b4 may be changed according to conditions. For example, approximation formulae can be prepared according to head velocity $V_h$. For example, a1 to a4 and b1 to b4 can be determined by classifying the test data according to the head velocity zones (e.g., 45 m/s or more, 41 to 45 m/s, 41 m/s or less), and generating each approximation formula only for data belonging to the same class. In the optimal stiffness determination process, which head velocity zone the head velocity $V_h$ of the golfer 7 belongs to is determined, and the approximation formula corresponding to that head velocity zone is used to calculate the optimal stiffness indices.

1-2-9. Optimal Club Selection Process

Once the optimal swingability index (optimal swing MI zone) and the optimal stiffness indices (the optimal EI values $J_{S1}$ to $J_{S4}$, the optimal rank values $K_{S1}$ to $K_{S4}$) have been determined by the above steps S1 to S8, the selection unit 24F executes the optimal club selection process (S9). In this process, a shaft 40 suited to the golfer 7 (hereinafter, recommended shaft) is specified from among the large number of shafts registered in the shaft DB 29. As a fitting result, a golf club 4 suited to the golfer 7 (hereinafter, recommended golf club) is also specified.

In the present embodiment, first, the selection unit 24F determines the type of head 41 that is to be used in the recommended golf club (hereinafter, recommended head). The type of recommended head may be determined using fitting processing that will not be described in this specification, or may be determined by getting the user to select his or her preferred head 41 by asking questions to the user via the display unit 21 and the input unit 22. The selection unit 24F reads out information indicating specifications of the recommended head from the head DB 27, and reads out information indicating specifications of all shafts 40 registered in the shaft DB 29. The information indicating specifications of the head 41 registered in the head DB 27 includes the manufacturer, the model number, the weight, and the like. Meanwhile, information indicating specifications of each shaft 40 registered in the shaft DB 29 includes the manufacturer, the model number, the EI values $J_1$ to $J_4$ and the rank values $K_1$ to $K_4$ (IFC) at the four positions H1 to H4, the weight of the shaft 40, the flex, the torque, the kick-point, the length, the center of gravity position, and the like. The selection unit 24F calculates swing moments of inertia $I_S$ of golf clubs 4 when the shafts 40 and the recommended head are combined, and specifies golf clubs 4 (hereinafter, first narrowed-down golf clubs) whose values belong to the optimal swing MI zone and shafts 40 (hereinafter, first narrowed-down shafts) contained therein. Note that there are usually a large number of first narrowed-down golf clubs and shafts.

Next, the selection unit 24F calculates, for each first narrowed-down shaft, the match degree of the rank values $K_1$ to $K_4$ of the shaft and the optimal rank values $K_{S1}$ to $K_{S4}$ determined in the optimal stiffness determination process, and specifies a shaft having a high match degree, as the recommended shaft. The match degree can be calculated, for example, in accordance with Equation 25 below, where the match degree increases as the value decreases.

$$\text{(Match degree)} = \sum_{i=1}^{4} |K_i - K_{Si}| \qquad \text{Equation 25}$$

Note that, as the recommended shaft, only one shaft may be specified, or a plurality of shafts may be specified. Furthermore, as the recommended shaft, a predetermined number of shafts having a relatively high match degree may be specified from among the first narrowed-down shafts, or all shafts having at least a certain level of match degree may be specified. The display control unit 24G displays information indicating specifications (including IFC values) of the recommended shafts on the display unit 21 together with information indicating the types of the recommended shafts with reference to the shaft DB 29. Furthermore, the display control unit 24G displays the golfer's optimal swing MI zone and the optimal rank values $K_{S1}$ to $K_{S4}$, on the display unit 21. Furthermore, the display control unit 24G displays information indicating that the recommended golf clubs are golf clubs obtained by combining the recommended shafts and the recommended head, on the display unit 21. The user is thereby able to find out the types of the golf clubs 4 and the shafts 40 suited to the golfer 7 together with being able to find out the IFC value, the optimal swing MI zone, and the optimal rank values $K_{S1}$ to $K_{S4}$ of the golf clubs.

2. Second Embodiment

Figure 19:
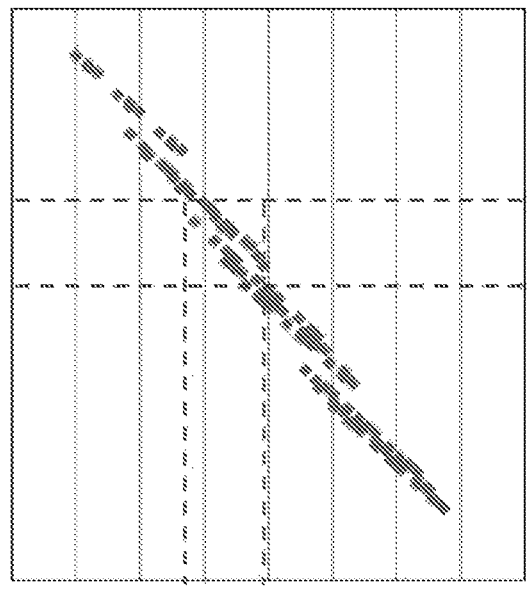
FIG. 19 is a functional block diagram of a fitting system according to a second embodiment.

FIG. 19 shows the overall configuration of a fitting system 200 according to the second embodiment. The fitting system 200 has many points in common with the fitting system 100 according to the first embodiment. Accordingly, hereinafter, the description will focus on the differences between the first embodiment and the second embodiment, with the same reference numerals being given to constituent elements that are the same, and description thereof being omitted.

Figure 20:
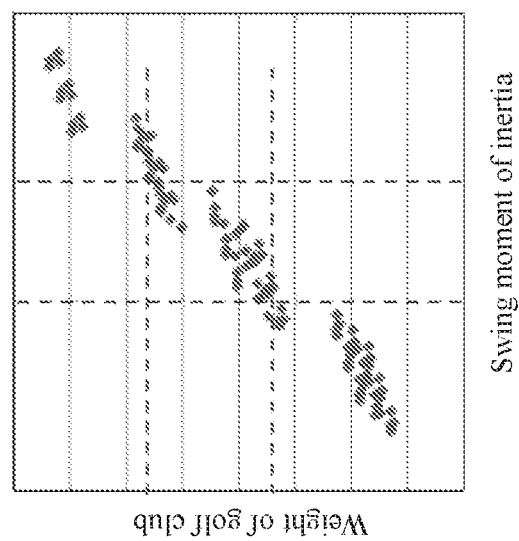
FIG. 20 is a flowchart showing the flow of fitting processing according to the second embodiment.

FIG. 20 is a flowchart showing the flow of the fitting processing according to the second embodiment. It is evident, in comparing FIGS. 4 and 20, that the analysis processing according to the second embodiment mainly differs from that according to the first embodiment in that an optimal feature determination process (S206) is executed instead of the optimal swingability determination process (S6), an optimal stiffness determination process (S208) is executed instead of the optimal stiffness determination process (S8), and an optimal club selection process (S209) is executed instead of the optimal club selection process (S9). More specifically, in the optimal swingability determination process (S6) according to the first embodiment, the optimal swing MI zone is ultimately determined, whereas in the optimal feature determination process (S206) according to the second embodiment, the weight of the shaft 40 (optimal shaft weight) of the golf club 4 suited to a golfer is ultimately determined. That is, in the first embodiment, the optimal swingability index is determined, whereas in the second embodiment, an optimal feature index representing a feature of a specific site in the golf club 4 suited to a golfer is determined. Furthermore, in the optimal stiffness determination process (S8) according to the first embodiment, a four-digit IFC code (the optimal rank values $K_{S1}$ to $K_{S4}$) is ultimately determined as the optimal stiffness index, whereas in the optimal stiffness determination process (S208) according to the second embodiment, the flex (optimal flex) of the shaft 40 of the golf club 4 suited to a golfer is ultimately determined as the optimal stiffness index. Furthermore, in the optimal club selection process (S9) according to the first embodiment, shafts 40 that can realize the optimal swingability index (optimal swing MI zone) for the whole of the golf club 4 are narrowed down in a state where the head 41 is fixed, after which a shaft 40 matching, as closely as possible, the optimal stiffness indices (the optimal rank values $K_{S1}$ to $K_{S4}$) is determined, whereas in the optimal club selection process (S209) according to the second embodiment, a shaft 40 matching, as closely as possible, the optimal feature index (the optimal shaft weight) and the optimal stiffness index (the optimal flex) is determined in a state where the head 41 is fixed.

As shown in FIG. 19, the fitting system 200 is provided with a fitting apparatus 202 instead of the fitting apparatus 2. The fitting apparatus 202 has the same hardware configuration as the fitting apparatus 2, although with the fitting apparatus 202, a fitting program 203 is installed instead of the fitting program 3. Thus, the control unit 24 is also able to operate as a determination unit 224E, a selection unit 224F, and a display control unit 224G, in addition to operating in a virtual manner as the acquisition unit 24A, the grip behavior derivation unit 24B, the shoulder behavior derivation unit 24C, and the calculation unit 24D, by reading out and executing the fitting program 203 in the storage unit 23. The determination unit 224E is a virtual unit that executes the optimal feature determination process (S206) and the optimal stiffness determination process (S208), which is a difference with the first embodiment, and the selection unit 224F and the display control unit 224G are virtual units that execute the optimal club selection process (S209), which is a difference with the first embodiment. Also, correspondence data 228 is stored in the storage unit 23 of the fitting apparatus 202 instead of the correspondence data 28, so as to enable the optimal feature determination process (S206) to be executed. The correspondence data 228 is data indicating the conditions for determining the optimal shaft weight.

Also in the second embodiment, the measurement process (S1), the first transformation process (S2), the second transformation process (S3), the shoulder behavior derivation process (S4), and then the first index calculation process (S5) are executed sequentially, similar to the first embodiment, and then the optimal feature determination process (S206) is executed. Then, the second index calculation process (S7) is executed, after which the optimal stiffness determination process (S208) and the optimal club selection process (S209) are subsequently executed. Hereinafter, the optimal feature determination process (S206), the optimal stiffness determination process (S208), and the optimal club selection process (S209), which are differences with the first embodiment, will be sequentially described.

2-1. Optimal Feature Determination Process

Figure 21:
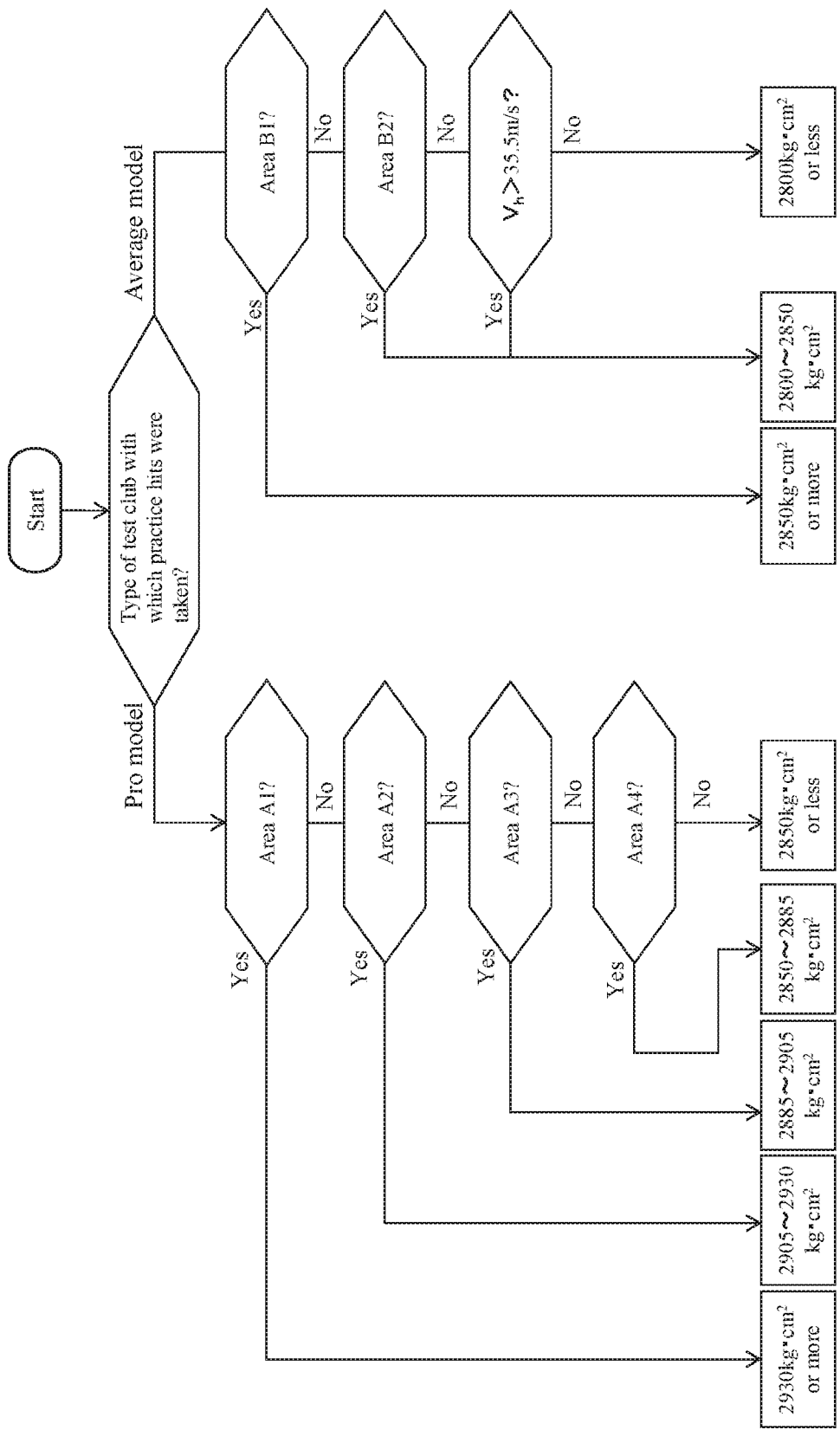
FIG. 21 is a flowchart showing the flow of an optimal feature determination process.

In the optimal feature determination process (S206), the determination unit 224E determines the range of optimal shaft weight (hereinafter, optimal shaft weight zone), according to the magnitudes of the first swing indices (arm output power $P_{1\_AVE}$, club input power $P_{2\_AVE}$, and head velocity $V_h$). Here, the optimal shaft weight zone is gradually set to larger values as the values of $P_{1\_AVE}$, $P_{2\_AVE}$, and $V_h$ increase. Specifically, the optimal feature determination process progresses according to the flowchart shown in FIG. 21.

In step S101, the determination unit 224E determines the type of preferred head 41 that is preferred by the user (hereinafter, preferred head) based on the input from the user. The preferred head is a head 41 that is to be included in the recommended golf club. The type of preferred head may be determined by getting the user to directly specify the type of preferred head via the display unit 21 and the input unit 22, or by asking various questions to the user and accepting the answers to narrow down preferred heads according to a predetermined algorithm from the answers.

In the following step S102, the determination unit 224E determines an optimal swing MI, which is an optimal swingability index, according to the magnitudes of arm output power $P_{1\_AVE}$, club input power $P_{2\_AVE}$, and head velocity $V_h$. The optimal swing MI can be calculated according to the flowchart shown in FIG. 13 as in the first embodiment, but, in the present embodiment, it is calculated in accordance with the following multiple regression equation.

$$\text{(Optimal swing } MI) = e_1 \cdot P_{1\_AVE} + e_2 \cdot P_{2\_AVE} + e_3 \cdot V_h + e_4$$

The abovementioned multiple regression equation is a multiple regression equation in which arm output power $P_{1\_AVE}$, club input power $P_{2\_AVE}$, and head velocity $V_h$ are taken as explanatory variables, and optimal swing MI is taken as a response variable. The variables $e_1$ to $e_4$ are calculated by acquiring a large number of data sets of variables $P_{1\_AVE}$, $P_{2\_AVE}$, and $V_h$ and optimal swing MI in advance through testing, and performing multiple regression analysis based on these data sets, and are stored as the correspondence data 228 in the storage unit 23. That is, the correspondence data 228 contains data defining the correspondence between the magnitudes of $P_{1\_AVE}$, $P_{2\_AVE}$, and $V_h$ and the optimal swing MI. Note that the abovementioned multiple regression equation may be prepared for each model of test clubs. In this case, the analysis precision can be improved as in the first embodiment. Note that the correspondence data 228 is shown in FIG. 19 as data that is separate from the fitting program 203, but the correspondence data 228 may be incorporated in the program 203.

In the following step S103, the determination unit 224E determines an optimal shaft weight zone, according to the magnitude of the optimal swing MI and the type of the preferred head. Specifically, the optimal swing MI is transformed into an optimal shaft weight zone according to Tables 5 and 6 below. Table 5 shows data for a head A, and Table 6 shows data for a head B that is of a different type to the head A.

TABLE 5

For Head A

| Optimal swing MI | | Optimal shaft weight zone | |
|---|---|---|---|
| 5632 or more | | 80 g or more | |
| 5578 or more | less than 5632 | 70 g or more | less than 80 g |
| 5504 or more | less than 5578 | 60 g or more | less than 70 g |
| 5430 or more | less than 5504 | 55 g or more | less than 60 g |
| | less than 5430 | 50 g or more | less than 55 g |

TABLE 6

For Head B

| Optimal swing MI | | Optimal shaft weight zone | |
|---|---|---|---|
| 5595 or more | | 80 g or more | |
| 5535 or more | less than 5595 | 70 g or more | less than 80 g |
| 5450 or more | less than 5535 | 60 g or more | less than 70 g |
| 5365 or more | less than 5450 | 55 g or more | less than 60 g |
| | less than 5365 | 50 g or more | less than 55 g |

That is, if the preferred head is the head A, the determination unit 224E determines an optimal shaft weight zone with reference to the optimal swing MI in Table 5. On the other hand, if the preferred head is the head B, the determination unit 224E determines an optimal shaft weight zone with reference to the optimal swing MI in Table 6. In the present embodiment, in step S101, either the head A or the head B is assumed to be selected as the preferred head.

The data in Tables 5 and 6 is data defining the correspondence between the optimal swing MI and the optimal shaft weight zone, and is contained in the correspondence data 228. That is, it can be said that the correspondence data 228 is data defining the correspondence between the first swing indices ($P_{1\_AVE}$, $P_{2\_AVE}$, and $V_h$) and the optimal feature index (optimal shaft weight zone). The correspondence data 228 defining the correspondence between the optimal swing MI and the optimal shaft weight zone may be prepared for each type of head 41, and, in the present embodiment, the correspondence data 228 is prepared for each of two heads that are of the same model but have different weights (the head A and the head B). Note that data that is not dependent on the type of head 41 may be prepared as the correspondence data 228 defining the correspondence between the optimal swing MI and the optimal shaft weight zone.

Incidentally, the swing moment of inertia $I_S$ of the golf club 4 is the sum of the swing moment of inertia of the head 41, the swing moment of inertia of the shaft 40, and the swing moment of inertia of the other sites (the grip 42, ferrule, etc.). Accordingly, if a head having a small (or large) swing moment of inertia is selected as the preferred head, it is preferable that a shaft having a swing moment of inertia that is larger (or smaller) by that amount is selected as the recommended shaft that is to be included in the recommended golf club 4. In this regard, if the correspondence data 228 for determining an optimal shaft weight zone is prepared for each type of head 41 as in the present embodiment, the shaft 40 is selected according to the preferred head, and the swing moment of inertia $I_S$ of the whole of the golf club 4 can be optimized. As described above, in the present embodiment, an optimal shaft weight zone that can realize the optimal swingability index in the whole of the golf club 4 is determined in a state where the type of head 41 has been determined as in the first embodiment.

Furthermore, the inventors performed testing that involved attaching shafts having various weights to a SRIXON (registered trademark) Z-745 made by Dunlop Sports Co. Ltd. and getting 37 testers to each take practice hits with these golf clubs. Then, the weight of the shaft at which the carry distance is maximized was determined for each tester, and was taken as an optimal shaft weight obtained through testing. Furthermore, the optimal shaft weight zone was derived using the same method as the abovementioned optimal feature determination process for each of the 37 testers. A comparison between these results shows that the optimal shaft weight obtained through testing ended up belonging to the optimal shaft weight zone determined in the optimal swingability determination process, for 33 out of the 37 testers. That is, it was confirmed that fitting was performed with a validity of about 90%.

2-2. Optimal Stiffness Determination Process

Next, the flow of the optimal stiffness determination process (S208) will be described. In this process, the determination unit 224E determines an optimal stiffness index (optimal flex), according to the magnitudes of the second swing indices (first to fourth feature amounts $F_1$ to $F_4$).

Specifically, first, the determination unit 224E determines the optimal EI values $J_{S1}$ to $J_{S4}$ and the optimal rank values $K_{S1}$ to $K_{S4}$, based on the first to fourth feature amounts $F_1$ to $F_4$. These values $J_{S1}$ to $J_{S4}$ and $K_{S1}$ to $K_{S4}$ may be determined as in the first embodiment.

Next, the determination unit 224E determines an optimal flex, based on the optimal rank values $K_{S1}$ to $K_{S4}$. The flex is an index for evaluating stiffness (flexural stiffness) of the whole of the shaft 40. Accordingly, if the optimal rank values $K_{S1}$ to $K_{S4}$ representing the flexural stiffness suited to the golfer 7 at a plurality of positions on the shaft 40 are known, the optimal flex can be calculated based on these values. For example, the optimal rank value at a specific position may be taken as the optimal flex, or the average value of the optimal rank values at a plurality of positions may be taken as the optimal flex.

Note that, in other embodiments, the optimal flex may be directly calculated from the optimal EI values $J_{S1}$ to $J_{S4}$ instead of being obtained from the optimal rank values $K_{S1}$ to $K_{S4}$, or may be calculated without using the values $J_{S1}$ to $J_{S4}$ and $K_{S1}$ to $K_{S4}$. In the latter case, it is sufficient that an appropriate feature amount that can specify the optimal flex is calculated in the second swing index determination process.

2-3. Optimal Club Selection Process

Once the optimal feature index (optimal shaft weight zone) and the optimal stiffness index (optimal flex) have been determined by performing the above steps, the selection unit 224F executes the optimal club selection process (S209). In this process, a recommended shaft is specified from among the large number of shafts registered in the shaft DB 29. Furthermore, a recommended golf club is also specified.

In the present embodiment, first, the selection unit 224F specifies shafts 40 (hereinafter, first narrowed-down shafts) having the same flex as the optimal flex determined in the optimal stiffness determination process, with reference to information indicating specifications of the shafts 40 registered in the shaft DB 29. Note that there are usually a large number of first narrowed-down shafts. Next, the selection unit 224F specifies a shaft 40 belonging to the optimal shaft weight zone determined in the optimal feature determination process from among the first narrowed-down shafts, and selects it as a recommended shaft. At this time, if there is no shaft 40 belonging to the optimal shaft weight zone among the first narrowed-down shafts, a shaft 40 that is the closest to the optimal shaft weight zone is selected from among the first narrowed-down shafts as a recommended shaft. Note that, as the recommended shaft, only one shaft may be specified, or a plurality of shafts may be specified. Furthermore, the selection unit 224F selects golf clubs 4 including the recommended shafts and the preferred head, as recommended golf clubs. In the present embodiment, the recommended shafts are determined giving priority to the optimal flex over the optimal shaft weight zone, but they may be determined in reverse giving priority to the optimal shaft weight zone over the optimal flex.

The display control unit 224G displays information indicating specifications (including IFC, flex, torque, kick-point, and weight values) of the recommended shafts on the display unit 21 together with information indicating the types of the recommended shafts with reference to the shaft DB 29. Furthermore, the display control unit 224G displays the golfer's optimal swing MI zone and the optimal rank values $K_{S1}$ to $K_{S4}$, on the display unit 21. Furthermore, the display control unit 224G displays information indicating that the recommended golf clubs are golf clubs obtained by combining the recommended shafts and the preferred head, on the display unit 21. The user is thereby able to find out the details of the recommended golf clubs and the recommended shafts.

3. Modified Examples

Although some embodiments of the present invention have been described above, the present invention is not limited to the foregoing embodiments, and variations that do not depart from the gist of the invention are possible. For example, the following variations are possible. Also, the substance of the following modifications can be combined as appropriate.

3-1

In the foregoing embodiments, a sensor unit 1 having three sensors, namely, an acceleration sensor, an angular velocity sensor, and a geomagnetic sensor, was used as the measurement device that measured the swing action of the golfer 7, but other configurations of the measurement device can also be adopted. For example, the geomagnetic sensor can be omitted. In this case, it is possible to use a statistical technique to change the measurement data from the xyz local coordinate system to the XYZ global coordinate system. Note that since such techniques are well-known techniques (if needed, see JP 2013-56074A), detailed description thereof will be omitted here. Alternatively, a three-dimensional measurement camera can be used as the measurement device. Since techniques for measuring the behavior of golfers, golf clubs, and golf balls using a three-dimensional measurement camera are also well-known, detailed description thereof will be omitted here. Note that, in the case where a three-dimensional measurement camera is used, the transformation process from the xyz local coordinate system to the XYZ global coordinate system of measurement data can be omitted, and the behavior of the grip in the XYZ global coordinate system can be directly measured.

3-2

In the foregoing embodiment, calculating optimal swing MI as an optimal swingability index was illustrated. However, the optimal swingability index may be calculated for various other indices representing the swingability of the golf club 4. For example, the weight $m_2$ of the golf club 4 (strictly speaking, if the mass is taken as $m_2$, the weight is $m_2 g$, but both are indicated as $m_2$ for simplicity), the moment of inertia $I_G$ about the grip end and the moment of inertia $I_2$ about the center of gravity are also indices representing the swingability of the golf club 4, and the optimal swingability index may be calculated for these indices. Furthermore, a plurality of optimal swingability indices may be calculated, and fitting may be performed based on all of these optimal swingability indices. For example, all of the optimal swing MI, the moment of inertia $I_G$ about the grip end suited to the golfer (hereinafter, optimal grip end MI), the moment of inertia $I_2$ about the center of gravity suited to the golfer (hereinafter, optimal center of gravity MI), and the weight $m_2$ of the golf club 4 suited to the golfer (hereinafter, optimal club weight) may be calculated, and the shaft DB 29 may be searched for shafts 40 of golf clubs 4 matching all of these four conditions. Furthermore, optimal feature indices matching these four conditions may be determined.

The moment of inertia $I_G$ about the grip end is calculated, for example, in accordance with the equation below. Note that $m_2$, $I_2$, and L, which are parameters for determining $I_G$, are specifications of the golf club 4, and thus $I_G$ is also a specification of the golf club 4.

$$I_G = I_2 + m_2 L^2$$

Figure 22:
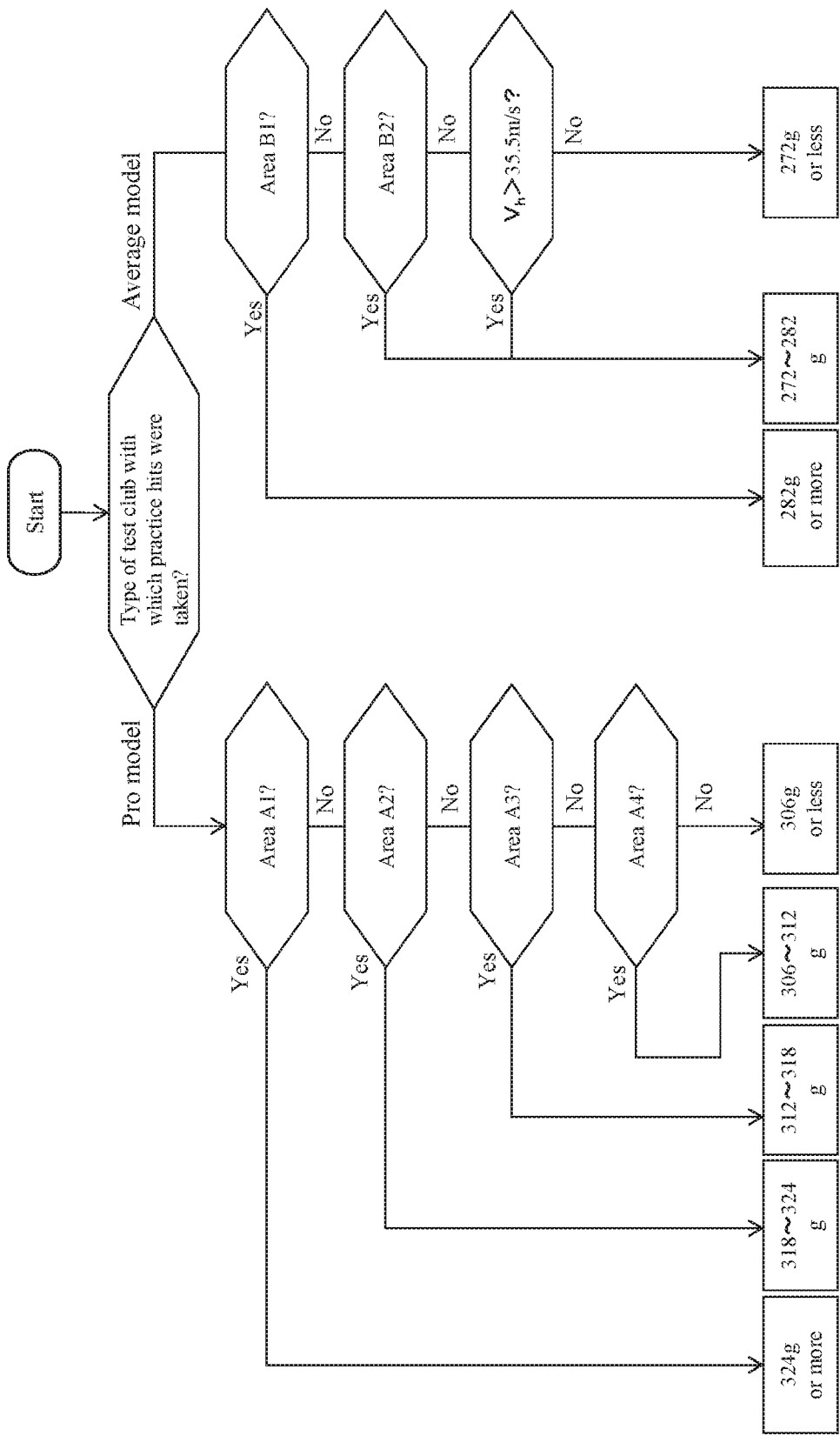
FIG. 22 is a graph plotting an $I_S$-$I_G$ relationship of various golf clubs.
Figure 23:
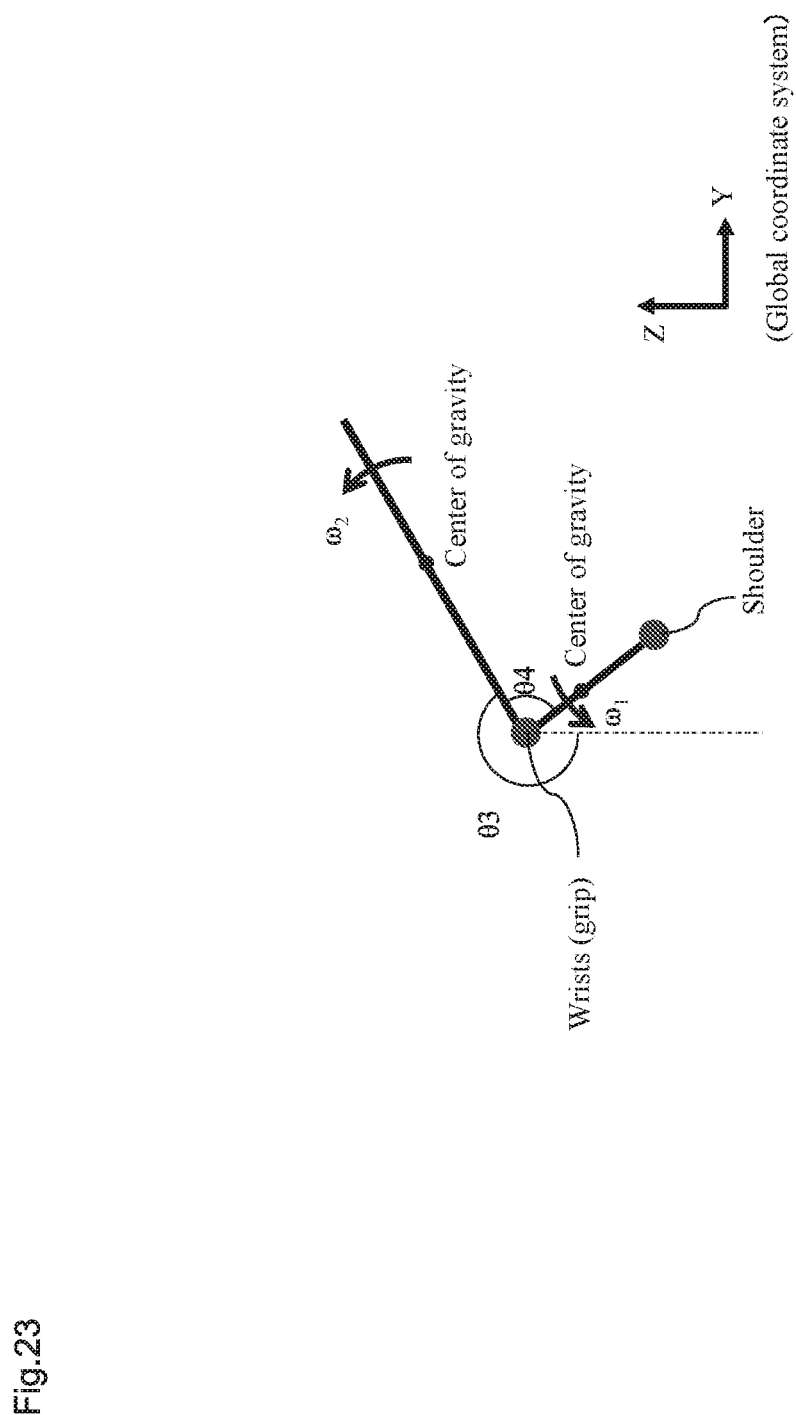
FIG. 23 is a graph plotting an $I_S$-$m_2$ relationship of various golf clubs.
Figure 24:
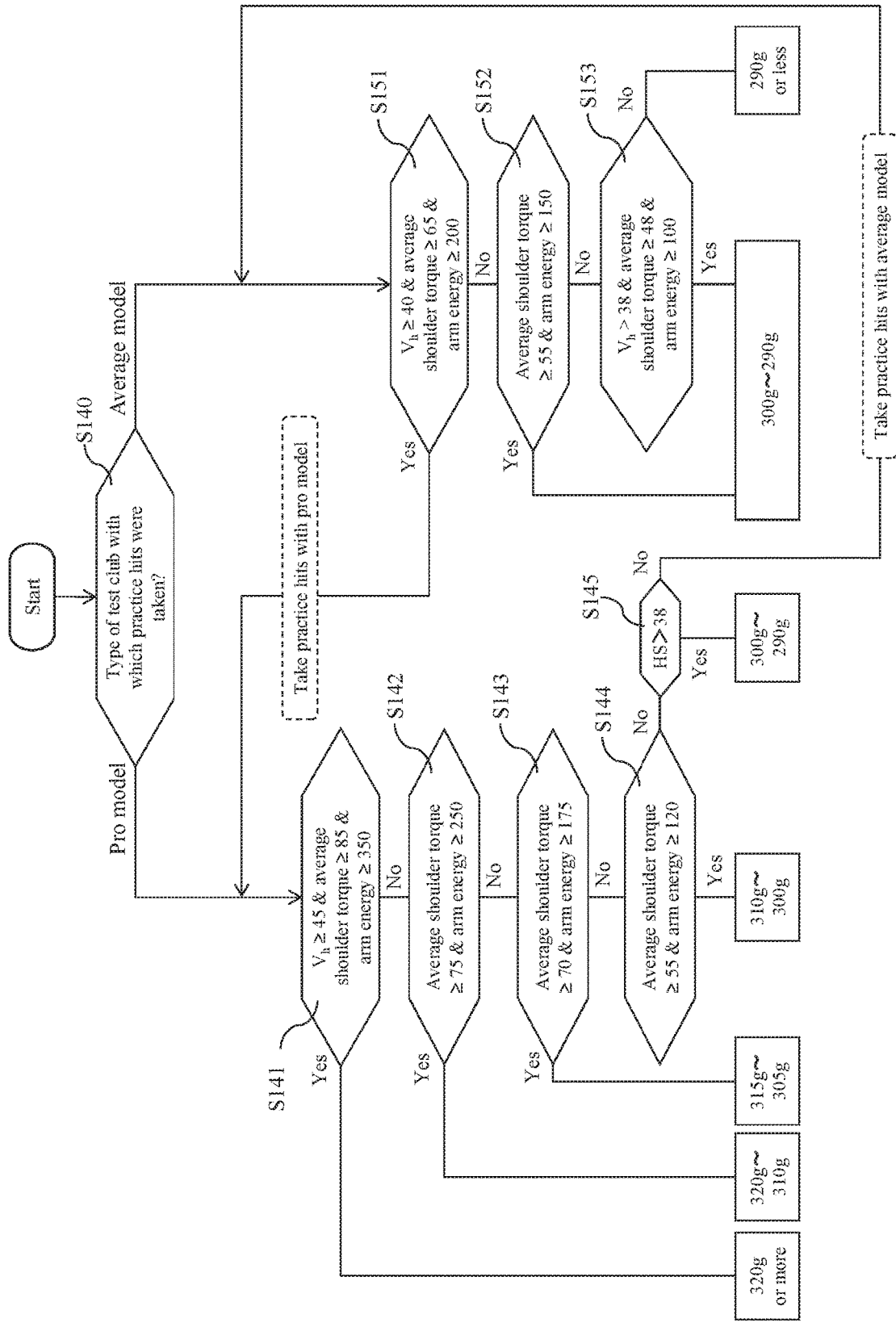
FIG. 24 is a flowchart showing the flow of an optimal swingability determination process according to a modified example.
Figure 25:
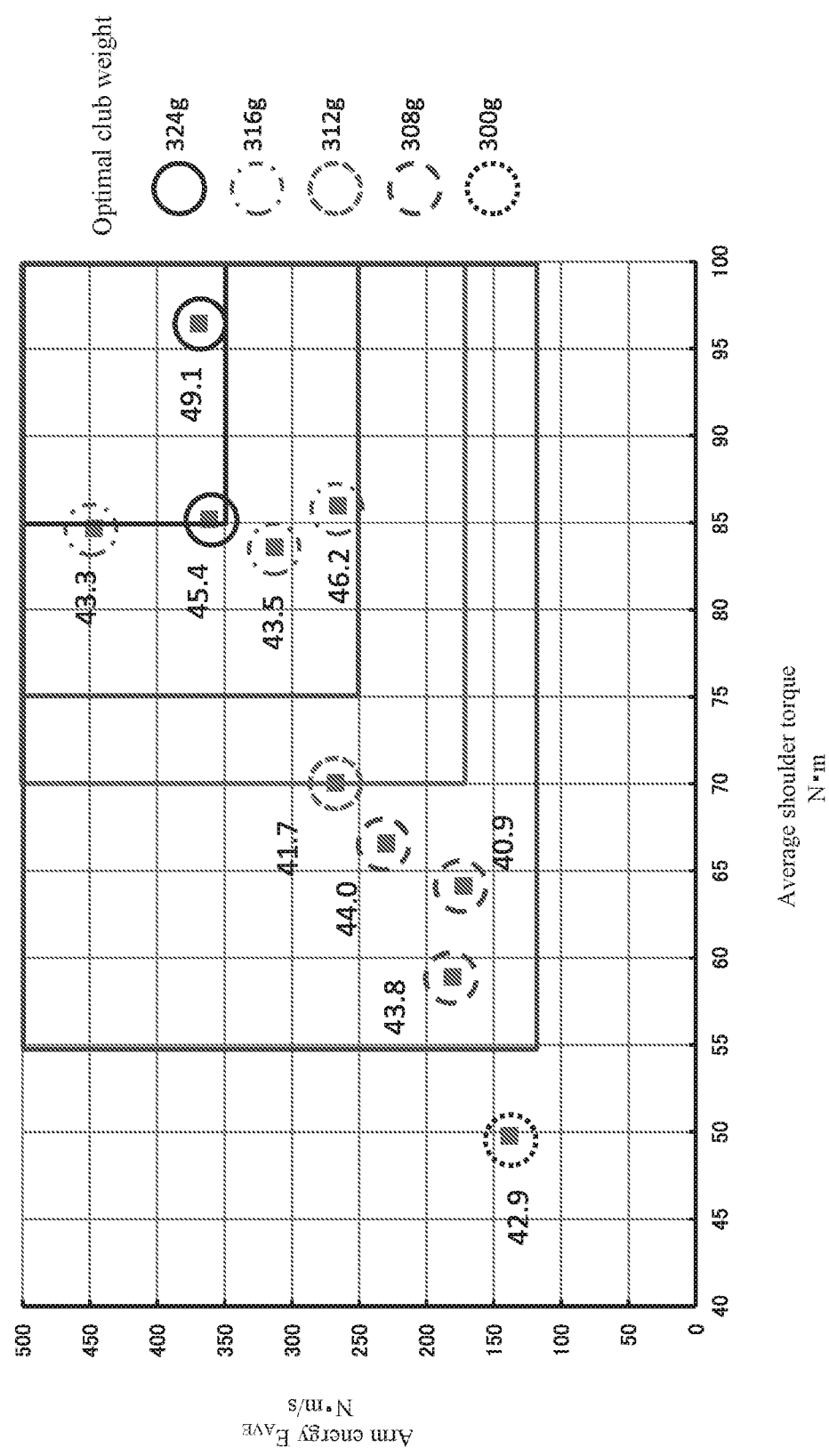
FIG. 25 is a flowchart showing the flow of an optimal swingability determination process according to another modified example.

Furthermore, the weight $m_2$ of the golf club 4, the moment of inertia $I_G$ about the grip end, and the moment of inertia $I_2$ about the center of gravity are substantially proportional to the swing moment of inertia $I_S$. For example, FIG. 22 is a graph plotting an $I_S$-$I_G$ relationship of various golf clubs, and FIG. 23 is a graph plotting an $I_S$-$m_2$ relationship of various golf clubs. Accordingly, in the optimal swingability determination process according to the foregoing embodiment, if the optimal swing MI is transformed into the optimal grip end MI, the optimal center of gravity MI, or the optimal club weight, the optimal swingability for $I_G$, $I_2$ and $m_2$ can be determined. For example, FIGS. 24 and 25 are obtained by modifying the flowchart in FIG. 13, where FIG. 25 is a flowchart for determining an optimal club weight, and FIG. 24 is a flowchart for determining an optimal grip end MI.

3-3

In the foregoing embodiment, three indices consisting of arm output power $P_{1\_AVE}$, club input power $P_{2\_AVE}$, and head velocity $V_h$ were used in combination as first swing indices for determining an optimal swingability index. However, there is no limitation to this example, and, for example, only $P_{1\_AVE}$ or only $P_{2\_AVE}$ may be used as a swing index, or two indices such as ($P_{1\_AVE}$ and $V_h$), ($P_{2\_AVE}$ and $V_h$), or ($P_{1\_AVE}$ and $P_{2\_AVE}$) may be used in combination.

Furthermore, as shown in Modified Example 3-2, the optimal swingability index is not limited to the optimal swing MI, and may be various indices. The first swing indices can be said to refer to arbitrary indices as long as there is a certain relationship (correlation) with the optimal swingability index. For example, arm energies $E_{AVE}$ and $E_1$ that are exerted by the golfer during the swing action are correlated with the optimal swingability index, and thus they may be used as the first swing indices. Furthermore, total shoulder torque $T_{ti}$ and average shoulder torque $T_{AVE}$ below are also correlated with the optimal swingability index, and thus they may be used as the first swing indices. Note that $T_{ti}$ and $T_{AVE}$ are indices representing the torque about the shoulder that is exerted by the golfer during the swing action.

The total shoulder torque $T_{ti}$ and the average shoulder torque $T_{AVE}$ can be calculated as follows. First, torque $T_1$ about the shoulder and torque $T_2$ about the grip 42 from top to impact are calculated in accordance with the equations below.

$T_1 = I_1 \omega_1' + 2r \sin \theta_1 \cdot R_{X2} - 2r \cos \theta_1 \cdot R_{Y2} + m_1 r \cos \theta_1 \cdot A_{Y1} - m_1 r \sin \theta_1 \cdot A_{X1} + m_1 r \cos \theta_1 \cdot g \sin \alpha + T_2$   Equation 26

$T_2 = I_2 \omega_2' + m_2 L \cos \theta_2 \cdot A_{Y2} - m_2 L \sin \theta_2 \cdot A_{X2} + m_2 L \cos \theta_2 \cdot g \sin \alpha$   Equation 27

The total shoulder torque $T_{ti}$ is a value $T_{ti}$ obtained by integrating the abovementioned torque $T_1$ about the shoulder for the segment from top to impact. $T_{ti}$ is the total amount of torque exerted about the shoulder of the golfer 7 from top to impact. Meanwhile, the average shoulder torque $T_{AVE}$ is the average torque about the shoulder during the swing action obtained by dividing total shoulder torque $T_{ti}$ by the time from top to impact, and is calculated in accordance with the equation $T_{AVE}=T_{ti}/(t_i-t_t)$. Note that in calculating total shoulder torque $T_{ti}$, a configuration may be adopted in which only positive torque $T_1$ is integrated.

Furthermore, the following indices also may be used as the first swing indices. Note that with the following indices apart from (7) to (9), the optimal swingability index tends to increase as the value of the index increases, and that with the indices of (7) to (9), the optimal swingability index tends to increase as the value of the index decreases.

Figure 26:
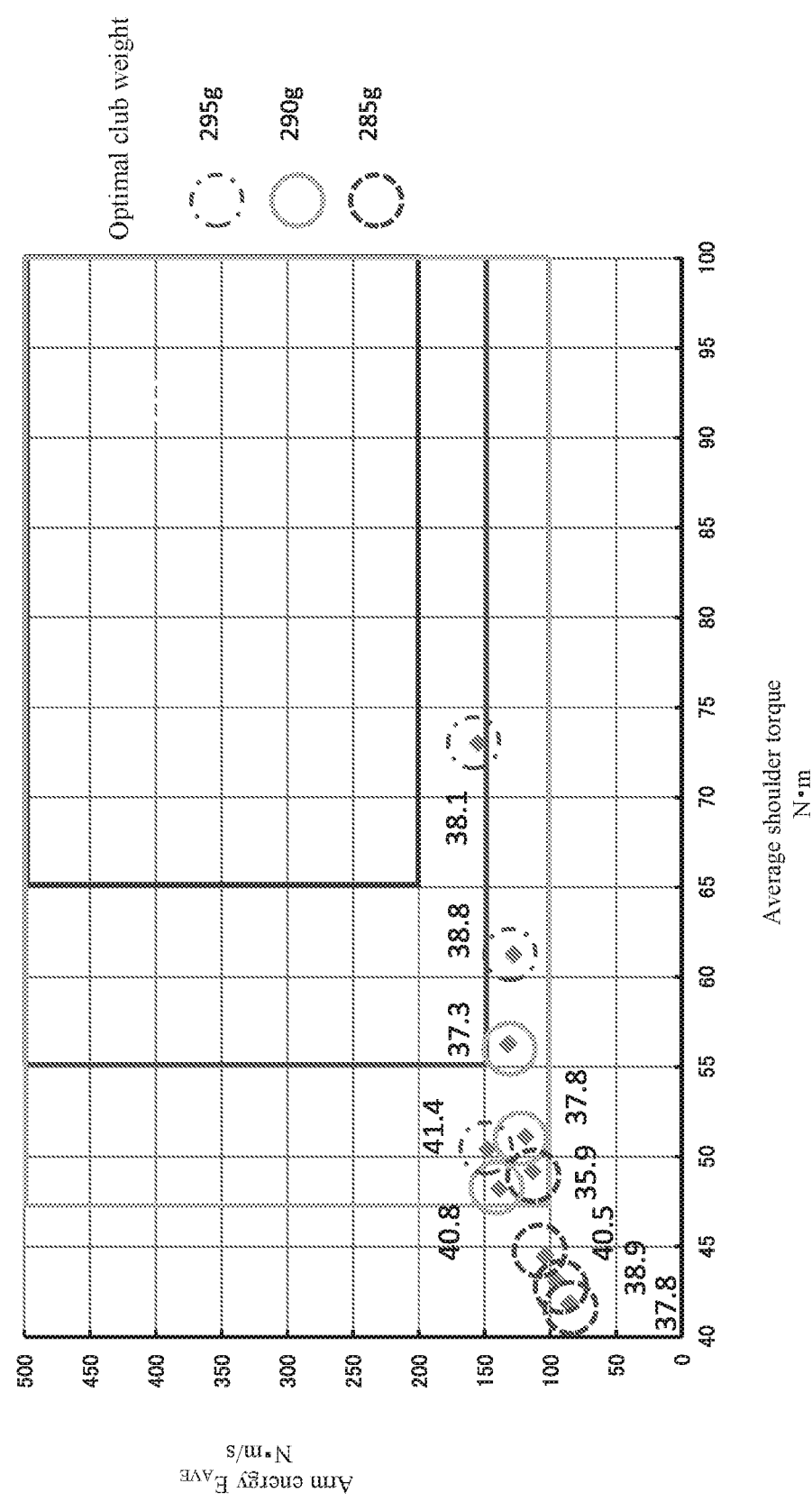
FIG. 26 is a diagram illustrating angles that are first swing indices according to a modified example.

(1) Angle θ3 formed by the shaft 40 and the Z-axis (below the grip) of the global coordinate system at top (see FIG. 26)
(2) Average value of angular velocity $\omega_2$ during the swing action
(3) Maximum value of angular velocity $\omega_2$ from top to impact
(4) Average value of grip speed $V_{GE}$ from top to impact
(5) Maximum value of grip speed $V_{GE}$ from top to impact
(6) Movement distance D of the grip 42 from top to impact
(7) Difference between wrist-cock release timing $t_r$ and the time of impact (wrist-cock release timing $t_r$ referred to here can be defined as the timing at which the release speed of the wrist-cock angle θ4 formed by the arm and the shaft 40 quickens and the energy of the arm starts to change to the energy of the shaft 40.)
(8) Wrist-cock angle θ4 formed by the arm and the shaft 40 at wrist-cock release timing $t_r$ (see FIG. 26)
(9) Downswing time, i.e., time from top to impact
(10) Integral value of torque $T_2$ from top to when the sign of torque $T_2$ about the grip 42 inverts 3-3-1

Figure 27:
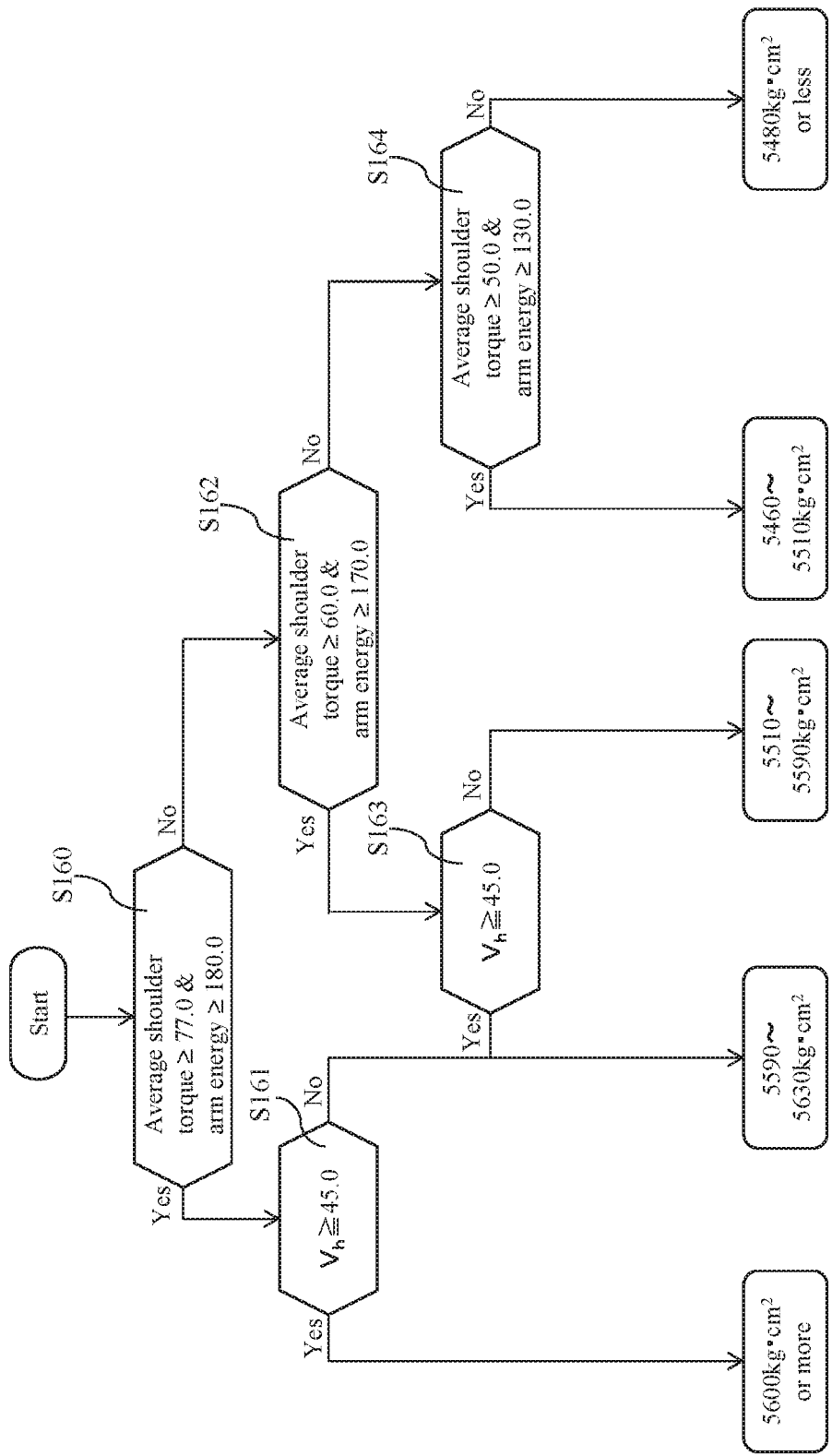
FIG. 27 is a flowchart showing the flow of an optimal swingability determination process according to yet another modified example.

Hereinafter, an optimal swingability determination process in a case where arm energy $E_{AVE}$, average shoulder torque $T_{AVE}$, and head velocity $V_h$ are calculated as first swing indices, and the range of optimal club weight (hereinafter, optimal weight zone) is calculated according to these indices $E_{AVE}$, $T_{AVE}$, and $V_h$ will be specifically described with reference to FIGS. 27 to 29.

First, in step S140, the determination unit 24E determines the type of test club with which practice hits were taken in the measurement process. If the practice hits were taken with the pro model club, the processing advances to step S141, and if practice hits were taken with the average model club, the processing advances to step S151. Which test club was used to take practice hits is assumed to be determined based on the information input by the user via the input unit 22.

The following step S141 and steps S142 to S145 following thereon are steps for determining the optimal weight zone, according to the magnitudes of average shoulder torque $T_{AVE}$, arm energy $E_{AVE}$, and head velocity $V_h$. Here, the optimal weight zone is gradually set to larger values as the values of $T_{AVE}$, $E_{AVE}$, and $V_h$ increase.

Specifically, in step S141, the determination unit 24E determines whether or not head velocity $V_h$ is 45 m/s or more, average shoulder torque $T_{AVE}$ is 85 N·m or more, and arm energy $E_{AVE}$ is 350 N·m/s or more (hereinafter, pro condition 1). If pro condition 1 is satisfied, the determination unit 24E then determines the optimal weight zone to be 320 g or more. On the other hand, if pro condition 1 is not satisfied in step S141, the processing advances to step S142. In step S142, the determination unit 24E determines whether or not average shoulder torque $T_{AVE}$ is 75 N·m or more and arm energy $E_{AVE}$ is 250 N·m/s or more (hereinafter, pro condition 2). If pro condition 2 is satisfied, the determination unit 24E then determines the optimal weight zone to be 310 g to 320 g. On the other hand, if pro condition 2 is not satisfied in step S142, the processing advances to step S143. In step S143, the determination unit 24E determines whether or not average shoulder torque $T_{AVE}$ is 70 N·m or more and arm energy $E_{AVE}$ is 175 N·m/s or more (hereinafter, pro condition 3). If pro condition 3 is satisfied, the determination unit 24E then determines the optimal weight zone to be 305 g to 315 g. On the other hand, if pro condition 3 is not satisfied in step S143, the processing advances to step S144. In step S144, the determination unit 24E determines whether or not average shoulder torque $T_{AVE}$ is 55 N·m or more and arm energy $E_{AVE}$ is 120 N·m/s or more (hereinafter, pro condition 4). If pro condition 4 is satisfied, the determination unit 24E then determines the optimal weight zone to be 300 g to 310 g. On the other hand, if pro condition 4 is not satisfied in step S144, the processing advances to step S145. In step S145, the determination unit 24E determines whether or not head velocity $V_h$ is greater than 38 m/s (hereinafter, pro condition 5). If pro condition 5 is satisfied, the determination unit 24E then determines the optimal weight zone to be 290 g to 300 g. On the other hand, if pro condition 5 is not satisfied in step S145, the determination unit 24E determines the average model club to be more suitable than the pro model club. In response, the display control unit 24G displays a message indicating to redo the fitting from the measurement process using the average model club on the display unit 21, and the processing advances to step S151.

On the other hand, step S151 and steps S152 and S153 following thereon are steps for determining the optimal weight zone, according to the magnitudes of average shoulder torque $T_{AVE}$, arm energy $E_{AVE}$, and head velocity $V_h$. Here, the optimal weight zone is gradually set to larger values as the values of $T_{AVE}$, $E_{AVE}$, and $V_h$ increase.

Specifically, the determination unit 24E, in step S151, determines whether or not head velocity $V_h$ is 40 m/s or more, average shoulder torque $T_{AVE}$ is 65 N·m or more, and arm energy $E_{AVE}$ is 200 N·m/s or more (hereinafter, average condition 1). If average condition 1 is satisfied, the determination unit 24E then determines the pro model club to be more suitable than the average model club. In response, the display control unit 24G displays a message indicating to redo the fitting from the measurement process using the pro model club on the display unit 21, and the processing advances to step S141. On the other hand, if average condition 1 is not satisfied in step S151, the processing advances to step S152. In step S152, the determination unit 24E determines whether or not average shoulder torque $T_{AVE}$ is 55 N·m or more and arm energy $E_{AVE}$ is 150 N·m/s or more (hereinafter, average condition 2). If average condition 2 is satisfied, the determination unit 24E then determines the optimal weight zone to be 290 g to 300 g. On the other hand, if average condition 2 is not satisfied in step S152, the processing advances to step S153. In step S153, the determination unit 24E determines whether or not head velocity $V_h$ is greater than 38 m/s, average shoulder torque $T_{AVE}$ is 48 N·m or more, and arm energy $E_{AVE}$ is 100 N·m/s or more (hereinafter, average condition 3). If average condition 3 is satisfied, the determination unit 24E then determines the optimal weight zone to be 290 g to 300 g. On the other hand, if average condition 3 is not satisfied in step S153, the determination unit 24E determines the optimal weight zone to be 290 g or less.

The above steps S141 to S145 and S151 to S153 are based on the following findings. That is, the inventors obtained the results shown FIGS. 28 and 29 after getting ten golfers who usually use a pro model club (hereinafter, pro model users) to take practice hits with the pro model club and ten golfers who usually use an average model club (hereinafter, average model users) to take practice hits with the average model club. The inventors then discovered from the results shown in FIGS. 28 and 29 that the space showing the first swing indices was divided into a pro model area and an average model area. In the example in FIGS. 28 and 29, the pro model area is an area in which average shoulder torque $T_{AVE} \geq 55$ N·m and arm energy $E_{AVE} \geq 150$ N·m/s, and the average model area is an area in which average shoulder torque $T_{AVE} < 55$ N·m or arm energy $E_{AVE} < 150$ N·m/s. However, these figures can change depending on swing conditions such as the type of test club. This testing was performed using a SRIXON (registered trademark) Z-525 driver made by Dunlop Sports Co. Ltd. (Miyazaki KENA Blue6 S-Flex shaft, golf club weight of 315 g, and balance of D2) as the pro model club, and a XXIO (registered trademark) 7 driver made by Dunlop Sports Co. Ltd. (MP-700 R-Flex shaft, golf club weight of 285 g, and balance of D1) as the average model club.

In the testing described with reference to FIGS. 28 and 29, head velocity $V_h$, and the optimal club weight at which the carry distance is maximized were also calculated. Head velocity $V_h$ was calculated as described above. On the other hand, the optimal club weight was determined by getting the golfers to swing golf clubs having various weights, specifying the weight of the golf club that provided the maximum carry distance, and taking the specified weight as the optimal club weight. More specifically, this involved getting the pro model users to swing five types of golf clubs having weights of 324 g, 316 g, 312 g, 308 g and 300 g, and the average model users to swing golf clubs having weights of 295 g, 290 g and 285 g. FIGS. 28 and 29 show the values of head velocity $V_h$ and optimal club weight obtained from this testing.

Figure 28:
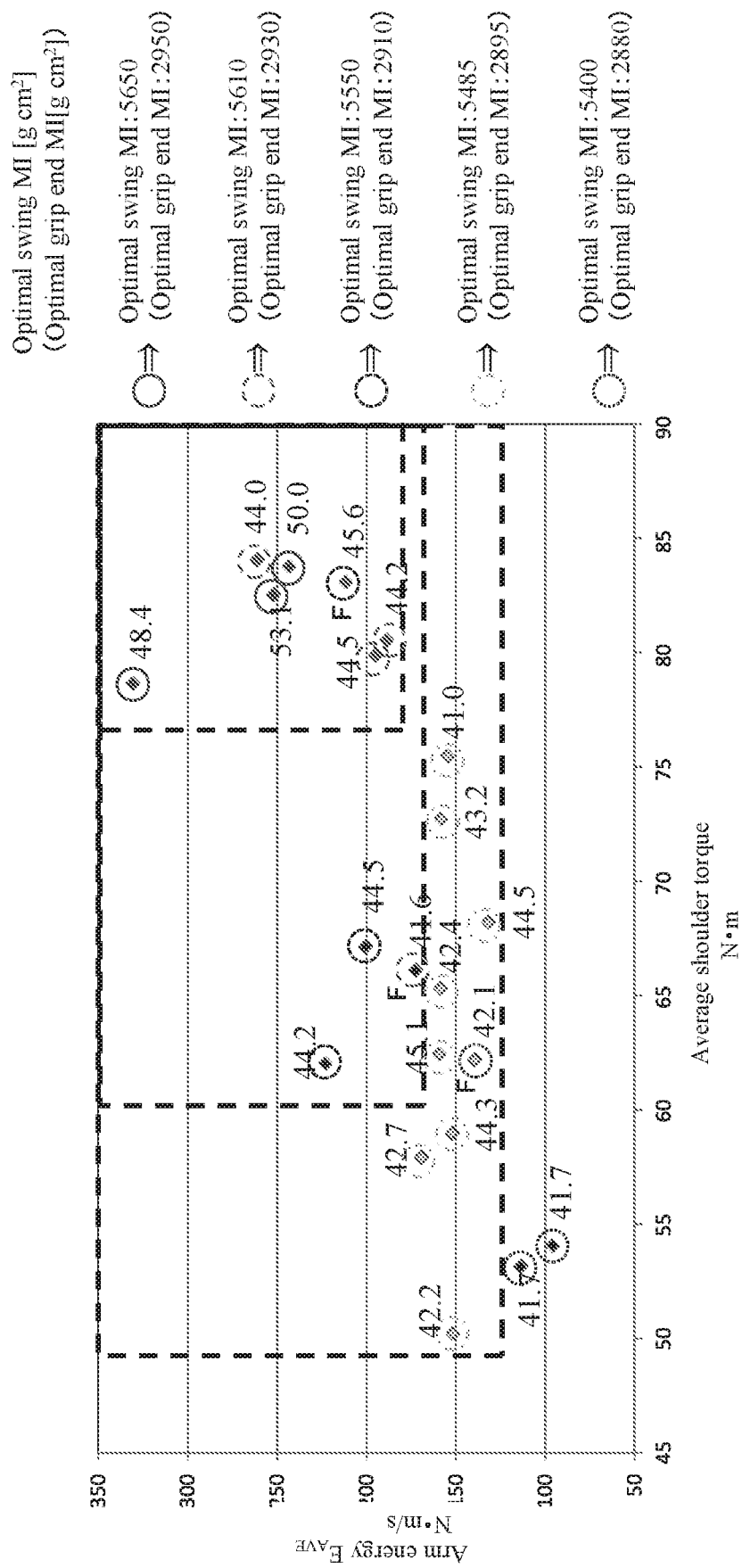
FIG. 28 is a diagram showing a pro model area according to the modified example in FIG. 27.
Figure 29:
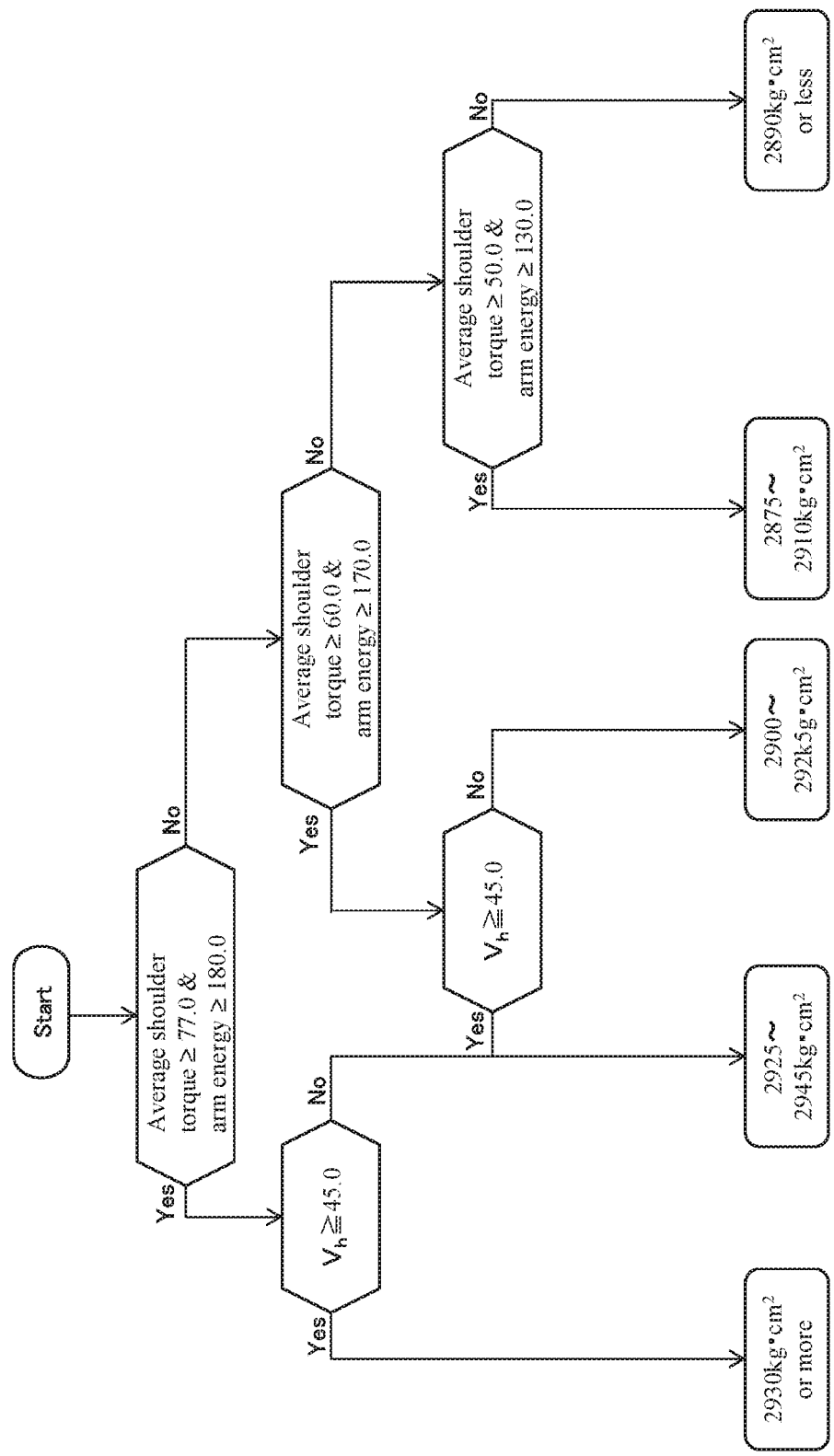
FIG. 29 is a diagram showing an average model area according to the modified example in FIG. 27.

It is evident from the above testing that the optimal club weight increases as arm energy $E_{AVE}$ and average shoulder torque $T_{AVE}$ increase, as shown in FIGS. 28 and 29. As a result, the inventors found that the area indicating the optimal weight zone can be defined by dividing the average shoulder torque $T_{AVE}$-arm energy $E_{AVE}$-head velocity $V_h$ space as shown in FIG. 28 for the pro model users and as shown in FIG. 29 for the average users. For simplicity, however, FIGS. 28 and 29 omit an axis indicating head velocity $V_h$ and show an average shoulder torque $T_{AVE}$-arm energy $E_{AVE}$ plane. That is, the abovementioned steps S141 to S145 and S151 to S153 are steps for determining the optimal weight zone according to which area the points representing average shoulder torque $T_{AVE}$, arm energy $E_{AVE}$ and head velocity $V_h$ are plotted in $T_{AVE}$-$E_{AVE}$-$V_h$ space. Note that the thresholds of $T_{AVE}$, $E_{AVE}$ and $V_h$ that are used in the determination processing of steps S141 to S145 and S151 to S153, or in other words, values indicating the boundaries of the division areas shown in FIGS. 28 and 29, are arranged by model of the test clubs, and stored in the storage unit 23 as the correspondence data 28. That is, the correspondence data 28 according to this modified example is data defining the correspondence between the magnitudes of $T_{AVE}$, $E_{AVE}$ and $V_h$ and the optimal weight zones. In steps S141 to S145 and S151 to S153, the determination processing is performed with reference to the correspondence data 28.

3-3-2

Figure 30A:
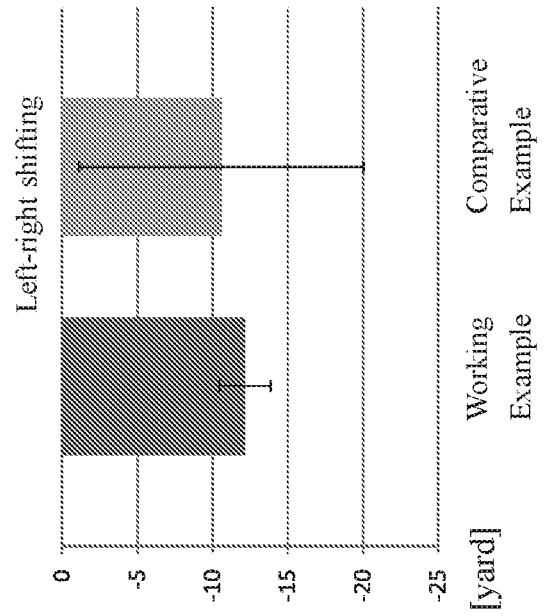
FIG. 30 is a flowchart showing the flow of an optimal swingability determination process according to yet another modified example.
Figure 30B:
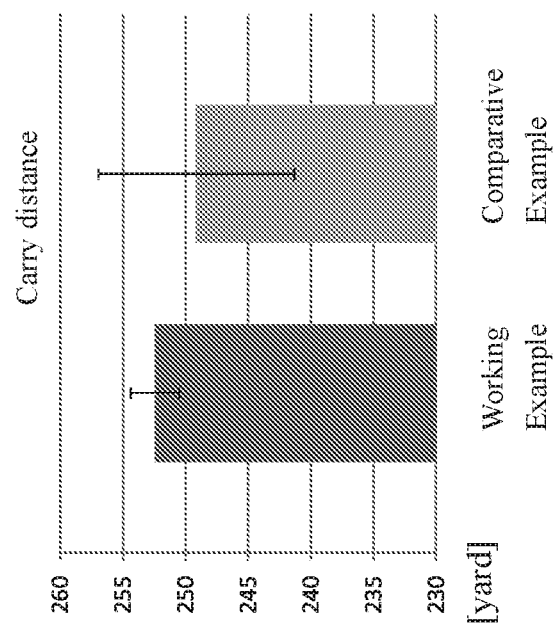

Hereinafter, an optimal swingability determination process in a case where arm energy $E_{AVE}$, average shoulder torque $T_{AVE}$, and head velocity $V_h$ are calculated as first swing indices, and an optimal swing MI zone is calculated according to these indices $E_{AVE}$, $T_{AVE}$, and $V_h$ will be specifically described with reference to FIGS. 30 and 31.

In the measurement process prior to this modified example, the golfer 7 takes practice hits with one test club having the sensor unit 1 attached, instead of two test clubs consisting of a pro model club and an average model club. This modified example also can be configured to take practice hits with two test clubs, thus enabling the fitting accuracy to be improved.

Specifically, in step S160, the determination unit 24E determines whether or not average shoulder torque $T_{AVE}$ is 77 N·m or more and arm energy $E_{AVE}$ is 180 N·m/s or more (hereinafter, condition 1). If condition 1 is satisfied, the determination unit 24E determines whether or not head velocity $V_h$ is 45 m/s or more (hereinafter, condition 2) (step S161). If condition 2 is satisfied, the determination unit 24E then determines the optimal swing MI zone to be 5600 kg·cm², and otherwise determines the optimal swing MI zone to be 5590 to 5630 kg·cm². On the other hand, if condition 1 is not satisfied in step S160, the processing advances to step S162. In step S162, the determination unit 24E determines whether or not average shoulder torque $T_{AVE}$ is 60 N·m or more and arm energy $E_{AVE}$ is 170 N·m/s or more (hereinafter, condition 3). If condition 3 is satisfied, the determination unit 24E determines whether or not head velocity $V_h$ is 45 m/s or more (hereinafter, condition 4) (step S163). If condition 4 is satisfied, the determination unit 24E then determines the optimal swing MI zone to be 5590 to 5630 kg·cm², and otherwise determines the optimal swing MI zone to be 5510 to 5590 kg·cm². On the other hand, if condition 3 is not satisfied in step S162, the processing advances to step S164. In step S164, the determination unit 24E determines whether or not average shoulder torque $T_{AVE}$ is 50 N·m or more and arm energy $E_{AVE}$ is 130 N·m/s or more (hereinafter, condition 5). If condition 5 is satisfied, the determination unit 24E then determines the optimal swing MI zone to be 5460 to 5510 kg·cm², and otherwise determines the optimal swing MI zone to be 5480 kg·cm² or less.

The above steps S160 to S164 are based on the following findings. That is, the inventors obtained the results shown in FIG. 31 after getting 21 golfers to each take practice hits with the test club according to the present embodiment and then calculating swing indices. Note that the swing indices calculated in this testing were average shoulder torque $T_{AVE}$ and arm energy $E_{AVE}$, and the specific values were calculated as described above. This testing was performed using a SRIXON (registered trademark) Z-525 driver made by Dunlop Sports Co. Ltd. (Miyazaki Kosuma Blue6 S-Flex shaft, golf club weight of 314 g, and balance of D3) as the test club. Also, in this testing, head velocity $V_h$, and the optimal swing MI at which the carry distance is maximized were also calculated. Head velocity $V_h$ was calculated as described above. On the other hand, the optimal swing MI was determined by getting the golfers to swing golf clubs having various swing moments of inertia, specifying the swing moment of inertia of the golf club that provided the maximum carry distance, and taking the specified swing moment of inertia as the optimal swing MI. More specifically, the golfers were made to swing five types of golf clubs having swing moments of inertia of 5650 kg·cm², 5610 kg·cm², 5550 kg·cm², 5485 kg·cm², and 5400 kg·cm². FIG. 31 shows the values of head velocity $V_h$ and optimal swing MI obtained by this testing.

Figure 31:
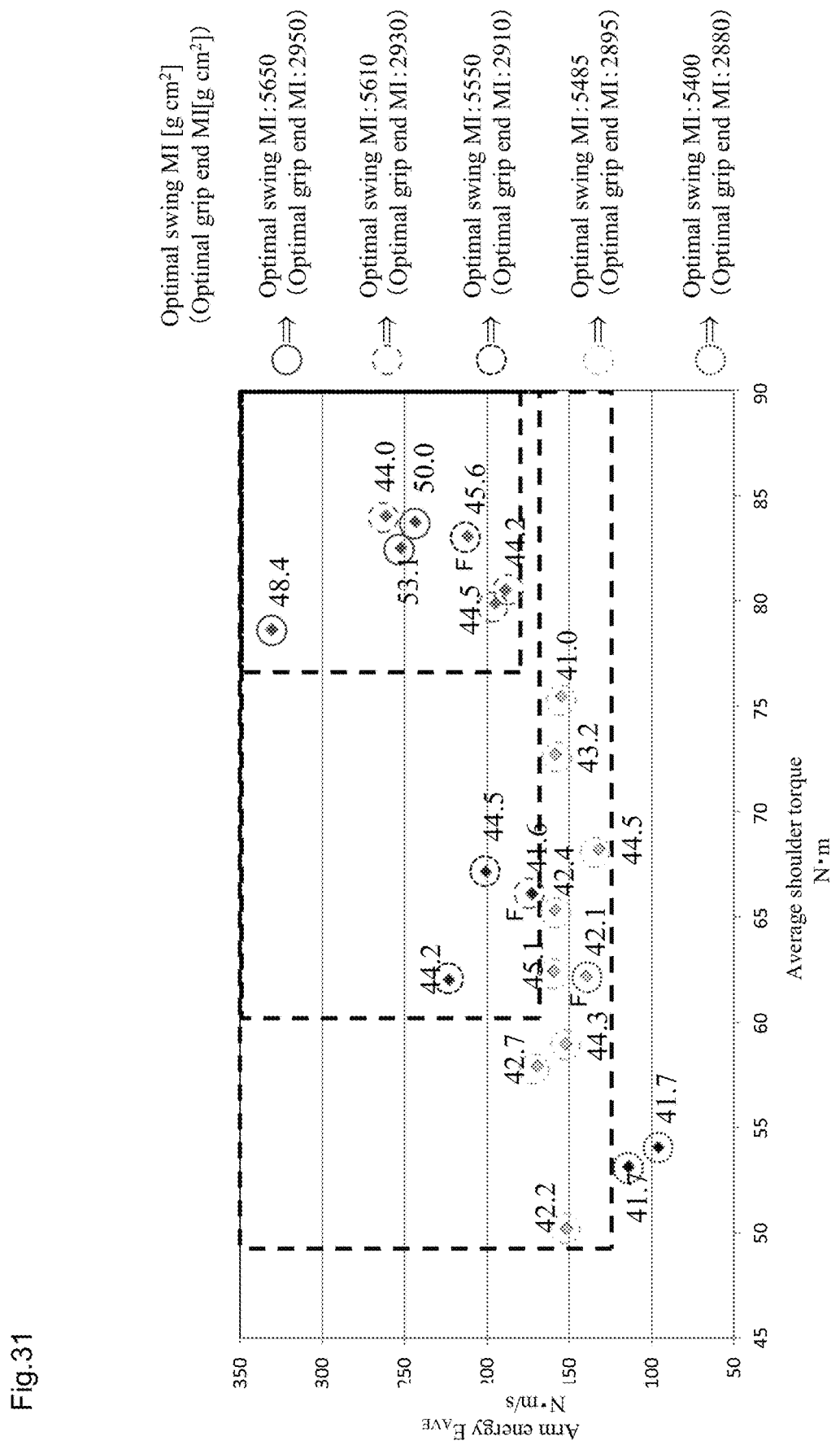
FIG. 31 is a diagram showing an average shoulder torque-arm energy plane according to the modified example in FIG. 30.

It is evident from the testing that the optimal swing MI increases as both arm energy $E_{AVE}$ and average shoulder torque $T_{AVE}$ increase, as shown in FIG. 31. As a result, the inventors found that the area indicating the optimal swing MI zone can be defined by dividing the average shoulder torque $T_{AVE}$-arm energy $E_{AVE}$-head velocity $V_h$ space as shown in FIG. 31. For simplicity, however, FIG. 31 omits an axis indicating head velocity $V_h$ and shows the average shoulder torque $T_{AVE}$-arm energy $E_{AVE}$ plane. That is, the abovementioned steps S160 to S164 are steps for determining the optimal swing MI zone according to which area the points representing average shoulder torque $T_{AVE}$, arm energy $E_{AVE}$, and head velocity $V_h$ are plotted in $T_{AVE}$-$E_{AVE}$-$V_h$ space. Note that the thresholds of $T_{AVE}$, $E_{AVE}$ and $V_h$ that are used in the determination processing of steps S160 to S164, or in other words, the values indicating the boundary between the division areas shown in FIG. 31, are stored in the storage unit 23 as the correspondence data 28. That is, the correspondence data 28 according to this modified example is data for determining the correspondence between the magnitudes of $T_{AVE}$, $E_{AVE}$ and $V_h$, and the optimal swing MI zones. In steps S160 to S164, the above determination is performed with reference to correspondence data 28 in the storage unit 23.

Figure 32:
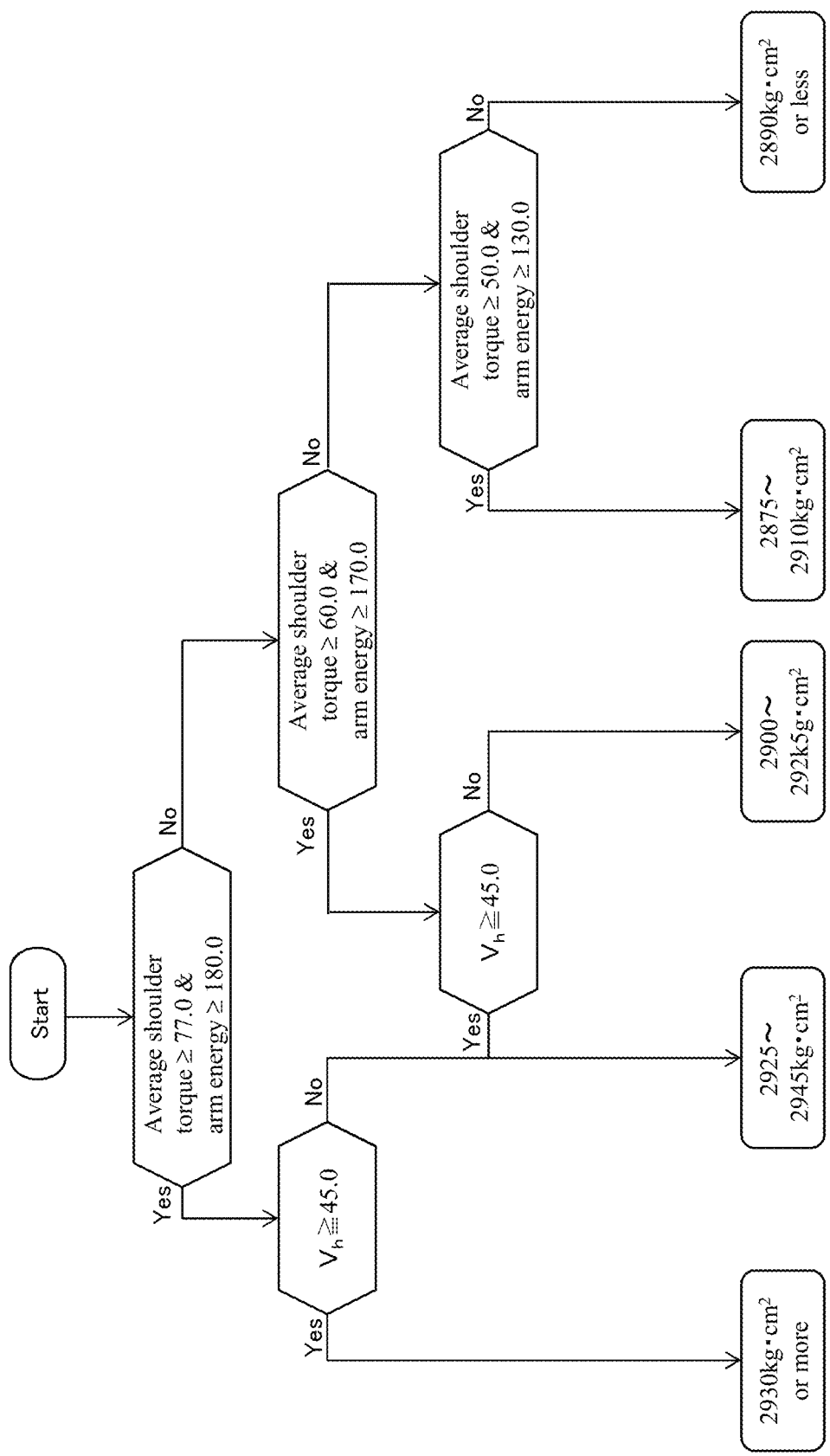
FIG. 32 is a flowchart showing the flow of an optimal swingability determination process according to yet another modified example.

Furthermore, as described above, the moment of inertia $I_G$ about the grip end is substantially proportional to the swing moment of inertia $I_S$. Accordingly, if the optimal swing MI zone determined in the optimal swingability determination process in FIG. 30 is transformed into the range of moment of inertia $I_G$ suited to the golfer, the optimal swingability determination process based on $I_G$ can be executed. FIG. 32 is obtained by modifying the flowchart in FIG. 30, and is a flowchart for determining an optimal grip end MI. Note that values obtained by converting the optimal swing MI into the optimal grip end MI are also shown in the legend on the right side in FIG. 31.

3-4

In the first and second embodiments, flexural stiffness was evaluated as the shaft stiffness, but torsional stiffness may be evaluated instead. The value of torsional stiffness (hereinafter, GJ value) also can be measured or calculated at a plurality of positions along the direction in which the shaft 40 extends. That is, a distribution of torsional stiffnesses at a plurality of positions along the direction in which the shaft 40 extends may be taken as the shaft stiffness. In this case, a GJ value suited to the golfer 7 (optimal GJ value) is determined as the optimal stiffness index, but, as the second swing indices for determining the optimal GJ value, arbitrary indices may be used as long as there is a correlation with the optimal GJ value. Examples of such second swing indices include the following indices as described in JP 2014-212862A.

(1) Magnitude of change amount of grip angular velocity $\omega_x$ per unit time from a time at which grip angular velocity $\omega_y$ is maximized to impact.

(2) Change amount of grip angular velocity $\omega_z$ near top (3) Magnitude of change amount of grip angular velocity $\omega_z$ from top to a time at which grip angular velocity $\omega_y$ is maximized during downswing Also in this modified example, if approximation formulae representing relationships between the second swing indices and the optimal GJ values are calculated in advance through testing and stored in the storage unit 23, an optimal GJ value can be determined from the second swing indices based on measurement data obtained in the measurement process.

Furthermore, in the first embodiment, flex, kick-point, or torque of the shaft 40 suited to the golfer 7 may be determined as the optimal stiffness index instead of a distribution of stiffnesses at a plurality of positions on the shaft 40 suited to the golfer 7. In a similar manner, also in the second embodiment, kick-point, torque, or a distribution of stiffnesses at a plurality of positions on the shaft 40 suited to the golfer 7 may be determined as the optimal stiffness index instead of flex the shaft 40 suited to the golfer 7. Note that torque is an index representing the torsional stiffness of the whole of the shaft 40.

3-5

In the foregoing embodiments, an example of the shoulder behavior derivation process is premised on the abovementioned (1) to (5), but the algorithm for the shoulder behavior derivation process is not limited to this, and may be as follows.

Figure 33:
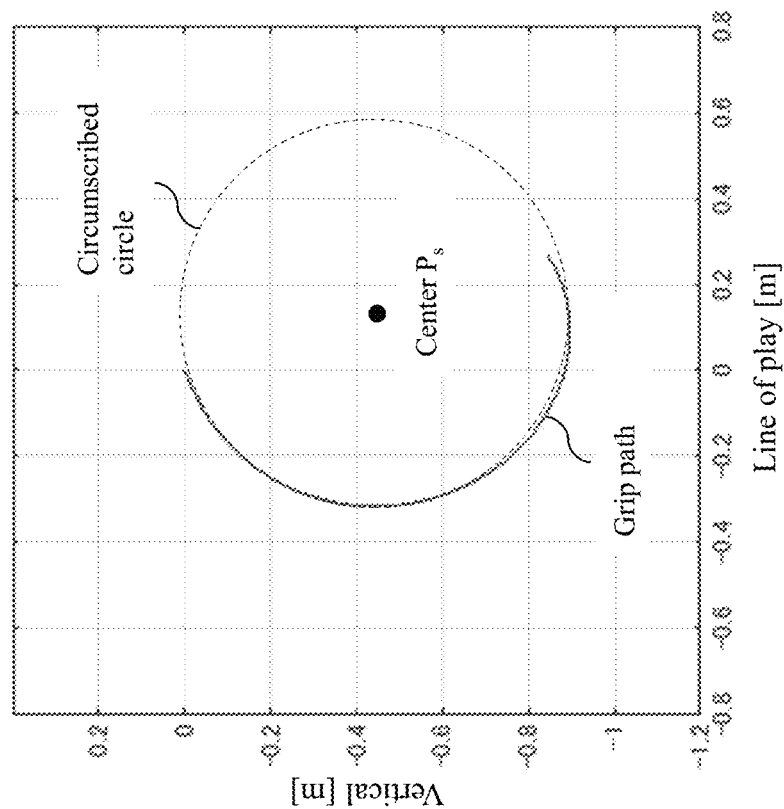
FIG. 33 is a diagram conceptually illustrating a shoulder behavior derivation process according to a modified example.

The shoulder behavior derivation process according to this modified example may be premised only on the premises (1) to (3), omitting (4) and (5) out of the abovementioned premises (1) to (5). Specifically, the shoulder behavior derivation unit 24C approximates path of the grip 42 in swing plane P obtained in the second transformation process to an arc (circle) (see FIG. 33). Then, the center of this arc (circle) is set to shoulder position $P_s=(P_{sX}, P_{sY})$, and the average distance from the center of the arc (circle) to the path of the grip 42 is taken as an arm length (distance between the shoulder and the grip 42) R. In this case, it is assumed that the grip behavior derivation unit 24B has calculated the path of the grip 42 in swing plane P in the second transformation process before the shoulder behavior derivation process. For example, the path of the grip 42 can be derived by integrating grip velocity $(v_{pY}, v_{pZ})$ in swing plane P, and calculating points $A_i=(X_i, Y_i)$ (i=1, 2, ...) on the path of the grip 42. Note that i is a time-series data number.

Figure 34:
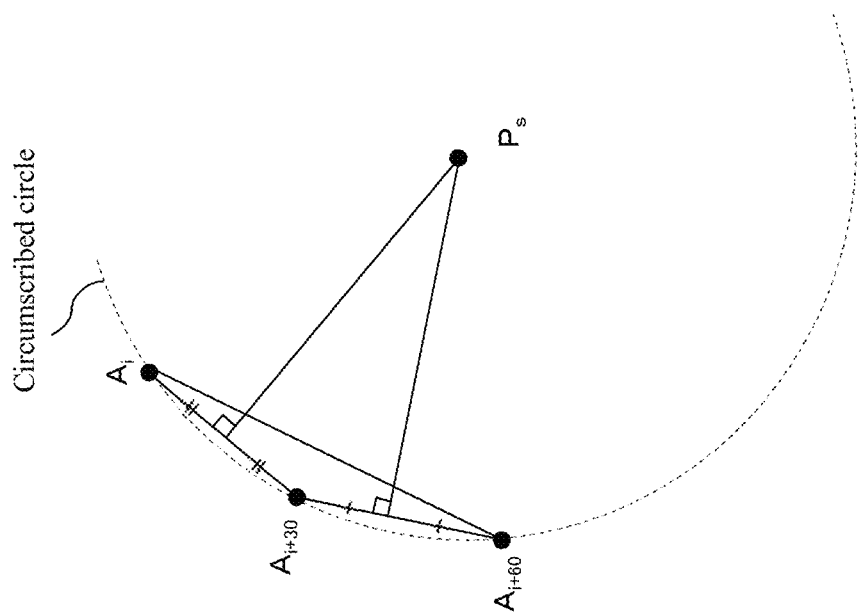
FIG. 34 is another diagram conceptually illustrating a shoulder behavior derivation process according to the modified example.

Hereinafter, an example of a method for deriving an approximate circle (arc) of path of the grip 42 is shown. First, three arbitrary points, for example, $A_i$, $A_{i+30}$, and $A_{i+60}$, are taken from the path of the grip 42. Here, since the center of a circumscribed circle of any triangle is the intersection of perpendicular bisectors of three sides of the triangle, Equation 28 below, and furthermore Equation 29 can be applied to a triangle having the points $A_i$, $A_{i+30}$, and $A_{i+60}$ as vertices (see FIG. 34).

$$(A_{i+60} - A_{i+30}) \cdot (P_s - A_{i+30} + A_{i+60}/2) = 0 \quad \text{Equation 28}$$
$$(A_i - A_{i+30}) \cdot (P_s - A_i + A_{i+30}/2) = 0$$

$$\begin{bmatrix} X_{i+60} - X_{i+30} & Y_{i+60} - Y_{i+30} \\ X_i - X_{i+30} & Y_i - Y_{i+30} \end{bmatrix} \begin{Bmatrix} P_{sX} \\ P_{sY} \end{Bmatrix} = \begin{Bmatrix} (X_{i+60} - X_{i+30})(X_{i+60} + X_{i+30})/2 + \\ (Y_{i+60} - Y_{i+30})(Y_{i+60} + Y_{i+30})/2 \\ (X_i - X_{i+30})(X_i + X_{i+30})/2 + \\ (Y_i - Y_{i+30})(Y_i + Y_{i+30})/2 \end{Bmatrix} \quad \text{Equation 29}$$

Then, Equation 30 below is generated from the plurality of equations in Equation 29 for various i, so that the pseudo-inverse matrix is derived. Accordingly, the center $P_s=(P_{sX}, P_{sY})$ of the approximate circle (arc) of path of the grip 42 can be derived.

$$\begin{bmatrix} X_{i+60} - X_{i+30} & Y_{i+60} - Y_{i+30} \\ X_i - X_{i+30} & Y_i - Y_{i+30} \\ \vdots & \\ \vdots & \end{bmatrix} \begin{Bmatrix} P_{sX} \\ P_{sY} \end{Bmatrix} = \quad \text{Equation 30}$$

$$\begin{Bmatrix} (X_{i+60} - X_{i+30})(X_{i+60} + X_{i+30})/2 + \\ (Y_{i+60} - Y_{i+30})(Y_{i+60} + Y_{i+30})/2 \\ (X_i - X_{i+30})(X_i + X_{i+30})/2 + \\ (Y_i - Y_{i+30})(Y_i + Y_{i+30})/2 \\ \vdots \\ \vdots \end{Bmatrix}$$

Next, the shoulder behavior derivation unit 24C calculates the average value of distances from the center $P_s=(P_{sX}, P_{sY})$ of the approximate circle (arc) to the points $A_i=(X_i, Y_i)$ on the path of the grip 42, and takes this value as the arm length R. Then, the shoulder behavior derivation unit 24C calculates angular velocity (angular velocity of the arm) $\omega_1=V_{GE}/R$ about the shoulder from top to impact in swing plane P, based on the arm length R.

Figure 35B:
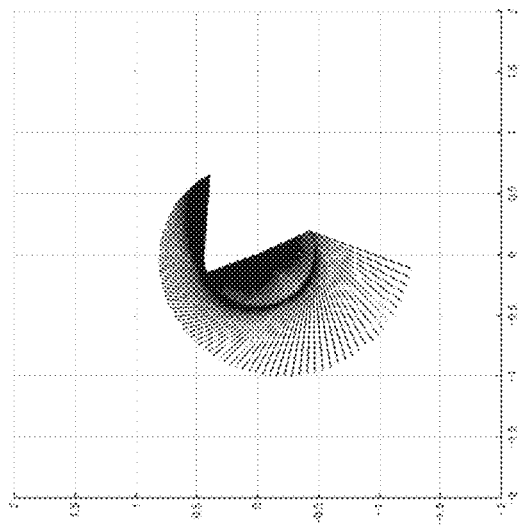
FIG. 35B is a diagram showing simulation results of a double pendulum model according to a modified example.
Figure 35A:
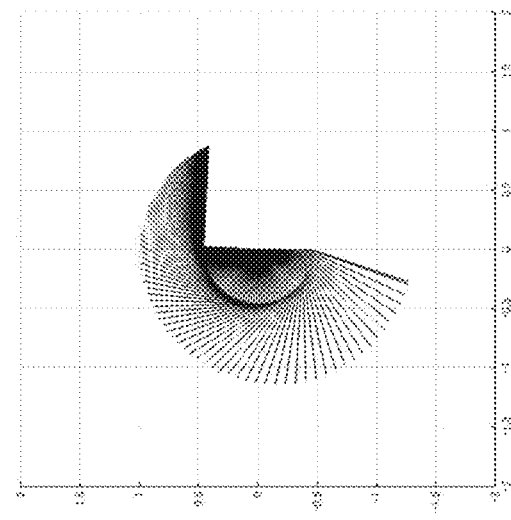
FIG. 35A is a diagram showing simulation results of a double pendulum model according to the first embodiment.

FIG. 35A shows a double pendulum model from top to impact reproduced by a method according to the foregoing embodiment, and FIG. 35B shows a double pendulum model from top to impact reproduced by a method according to this modified example. It is evident, in comparing these drawings, that in this modified example, since the premise (4) is omitted, the angle formed between the arm and the golf club 4 at top is evaluated, so that whether the wrist-cock angle is shallow or deep can be evaluated. Furthermore, since the premise (5) is omitted, the angle of the arm at impact is evaluated, so that whether the hands are forward or backward can be evaluated.

3-6

In the second embodiment, an optimal swingability index (optimal swing MI) is determined based on the first swing indices, after which an optimal feature index (optimal shaft weight) is determined based on the optimal swing MI. However, the optimal feature index may be directly calculated according to the magnitudes of the first swing indices. Specifically, for example, a multiple regression equation in which the first swing indices may be taken as explanatory variables, and the optimal feature index is taken as a response variable may be calculated in advance and stored as the correspondence data 228. In this case, the optimal feature index can be derived by substituting the first swing indices derived in the first index calculation process into the multiple regression equation. Alternatively, as in FIGS. 14 and 15 of the first embodiment, the $P_{1\_AVE}$-$P_{2\_AVE}$(-$V_h$) space may be divided (preferably, for each type of head 41) and areas corresponding to an optimal feature index are defined (see FIG. 36), and the defining information may be stored in advance as the correspondence data 228. In this case, the optimal feature index can be derived according to which area the first swing indices derived in the first index calculation process belong to.

Figure 36:
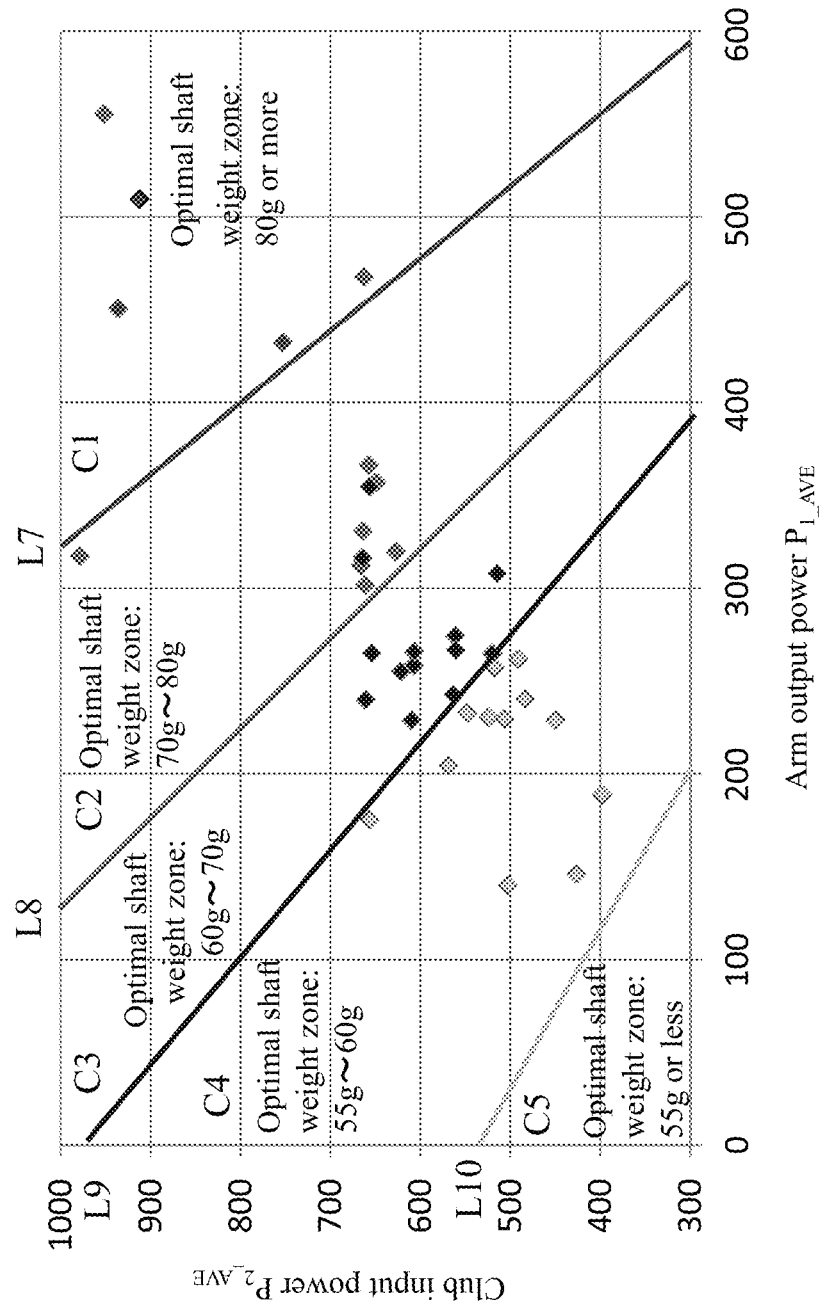
FIG. 36 is a diagram of a space showing first swing indices divided into division areas corresponding to optimal shaft weight zones.
Figure 37A:
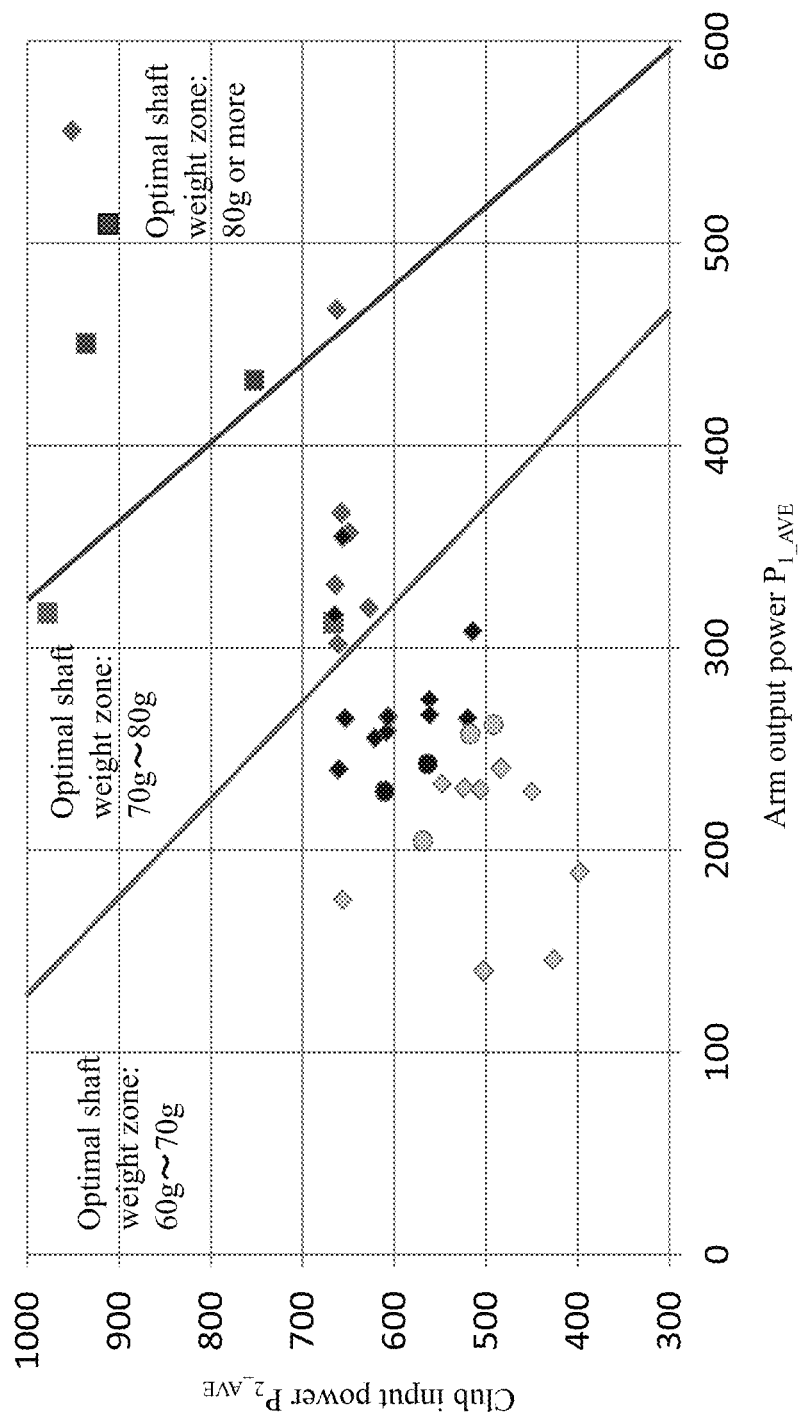
FIG. 37A is a diagram of the space showing first swing indices divided into division areas corresponding to optimal shaft weight zones, for a specific flex.
Figure 37B:
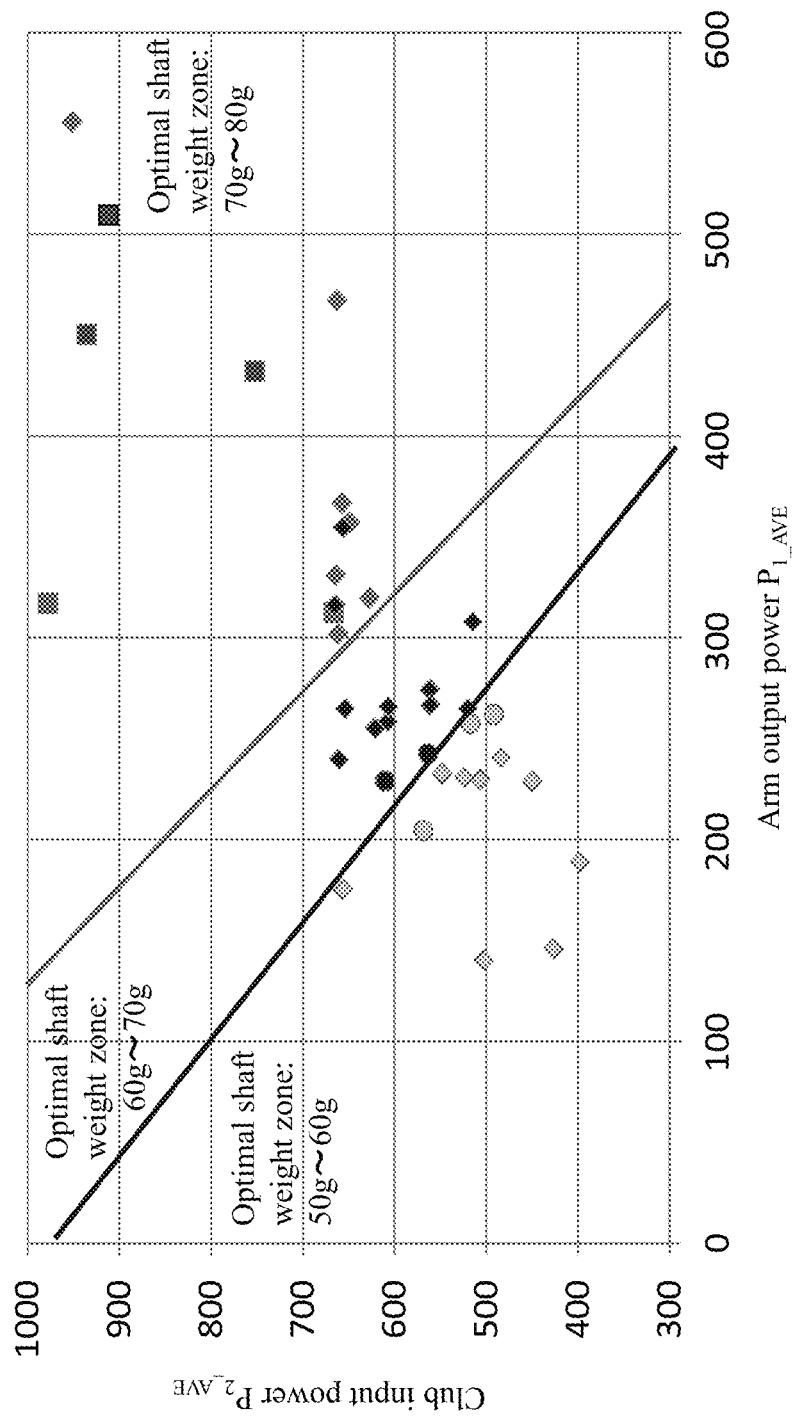
FIG. 37B is a diagram of the space showing first swing indices divided into division areas corresponding to optimal shaft weight zones, for another flex.
Figure 37C:
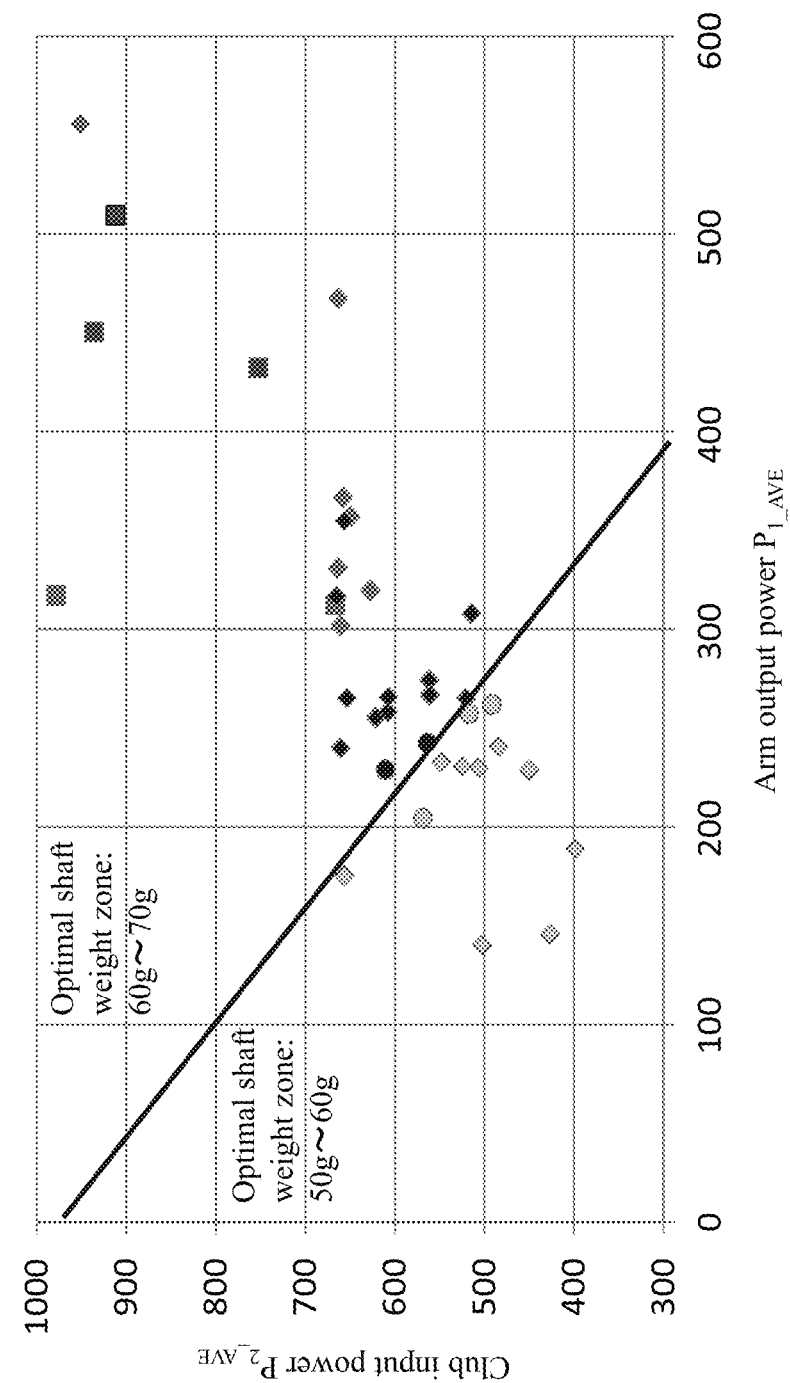
FIG. 37C is a diagram of the space showing first swing indices divided into division areas corresponding to optimal shaft weight zones, for yet another flex.

Furthermore, the correspondence data 228 as shown in FIGS. 37A to 37C may be used instead of the correspondence data 228 in FIG. 36. FIG. 37A is data for determining an optimal shaft weight zone in the case where the optimal flex is "X", FIG. 37B is data for determining an optimal shaft weight zone in the case where the optimal flex is "S", and FIG. 37C is data for determining an optimal shaft weight zone in the case where the optimal flex is "SR". That is, the optimal stiffness index is first determined, and the correspondence data 228 corresponding to this index is selected. Then, based on the selected correspondence data 228, the optimal feature index is determined according to the magnitudes of the first swing indices. With this method, the optimal feature index can be directly calculated from the first swing indices without determining the optimal swingability index, and a recommended shaft can be determined giving priority to the optimal stiffness index over the optimal feature index.

3-7

In the second embodiment, the optimal shaft weight was derived as the optimal feature index, but an index representing a feature of a site other than the shaft 40 suited to the golfer 7, such as the weight of a grip 42 suited to a golfer, may be derived instead or additionally. Furthermore, as a feature of a specific site in the golf club 4, features other than the weight, such as moment of inertia, may be derived.

3-8

The abovementioned optimal swingability index and optimal feature index are indices (hereinafter, optimal club index) representing a feature of the whole or a specific site in the golf club 4 suited to the golfer 7. In the first embodiment and Modified Example 3-6, the optimal club index was determined according to which area the first swing indices belong to among the predetermined areas A1 to A5, B1 to B3, and C1 to C5. However, for more precise fitting, it is possible to perform the following boundary processing when determining an optimal club index. The boundary processing according to this modified example is processing that, if the first swing index calculated based on measurement data is positioned near a boundary between a plurality of areas defined by dividing a space representing the first swing index, corrects the aforementioned optimal club index.

Figure 38:
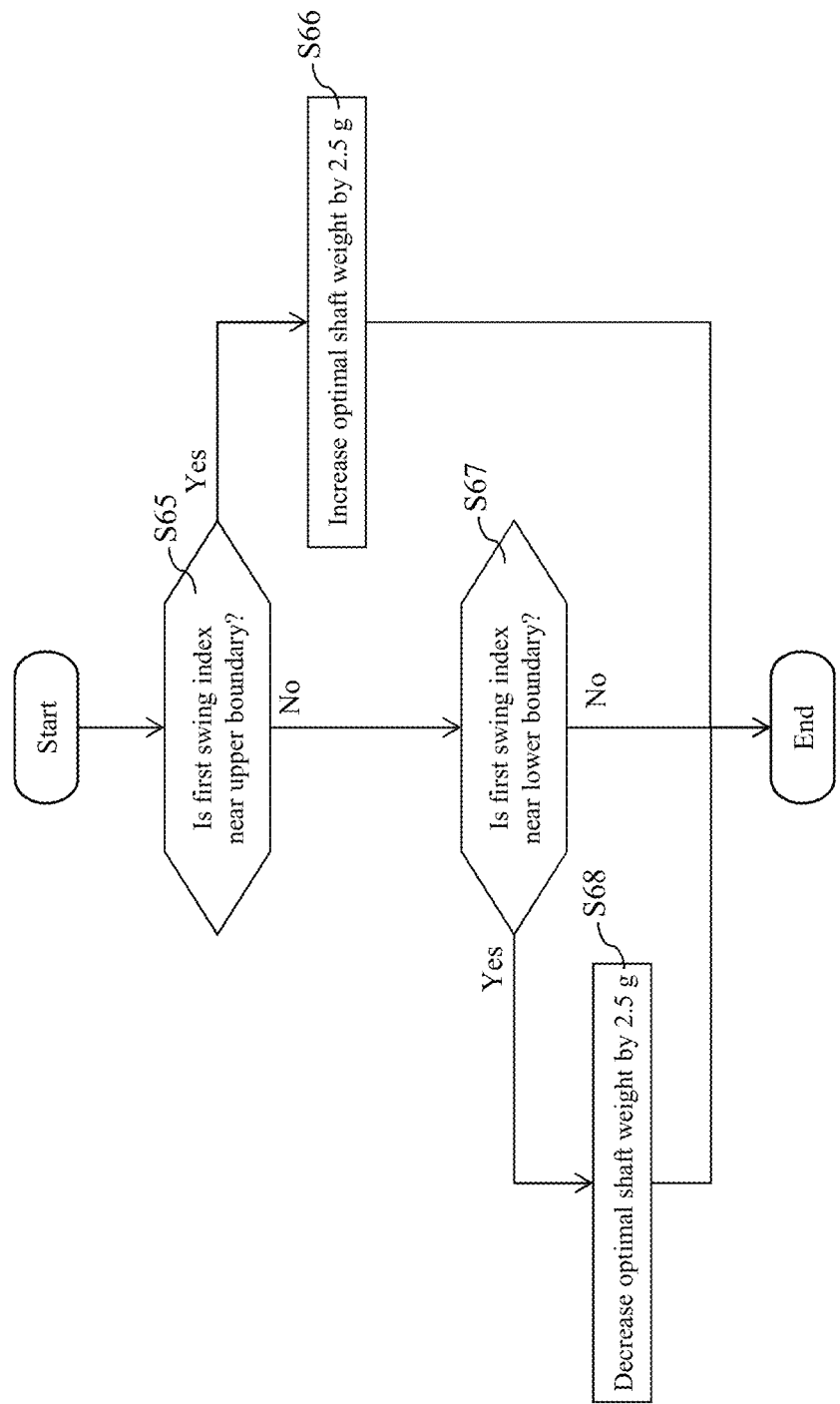
FIG. 38 is a flowchart showing the flow of boundary processing.

Hereinafter, as an example, boundary processing in the case of being combined with Modified Example 3-6 will be described. A specific flow of the processing is as shown in FIG. 38. The boundary processing shown in FIG. 38 is executed after the optimal shaft weight, which is an optimal club index, has been determined according to the determination criteria shown in FIG. 36 (the boundary lines L6 to L10 between the division areas C1 to C5).

First, in step S65, the determination unit 224E determines whether or not a determination index is positioned near an upper boundary of a determination area. The determination index refers to $P_{1\_AVE}$ and $P_{2\_AVE}$ (first swing indices) calculated based on measurement data, and the determination area is an area to which the determination index belongs among the areas C1 to C5 defined in the $P_{1\_AVE}$-$P_{2\_AVE}$(-$V_h$) space. Whether or not the determination index is positioned near an upper boundary can be determined, for example, according to whether or not the distance between a point representing the determination index and the upper boundary line of the determination area is not greater than a threshold in the $P_{1\_AVE}$-$P_{2\_AVE}$(-$V_h$) space. If the determination index belongs to the area C2, the boundary line L7 is the upper boundary line.

In step S65, if it is determined that the determination index is positioned near the upper boundary of the determination area, the determination unit 224E performs adjustment that increases the aforementioned optimal shaft weight by a predetermined amount (step S66).

On the other hand, in step S65, if it is determined that the determination index is not positioned near the upper boundary of the determination area, the procedure advances to step S67. In step S67, it is determined whether or not the determination index is positioned near a lower boundary of the determination area. Whether or not the determination index is positioned near a lower boundary can be determined, for example, according to whether or not the distance between a point representing the determination index and the lower boundary line of the determination area is not greater than a threshold in the $P_{1\_AVE}$-$P_{2\_AVE}$($-V_h$) space. If the determination index belongs to the area C2, the boundary line L8 is the lower boundary line.

In step S67, if it is determined that the determination index is positioned near the lower boundary of the determination area, the determination unit 224E performs adjustment that decreases the aforementioned optimal shaft weight by a predetermined amount (step S68). After these steps end, the boundary processing is ended.

3-9

Modified Example 3-8 described the boundary processing for more precisely determining an optimal club index, but the exceptional processing according to this modified example is also processing for more precisely determining an optimal club index. In the foregoing embodiments, analysis in swing plane P was performed for calculating a first swing index, but, $P_{1\_AVE}$ and $P_{2\_AVE}$, which are the above-mentioned first swing indices, and the indices shown in Modified Example 3-3 are indices representing a two-dimensional swing action of the golfer 7 projected onto swing plane P. However, the swing action is actually three-dimensional in nature. The exceptional processing according to this modified example is processing for improving the precision of the optimal club index by reducing errors caused by two-dimensional analysis.

Figure 39B:
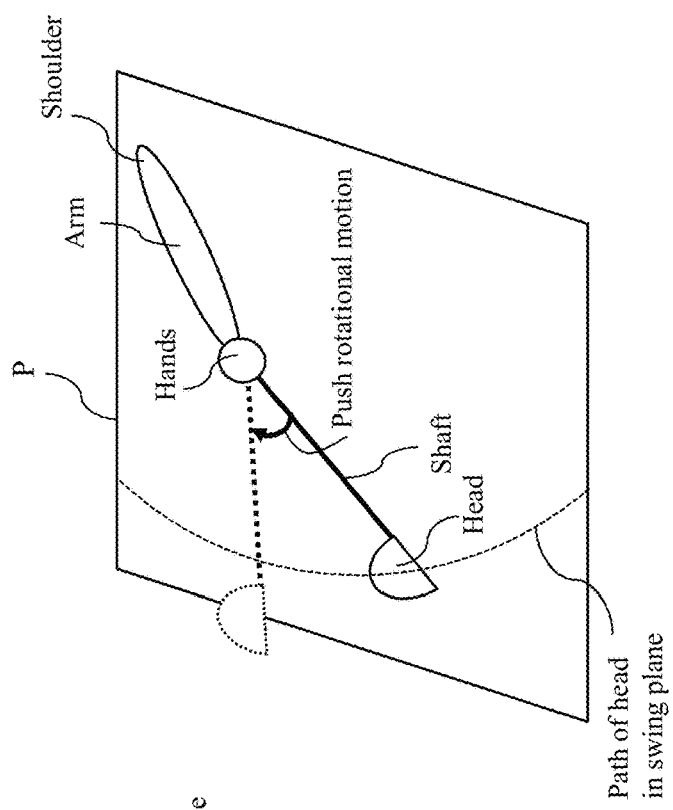
FIG. 39B is a conceptual view showing push rotational motion.
Figure 39A:
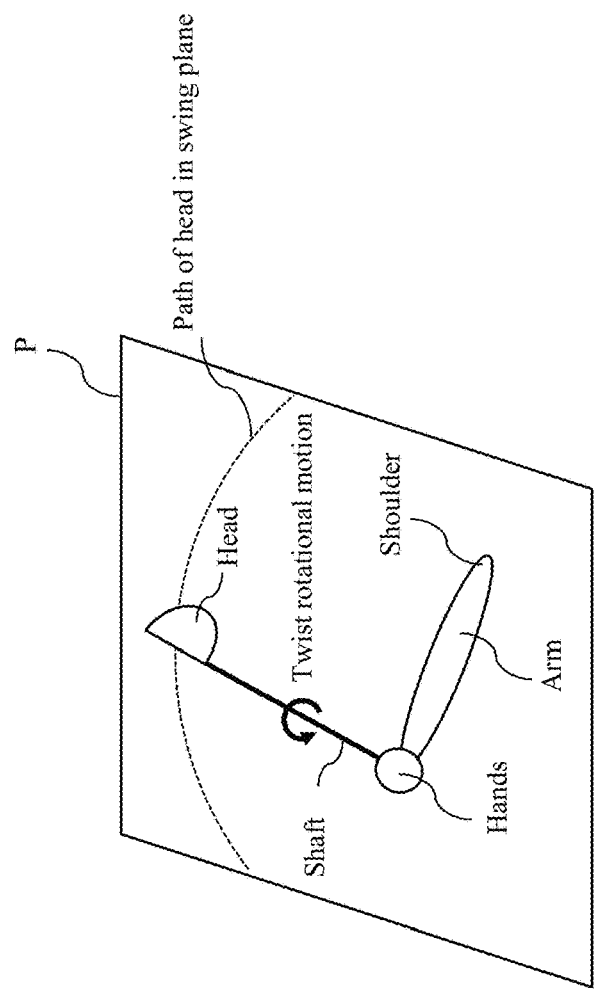
FIG. 39A is a conceptual view showing twist rotational motion.

In the exceptional processing according to this modified example, an index representing rotational motion not appearing in swing plane P and an index representing wrist-cock motion (hereinafter, wrist-cock index) not appearing in swing plane P are derived as first swing indices in addition to those described above. The rotational motion not appearing in swing plane P can be evaluated based on an index (hereinafter, twist index) representing twist rotational motion about the shaft axis of the golf club 4 projected onto swing plane P (see FIG. 39A), or an index (hereinafter, push index) representing rotational motion of the golf club 4 in a direction (push direction) projecting from swing plane P (see FIG. 39B). Some golfers 7 may acquire head velocity through such rotational motion. Furthermore, some golfers 7 may acquire head velocity through wrist-cock motion in the latter period of downswing, but the entire path of such wrist-cock motion is not necessarily projected onto swing plane P. The exceptional processing described in this example can make it possible to precisely derive an optimal club index for these golfers 7.

Figure 40:
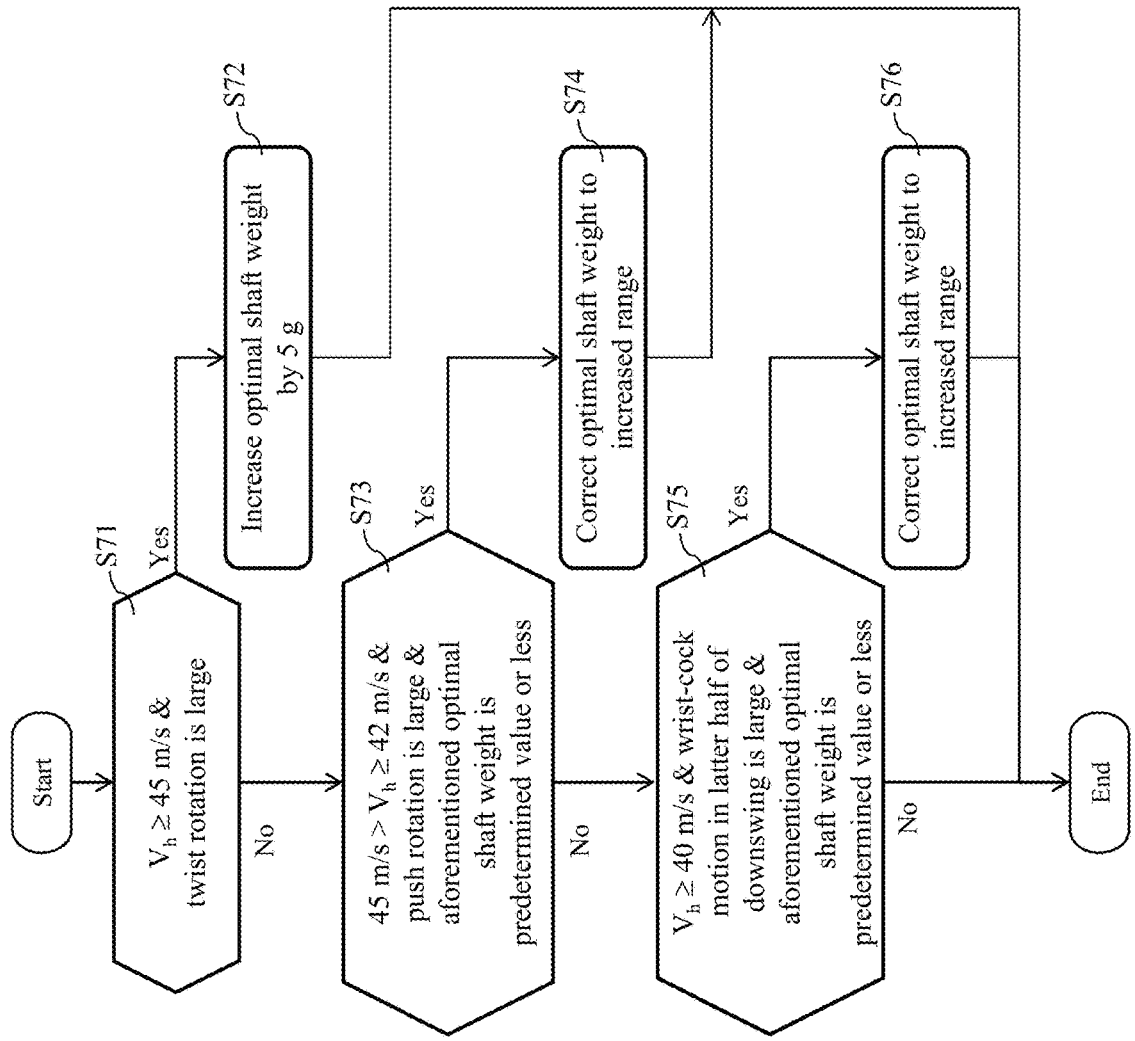
FIG. 40 is a flowchart showing the flow of exceptional processing.

Hereinafter, as an example, exceptional processing in the case of being combined with Modified Example 3-6 will be described. A specific flow of the processing is as shown in shown in FIG. 40. The exceptional processing shown in FIG. 40 is executed after the optimal shaft weight, which is an optimal club index, has been determined according to the determination criteria shown in FIG. 36 (the boundary lines L6 to L10 between the division areas C1 to C5).

First, in step S71, the calculation unit 24D calculates a twist index based on measurement data. The twist index can be calculated, for example, as an average value of the angular velocity $\omega_z$ about the shaft axis from top to impact. Then, the determination unit 224E determines whether or not the head velocity $V_h$ is within a predetermined range and the twist index is at a predetermined value or more. If these conditions are satisfied, adjustment that increases the aforementioned optimal shaft weight by a predetermined amount is performed (step S72). On the other hand, if these conditions are not satisfied, the procedure advances to step S73.

In step S73, the calculation unit 24D calculates a push index based on measurement data. Then, the determination unit 224E determines whether or not the head velocity $V_h$ is within a predetermined range, the push index is at a predetermined value or more, and the aforementioned optimal shaft weight is within a predetermined range. If these conditions are satisfied, adjustment that increases the aforementioned optimal shaft weight by a predetermined amount is performed (step S74). On the other hand, if these conditions are not satisfied, the procedure advances to step S75. The case in which the push index is at a predetermined value or more may be, for example, a case in which $\omega_x$ at top $\geq 0$, and average value of $\omega_y$ from top to impact/average value of $\omega_x$ from top to impact $\geq 1.5$ are satisfied.

In step S75, the calculation unit 24D calculates a wrist-cock index based on measurement data. The wrist-cock index can be calculated, for example, as a value obtained by comparing a difference of $\omega_y$ near top and an average value of $\omega_y$ from the time at which $\omega_y$ is maximized to impact. Then, the determination unit 224E determines whether or not the head velocity $V_h$ is within a predetermined range, the wrist-cock index is at a predetermined value or more, and the aforementioned optimal shaft weight is within a predetermined range. If these conditions are satisfied, adjustment that increases the aforementioned optimal shaft weight by a predetermined amount is performed (step S76).

If these steps are completed, the exceptional processing is ended. Both of this exceptional processing and the boundary processing of Modified Example 3-8 are processing for more precisely determining an optimal club index, and they can be used in combination. In this case, it is preferable that this exceptional processing is executed after the boundary processing.

WORKING EXAMPLES

Hereinafter, working examples of the present invention will be described. The present invention is, however, not limited to the following working examples.

Working Example 1

A fitting method according to Patent Literature 1 (Comparative Example) and a fitting method according to the first embodiment (Working Example 1) were applied to a golfer who usually use a golf club having a swing moment of inertia $I_S$ of 5615 kg·cm².

With the method according to Comparative Example, only golf clubs within the range of ±5 g from the usual club weight are selected, and thus a Miyazaki Indio 7S shaft ($I_S$=about 5610 kg·cm²) was selected. The testing involved getting the golfer to take five practice hits with a golf club including this shaft, and measuring the average value of carry distances and left-right shifting of the hits.

On the other hand, with the method according to Working Example 1, a Miyazaki Indio 6S shaft ($I_S$=about 5540 kg·cm²) was selected. The testing involved getting the golfer to take five practice hits with a golf club including this shaft, the golf club being different from that in the Comparative Example only in the shaft (i.e., having the same head), and measuring the average value of carry distances and left-right shifting of the hits.

Figure 41B:
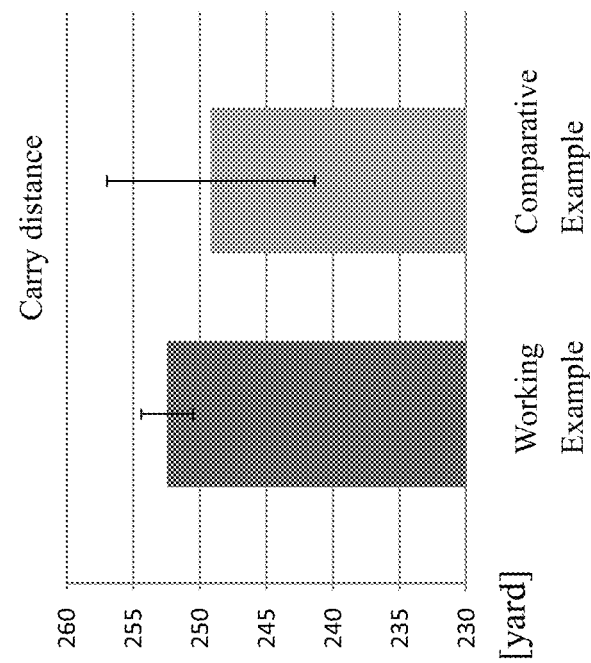
FIG. 41B is a graph showing left-right shifting according to Working Example 1 and Comparative Example.
Figure 41A:
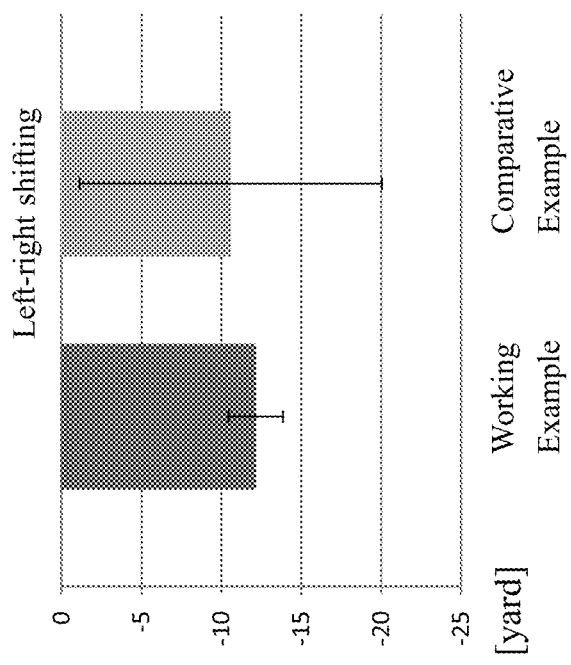
FIG. 41A is a graph showing carry distances according to Working Example 1 and Comparative Example.

FIGS. 41A and 41B are graphs showing average values and dispersion of the carry distances and the left-right shifting according to Working Example 1 and Comparative Example. As shown in the graphs, the results obtained when using the golf club selected according to the method of Working Example 1 were more preferable in both the carry distances and the left-right shifting than those obtained when using the golf club selected according to the method of Comparative Example. Accordingly, the superiority of Working Example 1 was confirmed.

Working Example 2

Figure 42A:
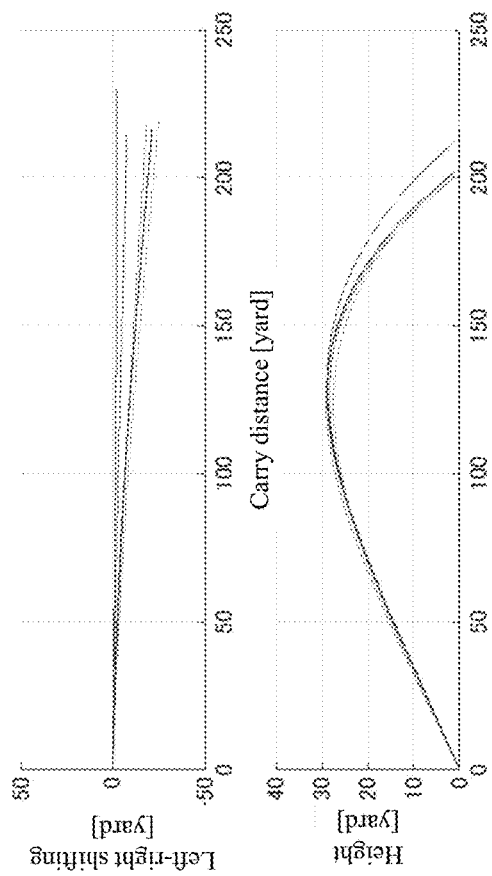
FIG. 42A show graphs of results of practice hits according to Working Example 2.

When a fitting method according to the second embodiment (Working Example 2) was applied to select a golf club suited to a golfer, a golf club A obtained by combining a head A (weight: 200 g) and a shaft A (flex: SR, weight: 65.5 g) was selected. Since the golfer usually used a head whose weight was similar to that of the head A, the head A was set to a preferred head. Also, as a golf club whose weight and swingability index were similar to those of the golf club A, a golf club B obtained by combining a head B (weight: 202 g) and a shaft B (flex: SR, weight: 56.5 g) was prepared. The results shown in FIGS. 42A and 42B were obtained through testing that involved getting the golfer to take five practice hits with each of the golf clubs A and B. FIG. 42A shows results of practice hits with the golf club A, and FIG. 42B shows results of practice hits with the golf club B.

Figure 42B:
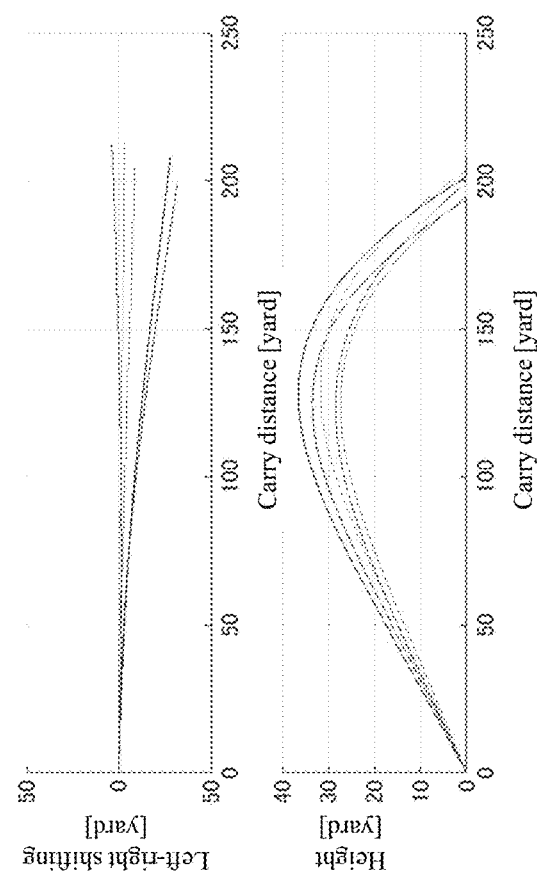
FIG. 42B show graphs of results of practice hits according to Reference Example.

It is evident, in comparing FIGS. 42A and 42B, that the results obtained when swinging the golf club A including the head A whose weight was similar to that of the usually used head were superior in both the left-right shifting and the carry distances. That is, it is seen that realizing the optimal swingability index by adjusting the weight of a shaft in a state a head is fixed according to the golfer's preference is more preferable than realizing the optimal swingability index by adjusting the weight of a head. Accordingly, the superiority of the fitting method according to the foregoing embodiment for selecting a shaft that can realize the optimal swingability index in a state where a head is fixed was confirmed.

The invention claimed is:

1. A fitting apparatus configured to select a golf club suited to a golfer, comprising:
    an acquisition unit configured to acquire a measurement value obtained by measuring a swing action of a test club by the golfer, with a measurement device, wherein the measurement device includes at least one of an acceleration sensor for measuring grip accelerations, an angular velocity sensor for measuring grip angular velocities, a geomagnetic sensor for measuring grip geomagnetisms or a three-dimensional measurement camera for capturing the swing action of the test club by the golf; and a communication device connected to the acquisition unit of the fitting apparatus and configured to transmit measured data that represent the swing action of the test club by the golfer from the measurement device to the acquisition unit;
    a calculation unit configured to calculate a first swing index and a second swing index related to the swing action, based on the measurement value;
    a determination unit configured to determine an optimal swingability index, which is a swingability index of the golf club suited to the golfer, according to a magnitude of the first swing index, and determine an optimal stiffness index representing stiffness of a shaft suited to the golfer, according to a magnitude of the second swing index;
    a selection unit configured to select at least one of a golf club and a shaft matching the optimal swingability index and the optimal stiffness index; and
    a display control unit and a display, wherein the display control unit is configured to generate a fitting result based on the determination of the optimal swingability index and optimal stiffness index, and display the fitting result on the display,
    wherein the fitting result includes the selected at least one of a golf club and a shaft along with information respectively representing the golfer's optimal swingability index and optimal stiffness index, thereby providing a golf club suited to the golfer with an improved fitting precision to achieve a maximized carry distance and a superior left-right shifting.

2. The fitting apparatus according to claim 1,
    wherein the calculation unit is configured to calculate a plurality of types of the first swing indices, and
    the determination unit is configured to determine the optimal swingability index according to magnitudes of the plurality of types of the first swing indices.

3. The fitting apparatus according to claim 1, wherein the first swing index includes at least one of an index representing power that is output by arm of the golfer during the swing action, an index representing power that is input to the test club during the swing action, an index representing energy that is exerted by the golfer during the swing action, and an index representing torque that is exerted by the golfer during the swing action.

4. The fitting apparatus according to claim 1, wherein the first swing index includes head speed during the swing action.

5. The fitting apparatus according to claim 1, wherein the determination unit is configured to determine the optimal swingability index to take a larger value as the first swing index increases or decreases.

6. The fitting apparatus according to claim 1, further comprising:
    a storage unit which stores correspondence data defining a correspondence between the magnitude of the first swing index and the magnitude of the optimal swingability index for each type of the test club,
    wherein the determination unit is configured to determine the optimal swingability index according to the type of the test club, by referring to the correspondence data in the storage unit.

7. The fitting apparatus according to claim 1, wherein the swingability index includes at least one of a moment of inertia about a shoulder of the golfer, a moment of inertia of the golf club, and a weight of the golf club.

8. The fitting apparatus according to claim 1, wherein the measurement value includes at least one of acceleration, angular velocity, and geomagnetism at a grip end of the test club.

9. The fitting apparatus according to claim 1, wherein the determination unit is configured to determine a distribution of stiffnesses at a plurality of positions on a shaft, suited to the golfer, as the optimal stiffness index.

10. The fitting apparatus according to claim 9,
    wherein the calculation unit is configured to calculate first and second feature amounts as the second swing index, and
    the determination unit is configured to determine first and second stiffness values indicating stiffnesses of a shaft suited to the golfer at first and second positions arranged in this order from a butt end to a tip end of the shaft, as the optimal stiffness index, according to magnitudes of the respective first and second feature amounts.

11. The fitting apparatus according to claim 9, wherein the determination unit is configured to determine the optimal stiffness index in accordance with a predetermined equation representing a relationship between the second swing index and the optimal stiffness index.

12. A fitting method for selecting a golf club suited to a golfer, comprising:
measuring a swing action of a test club by the golfer, with a measurement device, wherein the measurement device includes at least one of an acceleration sensor for measuring grip accelerations, an angular velocity sensor for measuring grip angular velocities, a geomagnetic sensor for measuring grip geomagnetisms or a three-dimensional measurement camera for capturing the swing action of the test club by the golf;
transmitting measured data that represent the swing action of the test club by the golfer from the measurement device to an acquisition unit by a communication device;
calculating a first swing index and a second swing index related to the swing action, based on the measurement value;
determining an optimal swingability index, which is a swingability index of the golf club suited to the golfer, according to a magnitude of the first swing index, and determining an optimal stiffness index representing stiffness of a shaft suited to the golfer, according to a magnitude of the second swing index;
selecting at least one of a golf club and a shaft matching the optimal swingability index and the optimal stiffness index; and
generating a fitting result based on the determination of the optimal swingability index and optimal stiffness index, and displaying the fitting result on the display,
wherein the fitting result includes the selected at least one of a golf club and a shaft along with information respectively representing the golfer's optimal swingability index and optimal stiffness index, thereby providing a golf club suited to the golfer with an improved fitting precision to achieve a maximized carry distance and a superior left-right shifting.

13. A non-transitory recording medium storing a fitting program for selecting a golf club suited to a golfer, the fitting program causing a computer to execute steps of:
acquiring a measurement value obtained by measuring a swing action of a test club by the golfer, with a measurement device;
calculating a first swing index and a second swing index related to the swing action, based on the measurement value;
determining an optimal swingability index, which is a swingability index of the golf club suited to the golfer, according to a magnitude of the first swing index, and determining an optimal stiffness index representing stiffness of a shaft suited to the golfer, according to a magnitude of the second swing index;
selecting at least one of a golf club and a shaft matching the optimal swingability index and the optimal stiffness index; and
generating a fitting result based on the determination of the optimal swingability index and optimal stiffness index, and displaying the fitting result on the display,
wherein the fitting result includes the selected at least one of a golf club and a shaft along with information respectively representing the golfer's optimal swingability index and optimal stiffness index, thereby providing a golf club suited to the golfer with an improved fitting precision to achieve a maximized carry distance and a superior left-right shifting, and
wherein the measurement device includes at least one of an acceleration sensor for measuring grip accelerations, an angular velocity sensor for measuring grip angular velocities, a geomagnetic sensor for measuring grip geomagnetisms or a three-dimensional measurement camera for capturing the swing action of the test club by the golf; and a communication device configured to transmit measured data that represent the swing action of the test club by the golfer.

14. A fitting apparatus configured to select a golf club suited to a golfer, comprising:
an acquisition unit configured to acquire a measurement value obtained by measuring a swing action of a test club by the golfer, with a measurement device, wherein the measurement device includes at least one of an acceleration sensor for measuring grip accelerations, an angular velocity sensor for measuring grip angular velocities, a geomagnetic sensor for measuring grip geomagnetisms or a three-dimensional measurement camera for capturing the swing action of the test club by the golf; and a communication device connected to the acquisition unit of the fitting apparatus and configured to transmit measured data that represent the swing action of the test club by the golfer from the measurement device to the acquisition unit;
a calculation unit configured to calculate a first swing index and a second swing index related to the swing action, based on the measurement value;
a determination unit configured to determine an optimal feature index representing a feature of a specific site in the golf club suited to the golfer, according to a magnitude of the first swing index, and determine an optimal stiffness index representing stiffness of a shaft suited to the golfer, according to a magnitude of the second swing index;
a selection unit configured to select at least one of a golf club and a shaft matching the optimal feature index and the optimal stiffness index; and
a display control unit and a display, wherein the display control unit is configured to generate a fitting result based on the determination of the optimal swingability index and optimal stiffness index, and display the fitting result on the display,
wherein the fitting result includes the selected at least one of a golf club and a shaft along with information respectively representing the golfer's optimal swingability index and optimal stiffness index, thereby providing a golf club suited to the golfer with an improved fitting precision to achieve a maximized carry distance and a superior left-right shifting, and
wherein the first swing index includes at least one of an index representing power that is output by arm of the golfer during the swing action and an index representing power that is input to the test club during the swing action.

15. The fitting apparatus according to claim 14, wherein the determination unit is configured to determine the optimal feature index according to a type of head that is to be included in the golf club, in addition to the magnitude of the first swing index, and
the specific site is a site other than the head.

16. The fitting apparatus according to claim 14, wherein the specific site is a shaft or a grip.

17. The fitting apparatus according to claim 14, wherein the determination unit is configured to determine an optimal swingability index, which is a swingability index of the golf club suited to the golfer, according to the magnitude of the first swing index, and to determine the optimal feature index, according to a magnitude of the optimal swingability index.

18. The fitting apparatus according to claim 17, wherein the determination unit is configured to calculate the optimal swingability index by substituting the first swing index calculated by the calculation unit into a predetermined regression equation where the first swing index is taken as an explanatory variable and the optimal swingability index is taken as a response variable.

19. The fitting apparatus according to claim 14, wherein the determination unit is configured to calculate the optimal feature index by substituting the swing index calculated by the calculation unit into a predetermined regression equation where the first swing index is taken as an explanatory variable and the optimal feature index is taken as a response variable.

20. The fitting apparatus according to claim 14, wherein the optimal feature index is an optimal shaft weight, which is a weight of a shaft of the golf club suited to the golfer.

* * * * *